United States Patent
Kawamura et al.

(10) Patent No.: US 11,353,682 B2
(45) Date of Patent: Jun. 7, 2022

(54) IMAGING LENS AND IMAGING APPARATUS

(71) Applicant: FUJIFILM Corporation, Tokyo (JP)

(72) Inventors: Daiki Kawamura, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 162 days.

(21) Appl. No.: 16/774,839

(22) Filed: Jan. 28, 2020

(65) Prior Publication Data
US 2020/0249430 A1 Aug. 6, 2020

(30) Foreign Application Priority Data
Jan. 31, 2019 (JP) .............................. JP2019-016232

(51) Int. Cl.
*G02B 9/30* (2006.01)
*G02B 7/10* (2021.01)

(52) U.S. Cl.
CPC ................. *G02B 9/30* (2013.01); *G02B 7/10* (2013.01)

(58) Field of Classification Search
CPC ................ G02B 13/0045; G02B 13/04; G02B 13/0035; G02B 15/177; G02B 13/06; G02B 15/163; G02B 15/144113; G02B 9/64; G02B 15/1461; G02B 15/14; G02B 15/144511; G02B 13/18; G02B 15/1425; G02B 15/145129; G02B 13/009; G02B 15/143; G02B 15/1431; G02B 15/143105; G02B 15/143107; G02B 7/10; G02B 9/30; G02B 13/02
See application file for complete search history.

(56) References Cited

U.S. PATENT DOCUMENTS

| | | | |
|---|---|---|---|
| 2010/0208367 A1* | 8/2010 | Sugita | G02B 13/04 359/784 |
| 2015/0098138 A1* | 4/2015 | Shirasuna | G02B 9/64 359/749 |
| 2015/0116848 A1* | 4/2015 | Yamada | G02B 9/64 359/749 |
| 2016/0139384 A1* | 5/2016 | Sun | G02B 15/22 359/684 |

(Continued)

FOREIGN PATENT DOCUMENTS

| | | |
|---|---|---|
| JP | 2017-097197 A | 6/2017 |
| JP | 2017-116763 A | 6/2017 |

(Continued)

OTHER PUBLICATIONS

An Office Action mailed by the Japanese Patent Office dated Jan. 4, 2022, which corresponds to Japanese Application No. 2019-016232 with English translation.

*Primary Examiner* — Ephrem Z Mebrahtu
(74) *Attorney, Agent, or Firm* — Studebaker & Brackett PC

(57) ABSTRACT

The imaging lens comprises, successively in order from the object side, a positive first lens group that does not move during focusing, a second lens group that moves during focusing, a stop, and a positive third lens group that consists of all lenses moving integrally with the second lens group during focusing. The composite focal length of the second lens group and the third lens group is positive. The first lens group includes four or more positive lenses and three or more negative lenses. The imaging lens satisfies predetermined conditional expressions.

20 Claims, 42 Drawing Sheets

EXAMPLE 1

(56) References Cited

U.S. PATENT DOCUMENTS

| | | | |
|---|---|---|---|
| 2016/0282590 A1* | 9/2016 | Saito | G02B 13/04 |
| 2017/0176727 A1* | 6/2017 | Uehara | G02B 15/143105 |
| 2018/0024315 A1* | 1/2018 | Sato | G02B 1/115 |
| | | | 359/601 |
| 2018/0095256 A1 | 4/2018 | Iwamoto et al. | |
| 2018/0252898 A1* | 9/2018 | Noda | G02B 9/64 |
| 2019/0101727 A1* | 4/2019 | Yuki | G02B 9/12 |
| 2019/0101732 A1* | 4/2019 | Yuki | G02B 13/04 |
| 2019/0146195 A1* | 5/2019 | Ichimura | G02B 13/18 |
| | | | 359/716 |
| 2019/0204567 A1* | 7/2019 | Stuible | G02B 13/006 |
| 2019/0250367 A1* | 8/2019 | Murayama | G02B 13/04 |
| 2019/0310449 A1* | 10/2019 | Dodoc | G02B 7/04 |

FOREIGN PATENT DOCUMENTS

| | | |
|---|---|---|
| JP | 2017-227799 A | 12/2017 |
| JP | 2018-005099 A | 1/2018 |
| JP | 2018-005133 A | 1/2018 |
| JP | 2018-054987 A | 4/2018 |
| JP | 2019-215510 A | 12/2019 |
| JP | 2019-219472 A | 12/2019 |

\* cited by examiner

EXAMPLE 1

EXAMPLE 2

EXAMPLE 3

EXAMPLE 4

EXAMPLE 5

FIG. 6 EXAMPLE 6

EXAMPLE 10

EXAMPLE 11

EXAMPLE 12

EXAMPLE 2

EXAMPLE 2

EXAMPLE 3

EXAMPLE 3

EXAMPLE 4

EXAMPLE 5

EXAMPLE 5

EXAMPLE 6

EXAMPLE 6

EXAMPLE 7

EXAMPLE 7

EXAMPLE 8

EXAMPLE 9

EXAMPLE 10

EXAMPLE 11

EXAMPLE 11

EXAMPLE 12

EXAMPLE 12

EXAMPLE 13

IMAGING LENS AND IMAGING APPARATUS

CROSS-REFERENCE TO RELATED APPLICATIONS

The present application claims priority under 35 U.S.C. § 119 to Japanese Patent Application No. 2019-016232, filed on Jan. 31, 2019. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as a lens system that can be used in an imaging apparatus such as a digital camera, a Gauss type lens system and a modified Gauss type lens system have been proposed. As lens systems similar to the Gaussian type lens systems, for example, lens systems described in JP2018-005099A, JP2018-054987A, JP2018-005133A, and JP2017-227799A below are known.

SUMMARY OF THE INVENTION

The Gauss type lens system is often used for a lens system having a small F number. In JP2018-005099A, JP2018-054987A, JP2018-005133A, and JP2017-227799A, a small F number is set as one of objects. However, in recent years, there has been a demand for a lens system having an F number smaller than the F number of the lens systems described in JP2018-005099A, JP2018-054987A, JP2018-005133A, and JP2017-227799A.

The Gauss type has a problem in that sagittal coma aberration increases in a case where the angle of view increases. However, there has been a demand for a lens system which has a small F number and in which aberrations are satisfactorily corrected to obtain a high-quality image.

A lens system having a small F number has a problem in that there is a disadvantage in increasing the speed of autofocus since the weight of a group (hereinafter referred to as a focus group) that moves during focusing increases. Thus, it is preferable for the focus group to be reduced in weight.

The present disclosure has been made in consideration of the above-mentioned situation, and its object is to provide an imaging lens, which has high optical performance by achieving a small F number and reduction in weight of a focus group and satisfactorily correcting aberrations, and an imaging apparatus comprising the imaging lens.

According to an aspect of the present disclosure, there is provided an imaging lens comprising, successively in order from a position closest to an object side to an image side: a first lens group that remains stationary with respect to an image plane during focusing and that has a positive refractive power; a second lens group that moves during focusing; a stop; and a third lens group that moves during focusing and that has a positive refractive power. All lenses in the second lens group move integrally during focusing. The third lens group consists of all lenses that move integrally with the second lens group during focusing. A composite focal length of the second lens group and the third lens group is positive. The first lens group includes at least four positive lenses and at least three negative lenses. In addition, assuming that a maximum value of a height of a paraxial ray from an optical axis in the first lens group is H1 max, in a case in which paraxial ray tracing is performed by causing the paraxial ray, whose height from the optical axis on a lens surface closest to the object is H1f and which is parallel to the optical axis, to be incident from the object side, Conditional Expression (1) is satisfied.

$$1.1 < H1\,max/H1f < 2 \tag{1}$$

It is preferable that the imaging lens according to the aspect of the present disclosure satisfies Conditional Expression (1-1).

$$1.2 < H1\,max/H1f < 1.8 \tag{1-1}$$

In the imaging lens of the above aspect of the present disclosure, assuming that a height of the paraxial ray from the optical axis on a lens surface closest to the object side in the second lens group is H2f, it is preferable to satisfy Conditional Expression (2), and it is more preferable to satisfy Conditional Expression (2-1).

$$1 < H1\,max/H2f < 1.5 \tag{2}$$

$$1.05 < H1\,max/H2f < 1.3 \tag{2-1}$$

In the imaging lens according to the aspect of the present disclosure, it is preferable that the first lens group includes at least two cemented lenses in which at least one positive lens and at least one negative lens are cemented.

In the imaging lens of the above aspect of the present disclosure, it is preferable that the cemented lens closest to the image side in the first lens group has a cemented surface concave toward the object side. In addition, it is preferable that the cemented lens which is second from the image side in the first lens group has a cemented surface concave toward the image side.

In the imaging lens of the above aspect of the present disclosure, assuming that a height of the paraxial ray from the optical axis on a lens surface closest to the object side in the second lens group is H2f, it is preferable to satisfy Conditional Expression (3).

$$0.5 < H1f/H2f < 1 \tag{3}$$

In the imaging lens according to the aspect of the present disclosure, it is preferable that the first lens group includes at least three biconvex lenses and at least two biconcave lenses.

In the imaging lens according to the aspect of the present disclosure, it is preferable that the second lens group consists of two or three positive lenses and one negative lens.

In the imaging lens according to the aspect of the present disclosure, it is preferable that the second lens group and the third lens group each include at least one negative lens. It is preferable that an image side surface of the negative lens closest to the image side in the second lens group is a concave surface. It is preferable that an object side surface of the negative lens closest to the object side in the third lens group is a concave surface. Assuming that a radius of curvature of the image side surface of the negative lens closest to the image side in the second lens group is Rso, and a radius of curvature of the object side surface of the negative lens closest to the object side in the third lens group is Rsi, it is preferable to satisfy Conditional Expression (4).

$$-0.4 < (Rso+Rsi)/(Rso-Rsi) < 0.2 \tag{4}$$

In the imaging lens of the above aspect of the present disclosure, assuming that a combined lateral magnification of the second lens group and the third lens group in a state in which an object at infinity is in focus is β23, it is preferable to satisfy Conditional Expression (5).

$$0.2 < \beta23 < 0.8 \tag{5}$$

In the imaging lens of the above aspect of the present disclosure, assuming that a combined lateral magnification of the second lens group and the third lens group in a state where the object at infinity is in focus is β23, a combined lateral magnification of all lenses closer to the image side than the third lens group in a state in which an object at infinity is in focus in a case where a lens is disposed closer to the image side than the third lens group is βr, and βr is set to 1 in a case where no lens is disposed closer to the image side than the third lens group, it is preferable to satisfy Conditional Expression (6).

$$0.7 < (1-\beta23^2) \times \beta r^2 < 1.2 \tag{6}$$

In the imaging lens according to the aspect of the present disclosure, assuming that an average of Abbe numbers of all the positive lenses in the first lens group based on a d line is ν1p, an average of Abbe numbers of all the negative lenses in the first lens group based on the d line is ν1n, an average of partial dispersion ratios of all the positive lenses in the first lens group between a g line and an F line is θ1p, and an average of partial dispersion ratios of all the negative lenses in the first lens group between the g line and the F line is θ1n, it is preferable to satisfy Conditional Expressions (7) and (8).

$$5 < \nu1p - \nu1n < 35 \tag{7}$$

$$0 < \theta1n - \theta1p < 0.05 \tag{8}$$

In the imaging lens of the above aspect of the present disclosure, it is preferable that the second lens group includes at least one positive lens and at least one negative lens. Assuming that an average of Abbe numbers of all positive lenses in the second lens group based on a d line is ν2p, an average of Abbe numbers of all negative lenses in the second lens group based on the d line is ν2n, an average of partial dispersion ratios of all the positive lenses in the second lens group between a g line and an F line is θ2p, and an average of partial dispersion ratios of all the negative lenses in the second lens group between the g line and the F line is θ2n, it is preferable to satisfy Conditional Expressions (9) and (10).

$$-10 < \nu2p - \nu2n < 35 \tag{9}$$

$$-0.03 < \theta2n - \theta2p < 0.07 \tag{10}$$

In the imaging lens of the above aspect of the present disclosure, assuming that a maximum of partial dispersion ratios of the positive lenses in the first lens group between a g line and an F line is θ1 max, it is preferable to satisfy Conditional Expression (11).

$$0.56 < \theta1 \text{ max} < 0.7 \tag{11}$$

In the imaging lens of the above aspect of the present disclosure, it is preferable that the second lens group includes at least one positive lens. Assuming that a maximum of partial dispersion ratios of positive lenses in the second lens group between a g line and an F line is θ2 max, it is preferable to satisfy Conditional Expression (12).

$$0.59 < \theta2 \text{ max} < 0.7 \tag{12}$$

In the imaging lens of the above aspect of the present disclosure, assuming that a focal length of the first lens group is f1, and a composite focal length of the second lens group and the third lens group is f23, it is preferable to satisfy Conditional Expression (13).

$$1 < f1/f23 < 3.5 \tag{13}$$

The imaging lens according to the aspect of the present disclosure may be configured to further comprise a subsequent group that is disposed to be subsequent to the third lens group on the image side of the third lens group and remains stationary with respect to the image plane during focusing. Alternatively, the imaging lens according to the aspect of the present disclosure may be configured to comprise a first lens group, a second lens group, a stop, and a third lens group.

An imaging apparatus according to another aspect of the present disclosure comprises the imaging lens according to the aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~group that has a positive refractive power" in the present specification means that the group has a positive refractive power as a whole. Likewise, the "~group having a negative refractive power" means that the group has a negative refractive power as a whole. "A lens having a positive refractive power", "a lens having a positive power", and "a positive lens" are synonymous. "A lens having a negative refractive power", "a lens having a negative power", and "a negative lens" are synonymous. Regarding the arrangement order, the phrase "in order from the object side to the image side" and the phrase "in order from the object side" are synonymous. Regarding aberrations, the term "high order" means 5th or more order.

The "lens group" is not limited to a configuration using a plurality of lenses, but may consist of only one lens. A compound aspheric lens (a lens which is integrally composed of a spherical lens and a film having an aspheric shape formed on the spherical lens, and functions as one aspheric lens as a whole) is not be considered as a cemented lens, and is treated as a single lens. Unless otherwise specified, the sign of the refractive power, the surface shape of the lens surface, and the radius of curvature of a lens including an aspheric surface are considered in the paraxial region. The sign of the radius of curvature of the surface convex toward the object side is positive and the sign of the radius of curvature of the surface convex toward the image side is negative.

The "focal length" used in a conditional expression is a paraxial focal length. The values used in the conditional expressions are values in the case of using the d line as a reference in a state where the object at infinity is in focus. The partial dispersion ratio θgF between the g line and the F line of a certain lens is defined by θgF=(Ng−NF)/(NF−NC), where Ng, NF, and NC are the refractive indices of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens, which has high optical performance by achieving a small F number and reduction in weight of a focus group and satisfactorily correcting aberrations, and an imaging apparatus comprising the imaging lens.

DESCRIPTION OF THE PREFERRED EMBODIMENTS

Figure 1:
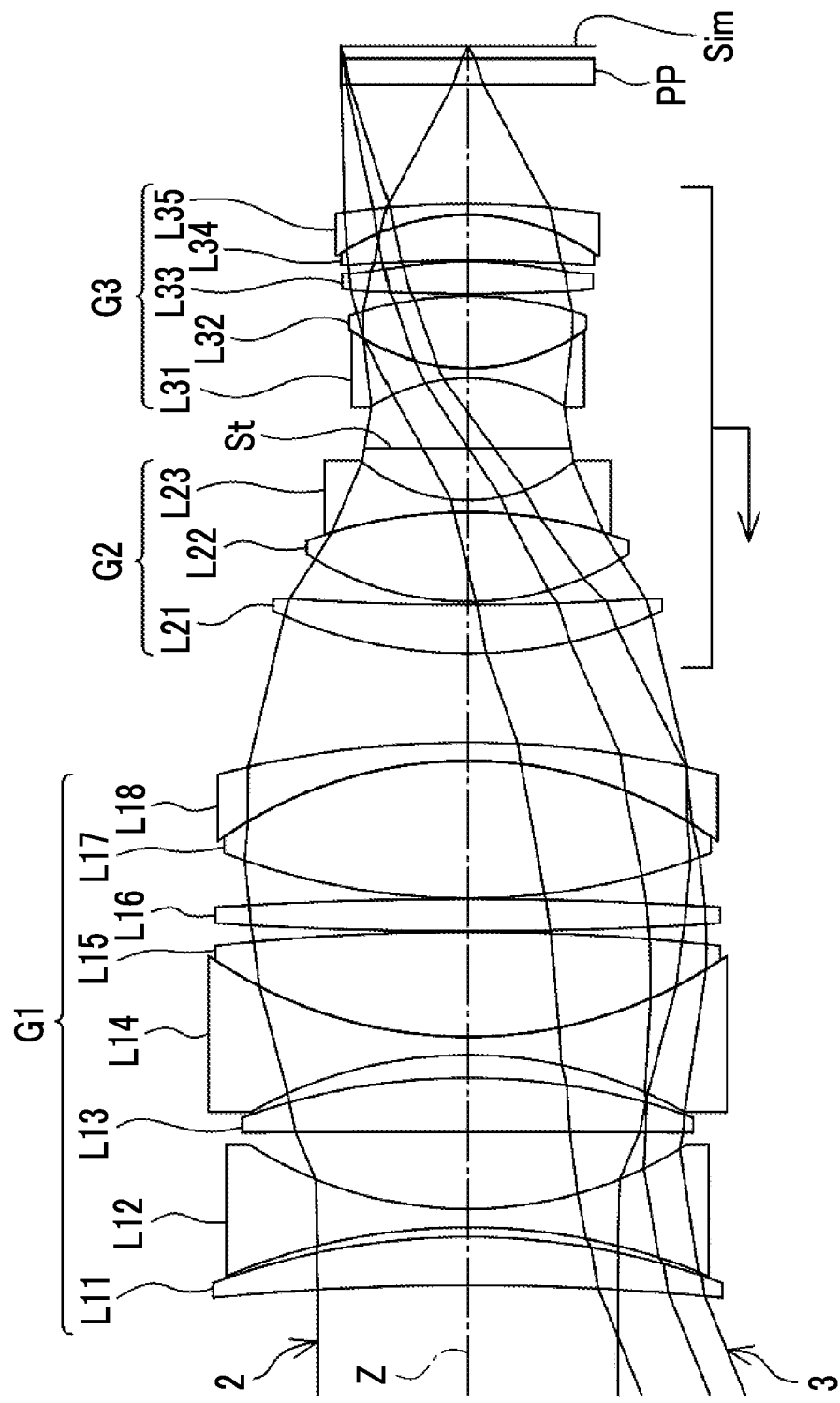
FIG. 1 is a cross-sectional view showing a configuration and rays of a first configuration example of an imaging lens according to an embodiment of the present disclosure corresponding to the imaging lens of Example 1 of the present disclosure.

Hereinafter, embodiments of the present disclosure will be described in detail with reference to the accompanying drawings. FIG. 1 is a diagram showing a cross-sectional configuration of a first configuration example of an imaging lens according to an embodiment of the present disclosure. The example shown in FIG. 1 corresponds to the imaging lens of Example 1 to be described later. FIG. 1 shows a state in which the object at infinity is in focus, and shows on-axis rays 2 and rays with the maximum angle of view 3, where the left side is the object side and the right side is the image side. Similarly, FIGS. 2 to 13 show cross-sectional configurations of second to thirteenth configuration examples of the imaging lens according to an embodiment of the present disclosure, respectively. The examples shown in FIGS. 2 to 13 correspond to imaging lenses of Examples 2 to 13 described later, respectively. Since the basic configurations of the examples shown in FIGS. 1 to 13 are the same, the following description will be given mostly with reference to FIG. 1.

It should be noted that FIG. 1 shows an example in which an optical member PP having a parallel plate shape is disposed between an imaging lens and an image plane Sim under assumption that the imaging lens is applied to the imaging apparatus. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens according to the present disclosure is a single-focus lens, and comprises, successively in order from the object side to the image side along the optical axis Z, a first lens group G1 having a positive refractive power, and a second lens group G2, an aperture stop St, and a third lens group G3 having a positive refractive power. Further, the aperture stop St shown in FIG. 1 does not indicate a shape thereof, but indicates a position thereof on the optical axis. Since positive refractive powers are respectively disposed on the object side and the image side of the aperture stop St, there is an advantage in correcting distortion and coma aberration. In addition, the third lens group G3 has a positive refractive power, and is thus able to have a main imaging function of the whole system, and there is an advantage in reducing the incident angle of the principal ray with the maximum angle of view on the image plane Sim.

In the imaging lens shown in FIG. 1, the first lens group G1 consists of eight lenses L11 to L18 in order from the object side, the second lens group G2 consists of three lenses L21 to L23 in order from the object side, and the third lens group G3 consists of five lenses L31 to L35 in order from the object side. However, in the imaging lens of the present disclosure, the number of lenses composing each lens group may be different from that in the example shown in FIG. 1. The imaging lens of the present disclosure may further comprise a lens group as a subsequent group on the image side of the third lens group G3.

During focusing from the object at infinity to the closest object, the lens-to-lens distance in each lens group is unchangeable, the first lens group G1 remains stationary with respect to the image plane Sim, and the second lens group G2, the aperture stop St, and the third lens group G3 move integrally along the optical axis Z as focus groups. It should be noted that the term "move integrally" means moving in the same amount and in the same direction at the same time. All the lenses in the second lens group G2 move integrally during focusing. The third lens group G3 consists of all the lenses that are arranged closer to the image side than the aperture stop St and move integrally with the second lens group G2 during focusing. In a case where a subsequent group is further provided on the image side of the third lens group G3, none of the lenses in the subsequent group moves integrally with the second lens group G2 during focusing. The horizontal left arrow under the focus group shown in FIG. 1 means that the focus group moves to the object side during focusing from the object at infinity to the closest object.

Since the first lens group G1 has a positive refractive power, the rays emitted from the first lens group G1 are converged and are incident into the second lens group G2. Therefore, it becomes easy to reduce the diameter of the lens of the focus group. As a result, the focus group can be reduced in size and weight. As a result, it becomes easy to deal with an increase in speed of autofocus.

The first lens group G1 remains stationary during focusing, and the entire lens system is moved during focusing by integrally moving the second lens group G2, the aperture stop St, and the third lens group G3. As compared with the configuration, the focus group can be reduced in weight, and fluctuation in field curvature during focusing can be reduced. By arranging lens groups that move during focusing on the object side and the image side of the aperture stop St, it becomes easy to suppress fluctuation in lateral chromatic aberration during focusing. It should be noted that the configuration is made such that the composite focal length of the second lens group G2 and the third lens group G3 is positive. As a result, there is an advantage in suppressing fluctuations in spherical aberration during focusing.

In the configuration of the imaging lens of the present disclosure, assuming that a maximum value of a height of a paraxial ray from an optical axis Z in the first lens group G1 is H1 max, in a case in which paraxial ray tracing is performed by causing the paraxial ray, whose height from the optical axis Z on a lens surface closest to the object is H1f and which is parallel to the optical axis Z, to be incident from the object side, Conditional Expression (1) is satisfied. H1 max/H1f in Conditional Expression (1) can be obtained from the value of H1 max, for example, in a case where paraxial ray tracing is performed by causing a paraxial ray parallel to the optical axis Z to be incident from the object side, where H1f=1. By not allowing the result of Conditional Expression (1) to be equal to or less than the lower limit, it is possible to suppress occurrence of sagittal coma aberration. By not allowing the result of Conditional Expression (1) to be equal to or greater than the upper limit, it is possible to prevent spherical aberration from being insufficiently corrected. Therefore, there is an advantage in realizing an optical system having a small F number. In addition, in a case of a configuration in which Conditional Expression (1-1) is satisfied, it is possible to obtain more favorable characteristics.

$$1.1 < H1\ max/H1f < 2 \quad (1)$$

$$1.2 < H1\ max/H1f < 1.8 \quad (1\text{-}1)$$

Figure 40:
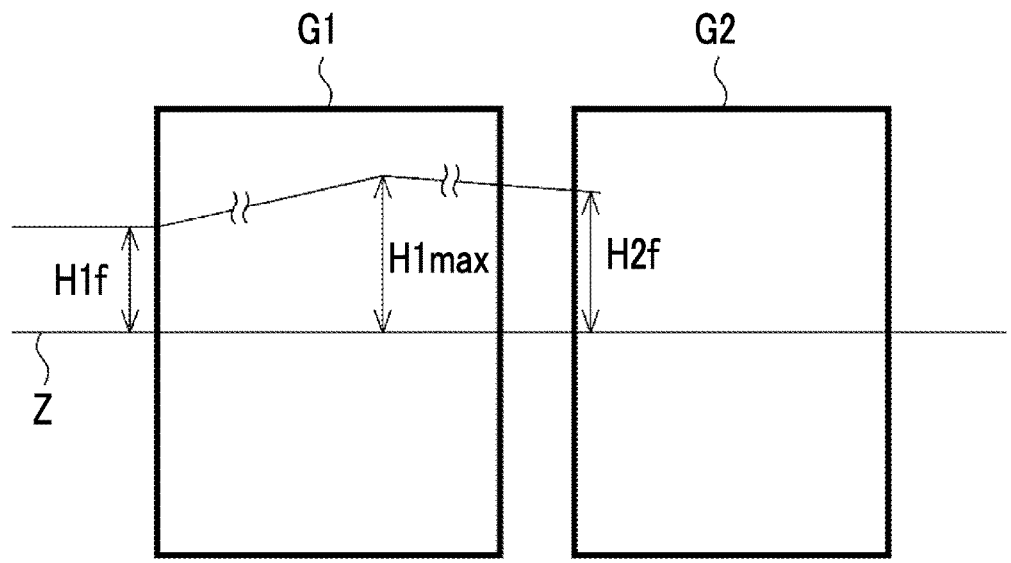
FIG. 40 is a conceptual diagram of H1f, H1 max, and H2f.

As an example, FIG. 40 shows a conceptual diagram of H1f and H1 max. The inclinations and a height of the ray shown in FIG. 40 are not necessarily accurate. The plane where the height of the paraxial ray from the optical axis Z is H1 max (hereinafter referred to as an Hm plane) is a plane in which the sign of the angle formed by the paraxial ray and the optical axis Z changes, that is, rays change from a divergence state to a convergence state. In a system where a positive refractive power is provided to be closer to the image side than the Hm plane as in the imaging lens of the present disclosure, the exit angle of the paraxial ray from the Hm plane can be made relatively small. Therefore, in a case where the exit angle is set to be close to 0, the optical system from the surface closest to the object side in the whole system to the Hm plane is substantially an afocal system, and the whole system from the surface closest to the object side to the Hm plane can be regarded as a wide converter. It should be noted that even in a case where the lens is not strictly an afocal system, the angular magnification can be considered as in the afocal system.

Here, for explanation, the optical system is divided by the Hm plane, a portion in a range from the surface closest to the object side in the whole system to the Hm plane is referred to as an A lens group GA, and a portion in a range from the Hm plane to the surface closest to the image side in the whole system is referred to as a B lens group GB. With the above wide converter configuration, the focal length of the B lens group GB can be made longer than the focal length of the whole system. That is, the angle of view of the B lens group GB can be made smaller than the angle of view of the whole system.

Figure 41:
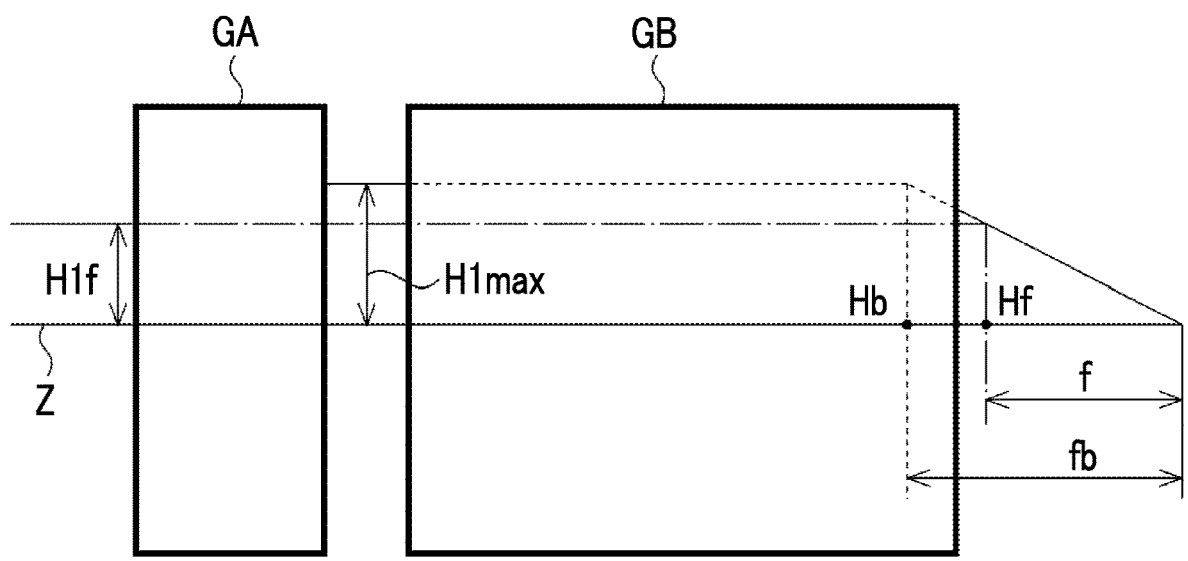
FIG. 41 is a conceptual diagram for describing a configuration relating to Conditional Expression (1).

FIG. 41 shows a conceptual diagram in a case where the A lens group GA is an afocal system. As shown in FIG. 41, by making H1 max larger than H1f, the image side principal point position Hf of the whole system can be set to be closer to the image side than the image side principal point position Hb of the B lens group GB. Thus, the focal length fb of the B lens group GB can be made longer than the focal length f of the whole system. That is, the angle of view of the B lens group GB can be made smaller than the angle of view of the whole system. As the angle of view becomes smaller, correction of sagittal coma aberration becomes easier. Therefore, the configuration of the present disclosure is advantageous in correcting sagittal coma aberration.

More specifically, the first lens group G1 is configured to include at least four positive lenses and at least three negative lenses. With such a configuration, by not allowing the result of Conditional Expression (1) to be equal to or less than the lower limit, it is possible to suppress occurrence of higher-order spherical aberration and occurrence of difference in spherical aberration depending on wavelength. Further, since the first lens group G1 includes four or more positive lenses and three or more negative lenses, it is possible to provide a plurality of combinations of positive lenses and negative lenses. Thus, materials having various partial dispersion ratios are selectable, and both correction of first-order chromatic aberration and second-order chromatic aberration can be achieved. In order to reduce the size, the number of positive lenses included in the first lens group G1 is preferably equal to or less than 6. Similarly, in order to reduce the size, the number of negative lenses included in the first lens group G1 is preferably equal to or less than 5, and more preferably equal to or less than 4.

Next, a preferable configuration and a possible configuration of the imaging lens of the present disclosure will be described. Assuming that the maximum value of a height of a paraxial ray from the optical axis Z in the first lens group G1 is H1 max, in a case in which paraxial ray tracing is performed by causing the paraxial ray, whose height from the optical axis Z on a lens surface closest to the object is H1f and which is parallel to the optical axis Z, to be incident from the object side, and a height of the paraxial ray from the optical axis Z on the lens surface closest to the object side in the second lens group G2 is H2f, it is preferable to satisfy Conditional Expression (2). By not allowing the result of Conditional Expression (2) to be equal to or less than the lower limit, it is possible to suppress occurrence of sagittal coma aberration. Further, since the effective diameter of the lens of the focus group can be reduced, there is an advantage in reducing the weight of the focus group. Furthermore, spherical aberration occurring in the second lens group G2 can be suppressed. By not allowing the result of Conditional Expression (2) to be equal to or greater than the upper limit, it becomes easy to reduce the amount of movement of the focus group during focusing while maintaining an appropriate back focal length. In addition, it becomes easy to suppress spherical aberration occurring in the first lens group G1. In addition, in a case of a configuration in which Conditional Expression (2-1) is satisfied, it is possible to obtain more favorable characteristics.

$$1 < H1\ max/H2f < 1.5 \quad (2)$$

$$1.05 < H1\ max/H2f < 1.3 \quad (2\text{-}1)$$

Regarding H1f and H2f respectively used in Conditional Expressions (1) and (2), it is preferable to satisfy Conditional Expression (3). By not allowing the result of Conditional Expression (3) to be equal to or less than the lower limit, it is possible to suppress occurrence of spherical aberration. By not allowing the result of Conditional Expression (3) to be equal to or greater than the upper limit, it is possible to suppress occurrence of sagittal coma aberration. In addition, in a case of a configuration in which Conditional Expression (3-1) is satisfied, it is possible to obtain more favorable characteristics.

$$0.5 < H1f/H2f < 1 \quad (3)$$

$$0.55 < H1f/H2f < 0.95 \quad (3\text{-}1)$$

The second lens group G2 may be configured to consist of two positive lenses and one negative lens. Alternatively, the second lens group G2 may be configured to consist of three positive lenses and one negative lens. Since the second lens group G2 has two or more positive lenses, it becomes easy to reduce the amount of spherical aberration. By reducing the number of positive lenses included in the second lens group G2 to three or less, there is an advantage in achieving reduction in size. Since the second lens group G2 has one negative lens, there is an advantage in correcting spherical aberration and longitudinal chromatic aberration.

It is preferable that the second lens group G2 and the third lens group G3 each include at least one negative lens. In such a case, the image side surface of the negative lens closest to the image side in the second lens group G2 is a concave surface. In addition, it is preferable that the object side surface of the negative lens closest to the object side in the third lens group G3 is a concave surface. That is, it is preferable that the lens surface on the aperture stop St side of the negative lens closest to the aperture stop St on the object side and the image side of the aperture stop St is a concave surface. In such a case, spherical aberration and longitudinal chromatic aberration can be corrected by the concave surface, and occurrence of coma aberration can be suppressed by the concave surface disposed to be symmetric with respect to the aperture stop St. Further, the Petzval sum can be corrected by the negative refractive powers of the two concave surfaces.

It is preferable that the second lens group G2 and the third lens group G3 each includes at least one negative lens. In this configuration, an image side surface of the negative lens closest to the image side in the second lens group G2 is a concave surface, and an object side surface of the negative lens closest to the object side in the third lens group G3 is a concave surface. In this configuration, assuming that a radius of curvature of the image side surface of the negative lens closest to the image side in the second lens group G2 is Rso, and a radius of curvature of the object side surface of the negative lens closest to the object side in the third lens group G3 is Rsi, it is preferable to satisfy Conditional Expression (4). By satisfying Conditional Expression (4), it is possible to suppress overcorrection of higher-order spherical aberration. In addition, in a case of a configuration in which Conditional Expression (4-1) is satisfied, it is possible to obtain more favorable characteristics.

$$-0.4 < (Rso+Rsi)/(Rso-Rsi) < 0.2 \quad (4)$$

$$-0.3 < (Rso+Rsi)/(Rso-Rsi) < 0.15 \quad (4\text{-}1)$$

Assuming that a combined lateral magnification of the second lens group G2 and the third lens group G3 in a state where the object at infinity is in focus is β23, it is preferable to satisfy Conditional Expression (5). In a case where the sensitivity of focusing becomes excessively high, there is a concern that the focus group does not stop stably in the autofocusing operation. By not allowing the result of Conditional Expression (5) to be equal to or less than the lower limit, it is possible to suppress the strictness in accuracy of the stopping of the focus group in the focusing operation, thereby preventing such a problem from arising. By not allowing the result of Conditional Expression (5) to be equal to or greater than the upper limit, there is an advantage in reducing the amount of movement of the focus group during focusing. In addition, in a case of a configuration in which Conditional Expression (5-1) is satisfied, it is possible to obtain more favorable characteristics.

$$0.2 < \beta 23 < 0.8 \quad (5)$$

$$0.3 < \beta 23 < 0.6 \quad (5\text{-}1)$$

Assuming that a combined lateral magnification of the second lens group G2 and the third lens group G3 in a state where the object at infinity is in focus is β23, a combined lateral magnification of all lenses closer to the image side than the third lens group G3 in a state where the object at infinity is in focus in a case where a lens is disposed closer to the image side than the third lens group G3 is βr, and βr=1 in a case where no lens is disposed closer to the image side than the third lens group G3, it is preferable to satisfy Conditional Expression (6). By not allowing the result of Conditional Expression (6) to be equal to or less than the lower limit, there is an advantage in reducing the amount of movement of the focus group during focusing. By not allowing the result of Conditional Expression (6) to be equal to or greater than the upper limit, it is possible to suppress the strictness in accuracy of the stopping of the focus group in the focusing operation. In addition, in a case of a configuration in which Conditional Expression (6-1) is satisfied, it is possible to obtain more favorable characteristics.

$$0.7 < (1-\beta 23^2) \times \beta r^2 < 1.2 \quad (6)$$

$$0.75 < (1-\beta 23^2) \times \beta r^2 < 1 \quad (6\text{-}1)$$

It is preferable that the first lens group G1 includes at least three biconvex lenses. In such a case, it is possible to suppress occurrence of high-order spherical aberration. In addition, in order to reduce the size, the number of biconvex lenses included in the first lens group G1 is preferably equal to or less than 5, and more preferably equal to or less than 4. It is preferable that the first lens group G1 includes at least two biconcave lenses. In such a case, it is possible to suppress occurrence of high-order spherical aberration. In addition, in order to reduce the size, the number of biconcave lenses included in the first lens group G1 is preferably equal to or less than 4, and more preferably equal to or less than 3.

Assuming that an average of Abbe numbers of all the positive lenses in the first lens group G1 based on a d line is ν1p and an average of Abbe numbers of all the negative lenses in the first lens group G1 based on the d line is ν1n, it is preferable to satisfy Conditional Expression (7). By not allowing the result of Conditional Expression (7) to be equal to or less than the lower limit, correction of first-order chromatic aberration becomes easy. By not allowing the result of Conditional Expression (7) to be equal to or greater than the upper limit, correction of second-order chromatic aberration becomes easy. In addition, in a case of a configuration in which Conditional Expression (7-1) is satisfied, it is possible to obtain more favorable characteristics.

$$5 < \nu 1p - \nu 1n < 35 \quad (7)$$

$$7 < \nu 1p - \nu 1n < 30 \quad (7\text{-}1)$$

Assuming that an average of partial dispersion ratios of all the positive lenses in the first lens group G1 between a g line and an F line is θ1p and an average of partial dispersion ratios of all the negative lenses in the first lens group G1 between the g line and the F line is θ1n, it is preferable to satisfy Conditional Expression (8). By not allowing the result of Conditional Expression (8) to be equal to or less than the lower limit, correction of first-order chromatic aberration becomes easy. By not allowing the result of Conditional Expression (8) to be equal to or greater than the upper limit, correction of second-order chromatic aberration becomes easy. In addition, in a case of a configuration in which Conditional Expression (8-1) is satisfied, it is possible to obtain more favorable characteristics.

$$0 < \theta 1n - \theta 1p < 0.05 \quad (8)$$

$$0.005 < \theta 1n - \theta 1p < 0.045 \quad (8\text{-}1)$$

It is more preferable that Conditional Expression (7) and Conditional Expression (8) are simultaneously satisfied. It is even more preferable that Conditional Expressions (7) and (8) are simultaneously satisfied, and at least one of Conditional Expression (7-1) or (8-1) is satisfied.

It is preferable that the second lens group G2 includes at least one positive lens and at least one negative lens. In this configuration, assuming that an average of Abbe numbers of all positive lenses in the second lens group G2 based on a d line is ν2p and an average of Abbe numbers of all negative lenses in the second lens group G2 based on the d line is ν2n, it is preferable to satisfy Conditional Expression (9). By not allowing the result of Conditional Expression (9) to be equal to or less than the lower limit, correction of first-order chromatic aberration becomes easy. By not allowing the result of Conditional Expression (9) to be equal to or greater than the upper limit, correction of second-order chromatic aberration becomes easy. In addition, in a case of a configuration in which Conditional Expression (9-1) is satisfied, it is possible to obtain more favorable characteristics.

$$-10 < \nu 2p - \nu 2n < 35 \quad (9)$$

$$-5 < \nu 2p - \nu 2n < 30 \quad (9\text{-}1)$$

It is preferable that the second lens group G2 includes at least one positive lens and at least one negative lens. In the configuration, assuming that an average of partial dispersion ratios of all the positive lenses in the second lens group G2 between a g line and an F line is θ2p and an average of partial dispersion ratios of all the negative lenses in the second lens group G2 between the g line and the F line is θ2n, it is preferable to satisfy Conditional Expression (10). By not allowing the result of Conditional Expression (10) to be equal to or less than the lower limit, correction of first-order chromatic aberration becomes easy. By not allowing the result of Conditional Expression (10) to be equal to or greater than the upper limit, correction of second-order chromatic aberration becomes easy. In addition, in a case of a configuration in which Conditional Expression (10-1) is satisfied, it is possible to obtain more favorable characteristics.

$$-0.03 < \theta 2n - \theta 2p < 0.07 \quad (10)$$

$$-0.02 < \theta 2n - \theta 2p < 0.06 \quad (10\text{-}1)$$

It is more preferable that Conditional Expressions (9) and (10) are simultaneously satisfied. It is even more preferable that Conditional Expressions (9) and (10) are simultaneously satisfied, and at least one of Conditional Expression (9-1) or (10-1) is satisfied.

Assuming that a maximum of partial dispersion ratios of the positive lenses in the first lens group G1 between the g line and the F line is θ1 max, it is preferable to satisfy Conditional Expression (11). By satisfying Conditional Expression (11), it becomes easy to appropriately correct second-order chromatic aberration. In addition, in a case of a configuration in which Conditional Expression (11-1) is satisfied, it is possible to obtain more favorable characteristics.

$$0.56 < \theta 1 \max < 0.7 \quad (11)$$

$$0.58 < \theta 1 \max < 0.68 \quad (11\text{-}1)$$

It is preferable that the second lens group G2 includes at least one positive lens. In this configuration, assuming that a maximum of partial dispersion ratios of positive lenses in the second lens group G2 between a g line and an F line is θ2 max, it is preferable to satisfy Conditional Expression (12). By satisfying Conditional Expression (12), it becomes easy to appropriately correct second-order chromatic aberration. In addition, in a case of a configuration in which Conditional Expression (12-1) is satisfied, it is possible to obtain more favorable characteristics.

$$0.59 < \theta 2 \max < 0.7 \quad (12)$$

$$0.6 < \theta 2 \max < 0.68 \quad (12\text{-}1)$$

Assuming that a focal length of the first lens group G1 is f1 and a composite focal length of the second lens group G2 and the third lens group G3 is f23, it is preferable to satisfy Conditional Expression (13). By not allowing the result of Conditional Expression (13) to be equal to or less than the lower limit, there is an advantage in reducing the amount of movement of the focus group during focusing. By not allowing the result of Conditional Expression (13) to be equal to or greater than the upper limit, there is an advantage in correction of spherical aberration. In addition, in a case of a configuration in which Conditional Expression (13-1) is satisfied, it is possible to obtain more favorable characteristics.

$$1 < f1/f23 < 3.5 \quad (13)$$

$$1.2 < f1/f23 < 3 \quad (13\text{-}1)$$

Assuming that a focal length of the third lens group G3 is f3 and a focal length of the second lens group G2 is f2, it is preferable to satisfy Conditional Expression (14). By not allowing the result of Conditional Expression (14) to be equal to or less than the lower limit, there is an advantage in correcting spherical aberration and coma aberration. By not allowing the result of Conditional Expression (14) to be equal to or greater than the upper limit, it becomes easy to ensure an appropriate back focal length. In addition, in a case of a configuration in which Conditional Expression (14-1) is satisfied, it is possible to obtain more favorable characteristics.

$$-0.3 < f3/f2 < 0.4 \quad (14)$$

$$-0.2 < f3/f2 < 0.3 \quad (14\text{-}1)$$

Assuming that a focal length of the imaging lens in a state where the object at infinity is in focus is f, and a focal length of the first lens group G1 is f1, it is preferable to satisfy Conditional Expression (15). By not allowing the result of Conditional Expression (15) to be equal to or less than the lower limit, there is an advantage in shortening the total length of the lens system. By not allowing the result of Conditional Expression (15) to be equal to or greater than the upper limit, there is an advantage in reducing the amount of movement of the focus group during focusing, and it becomes easy to ensure an appropriate back focal length. In addition, in a case of a configuration in which Conditional Expression (15-1) is satisfied, it is possible to obtain more favorable characteristics.

$$0.2 < f/f1 < 0.6 \quad (15)$$

$$0.25 < f/f1 < 0.55 \quad (15\text{-}1)$$

Assuming that a focal length of the imaging lens in a state where the object at infinity is in focus is f, and a focal length of the second lens group G2 is f2, it is preferable to satisfy Conditional Expression (16). By not allowing the result of Conditional Expression (16) to be equal to or less than the lower limit, there is an advantage in correcting spherical aberration and coma aberration. By not allowing the result of Conditional Expression (16) to be equal to or greater than the upper limit, it becomes easy to ensure an appropriate back focal length. In addition, in a case of a configuration in which Conditional Expression (16-1) is satisfied, it is possible to obtain more favorable characteristics.

$$-0.4 < f/f2 < 0.4 \tag{16}$$

$$-0.25 < f/f2 < 0.3 \tag{16-1}$$

Assuming that a focal length of the imaging lens in a state where the object at infinity is in focus is f, and a focal length of the third lens group G3 is f3, it is preferable to satisfy Conditional Expression (17). By not allowing the result of Conditional Expression (17) to be equal to or less than the lower limit, there is an advantage in reducing the incident angle of the principal ray, which has the maximum angle of view, incident on the image plane Sim. By not allowing the result of Conditional Expression (17) to be equal to or greater than the upper limit, there is an advantage in correction of spherical aberration. In addition, in a case of a configuration in which Conditional Expression (17-1) is satisfied, it is possible to obtain more favorable characteristics.

$$0.5 < f/f3 < 1.5 \tag{17}$$

$$0.7 < f/f3 < 1.4 \tag{17-1}$$

It is preferable that the first lens group G1 includes at least two cemented lenses in which at least one positive lens and at least one negative lens are cemented. In such a case, there is an advantage in correcting longitudinal chromatic aberration and lateral chromatic aberration in a balanced manner. In order to reduce the size of the lens system, the number of cemented lenses included in the first lens group G1 is preferably equal to or less than 4.

In a case where the first lens group G1 includes two or more cemented lenses, it is preferable that the cemented lens which is second from the image side in the first lens group G1 has a cemented surface concave toward the image side. In such a case, it becomes easy to correct longitudinal chromatic aberration without greatly changing lateral chromatic aberration. It is preferable that the cemented lens closest to the image side in the first lens group G1 has a cemented surface concave toward the object side. In such a case, there is an advantage in correcting lateral chromatic aberration at the low angle of view and lateral chromatic aberration at the wide angle of view in a balanced manner. Hereinafter, for convenience of explanation, a cemented surface concave toward the image side of the cemented lens which is second from the image side in the first lens group G1 is referred to as an A cemented surface, and a cemented surface concave toward the object side of the cemented lens closest to the image side in the first lens group G1 is referred to as a B cemented surface.

Assuming that a radius of curvature of the A cemented surface is RA and a radius of curvature of the B cemented surface is RB, it is preferable to satisfy Conditional Expression (18). By not allowing the result of Conditional Expression (18) to be equal to or less than the lower limit, there is an advantage in correcting astigmatism and coma aberration. By not allowing the result of Conditional Expression (18) to be equal to or greater than the upper limit, there is an advantage in correction of spherical aberration. In addition, in a case of a configuration in which Conditional Expression (18-1) is satisfied, it is possible to obtain more favorable characteristics.

$$-0.4 < (RA+RB)/(RA-RB) < 0.4 \tag{18}$$

$$-0.2 < (RA+RB)/(RA-RB) < 0.2 \tag{18-1}$$

In a case where the A cemented surface has a positive refractive power, there is an advantage in correcting distortion. It is preferable that the A cemented surface is a surface where two lenses having different refractive powers are cemented. In that case, it is preferable that the Abbe number of the positive lens composing the A cemented surface based on the d line is smaller than the Abbe number of the negative lens composing the A cemented surface based on the d line. In such a case, there is an advantage in correcting lateral chromatic aberration.

In a case where the B cemented surface has a negative refractive power, there is an advantage in correcting spherical aberration. It is preferable that the B cemented surface is a surface where two lenses having different refractive powers are cemented. In that case, it is preferable that the Abbe number of the positive lens composing the B cemented surface based on the d line is larger than the Abbe number of the negative lens composing the B cemented surface based on the d line. In such a case, there is an advantage in correcting longitudinal chromatic aberration.

In the configuration in which the first lens group G1 includes two or more cemented lenses in which at least one positive lens and at least one negative lens are cemented, assuming that an average of refractive indices of all the positive lenses in the cemented lens, which is second from the image side in the first lens group G1, at the d line is Nce1Ap and an average of refractive indices of all the negative lenses in the cemented lens, which is second from the image side in the first lens group G1, at the d line is Nce1An, it is preferable to satisfy Conditional Expression (19). By not allowing the result of Conditional Expression (19) to be equal to or less than the lower limit, the absolute value of the Petzval sum is reduced, and there is an advantage in reducing the field curvature. By not allowing the result of Conditional Expression (19) to be equal to or greater than the upper limit, it is possible to suppress occurrence of distortion in the entire cemented lens which is second from the image side in the first lens group G1. In addition, in a case of a configuration in which Conditional Expression (19-1) is satisfied, it is possible to obtain more favorable characteristics.

$$0.1 < Nce1Ap - Nce1An < 0.5 \tag{19}$$

$$0.2 < Nce1Ap - Nce1An < 0.45 \tag{19-1}$$

In the configuration in which the first lens group G1 includes two or more cemented lenses in which at least one positive lens and at least one negative lens are cemented, assuming that an average of Abbe numbers of all the positive lenses in the cemented lens, which is second from the image side in the first lens group G1, based on the d line is vce1Ap and an average of Abbe numbers of all the negative lenses in the cemented lens, which is second from the image side in the first lens group G1, based on the d line is vce1An, it is preferable to satisfy Conditional Expression (20). By not allowing the result of Conditional Expression (20) to be equal to or less than the lower limit, it becomes easy to prevent longitudinal chromatic aberration from becoming large. By not allowing the result of Conditional Expression (20) to be equal to or greater than the upper limit, it is possible to suppress occurrence of lateral chromatic aberration and second-order longitudinal chromatic aberration, and to suppress the difference in spherical aberration depending on wavelength and the difference in astigmatism depending on wavelength. In addition, in a case of a configuration in which Conditional Expression (20-1) is satisfied, it is possible to obtain more favorable characteristics.

$$-30 < \nu ce1Ap - \nu ce1An < 10 \tag{20}$$

$$-25 < \nu ce1Ap - \nu ce1An < 5 \tag{20-1}$$

It is more preferable that Conditional Expressions (19) and (20) are simultaneously satisfied. It is even more preferable that Conditional Expressions (19) and (20) are simultaneously satisfied, and at least one of Conditional Expression (19-1) or (20-1) is satisfied.

In the configuration in which the first lens group G1 includes a cemented lens in which at least one positive lens and at least one negative lens are cemented, assuming that an average of refractive indices of all the positive lenses in the cemented lens, which is closest to the image side in the first lens group G1, at the d line is Nce1Bp and an average of refractive indices of all the negative lenses in the cemented lens, which is closest to the image side in the first lens group G1, at the d line is Nce1Bn, it is preferable to satisfy Conditional Expression (21). By not allowing the result of Conditional Expression (21) to be equal to or less than the lower limit, the absolute value of the Petzval sum is reduced, and there is an advantage in reducing the field curvature. The result of Conditional Expression (21) is not allowed to be equal to or less than the lower limit, then the absolute value of the difference in refractive index between the positive lens and the negative lens is reduced such that the result of Conditional Expression (21) is not allowed to be equal to or greater than the upper limit, and materials are selected to satisfy Conditional Expression (22). Thereby, it is possible to correct longitudinal chromatic aberration and chromatic coma aberration occurring in other lenses composing the imaging lens in a balanced manner while suppressing the effect on the monochromatic aberration of the cemented surface. In addition, in a case of a configuration in which Conditional Expression (21-1) is satisfied, it is possible to obtain more favorable characteristics.

$$-0.5 < Nce1Bp - Nce1Bn < 0.3 \tag{21}$$

$$-0.4 < Nce1Bp - Nce1Bn < 0.2 \tag{21-1}$$

In the configuration in which the first lens group G1 includes a cemented lens in which at least one positive lens and at least one negative lens are cemented, assuming that an average of Abbe numbers of all the positive lenses in the cemented lens, which is closest to the image side in the first lens group G1, based on the d line is $\nu$ce1Bp and an average of Abbe numbers of all the negative lenses in the cemented lens, which is closest to the image side in the first lens group G1, based on the d line is $\nu$ce1Bn, it is preferable to satisfy Conditional Expression (22). By not allowing the result of Conditional Expression (22) to be equal to or less than the lower limit, it becomes easy to prevent longitudinal chromatic aberration from becoming large. By not allowing the result of Conditional Expression (22) to be equal to or greater than the upper limit, it is possible to suppress occurrence of lateral chromatic aberration and second-order longitudinal chromatic aberration, and to suppress the difference in spherical aberration depending on wavelength and the difference in astigmatism depending on wavelength. In addition, in a case of a configuration in which Conditional Expression (22-1) is satisfied, it is possible to obtain more favorable characteristics.

$$10 < \nu ce1Bp - \nu ce1Bn < 80 \tag{22}$$

$$20 < \nu ce1Bp - \nu ce1Bn < 60 \tag{22-1}$$

It is more preferable that Conditional Expressions (21) and (22) are simultaneously satisfied. It is even more preferable that Conditional Expressions (21) and (22) are simultaneously satisfied, and at least one of Conditional Expression (21-1) or (22-1) is satisfied.

In a case where the first lens group G1 includes a cemented lens in which at least one positive lens and at least one negative lens are cemented, it is preferable that the cemented lens closest to the image in the first lens group G1 includes a cemented surface concave toward the object side, and it is preferable to satisfy at least one of Conditional Expression (21) or (22). Since the cemented lens closest to the image side in the first lens group G1 includes the cemented surface and satisfies Conditional Expression (21), there is an advantage in correction of sagittal coma aberration on the cemented surface. Since the cemented lens closest to the image side in the first lens group G1 includes the cemented surface and satisfies Conditional Expression (22), the difference in correction effect of sagittal coma aberration depending on wavelength is less likely to occur.

Assuming that an average of partial dispersion ratios of all positive lenses in the first lens group G1 between the g line and the F line is $\theta 1p$, an average of partial dispersion ratios of all negative lenses in the first lens group G1 between the g line and the F line is $\theta 1n$, an average of Abbe numbers of all positive lenses in the first lens group G1 based on the d line is $\nu 1p$, and an average of Abbe numbers of all negative lenses in the first lens group G1 based on the d line is $\nu 1n$, it is preferable to satisfy Conditional Expression (23). By satisfying Conditional Expression (23), it becomes easy to correct first-order chromatic aberration and second-order chromatic aberration in a balanced manner. In addition, in a case of a configuration in which Conditional Expression (23-1) is satisfied, it is possible to obtain more favorable characteristics.

$$-0.04 < \theta 1p - \theta 1n + 0.00163 \times (\nu 1p - \nu 1n) < 0.03 \tag{23}$$

$$-0.03 < \theta 1p - \theta 1n + 0.00163 \times (\nu 1p - \nu 1n) < 0.025 \tag{23-1}$$

Assuming that a distance on the optical axis from the lens surface closest to the image side in the first lens group G1 to the image side principal point position of the first lens group G1 is P1, and a distance on the optical axis between the first lens group G1 and the second lens group G2 in a state where the object at infinity is in focus is D12, it is preferable to satisfy Conditional Expression (24). However, the sign of P1 is negative in a case where the image side principal point position of the first lens group G1 is closer to the object side than the lens surface closest to the image side in the first lens group G1, and the sign of P1 is positive in a case where the image side principal point position is on the image side. By not allowing the result of Conditional Expression (24) to be equal to or less than the lower limit, there is an advantage in correction of coma aberration. By not allowing the result of Conditional Expression (24) to be equal to or greater than the upper limit, the image side principal point position of the first lens group G1 is prevented from excessively becoming far in the image side direction from the lens surface closest to the image side in the first lens group G1, and thus H1 max can be prevented from increasing. As a result, there is an advantage in reducing the effective diameter of the first lens group G1. Alternatively, by not allowing the result of Conditional Expression (24) to be equal to or greater than the upper limit, the distance between the first lens group G1 and the second lens group G2 is prevented from becoming excessively small, and it is possible to ensure a movable range of the focus group during focusing. As a result, it is possible to shorten the distance from the imaging lens to the closest object which is focusable. In addition, in a case of a configuration in which Conditional Expression (24-1) is satisfied, it is possible to obtain more favorable characteristics.

$$1 < P1/D12 < 20 \tag{24}$$

$$2 < P1/D12 < 10 \tag{24-1}$$

It is preferable that the second lens group G2 includes at least one positive lens and at least one negative lens. In the configuration, assuming that an average of partial dispersion ratios of all the positive lenses in the second lens group G2 between the g line and the F line is θ2p, and an average of partial dispersion ratios of all the negative lenses in the second lens group G2 between the g line and the F line is θ2n, an average of Abbe numbers of all positive lenses in the second lens group G2 based on the d line is ν2p, and an average of Abbe numbers of all negative lenses in the second lens group G2 based on the d line is ν2n, it is preferable to satisfy Conditional Expression (25). By satisfying Conditional Expression (25), it becomes easy to correct first-order chromatic aberration and second-order chromatic aberration in a balanced manner. In addition, in a case of a configuration in which Conditional Expression (25-1) is satisfied, it is possible to obtain more favorable characteristics.

$$-0.02 < \theta 2p - \theta 2n + 0.00163 \times (\nu 2p - \nu 2n) < 0.02 \tag{25}$$

$$-0.02 < \theta 2p - \theta 2n + 0.00163 \times (\nu 2p - \nu 2n) < 0.015 \tag{25-1}$$

It is preferable that the second lens group G2 has a cemented lens in which at least one positive lens and at least one negative lens are cemented. In such a configuration, assuming that a refractive index of the positive lens in the cemented lens closest to the object side in the second lens group G2 at the d line is Nce2p, and a refractive index of the negative lens in the cemented lens closest to the object side in the second lens group G2 at the d line is Nce2n, it is preferable to satisfy Conditional Expression (26). By not allowing the result of Conditional Expression (26) to be equal to or less than the lower limit, the absolute value of the Petzval sum is reduced, and there is an advantage in reducing the field curvature. The result of Conditional Expression (26) is not allowed to be equal to or less than the lower limit, then the absolute value of the difference in refractive index between the positive lens and the negative lens is reduced such that the result of Conditional Expression (26) is not allowed to be equal to or greater than the upper limit, and materials are selected to satisfy Conditional Expression (27). Thereby, it is possible to correct longitudinal chromatic aberration and chromatic coma aberration occurring in other lenses composing the imaging lens in a balanced manner while suppressing the effect on the monochromatic aberration of the cemented surface. In addition, in a case of a configuration in which Conditional Expression (26-1) is satisfied, it is possible to obtain more favorable characteristics.

$$-0.5 < Nce2p - Nce2n < 0.4 \tag{26}$$

$$-0.4 < Nce2p - Nce2n < 0.3 \tag{26-1}$$

In the configuration in which the second lens group G2 includes a cemented lens in which at least one positive lens and at least one negative lens are cemented, assuming that an Abbe number of the positive lens in the cemented lens closest to the object side in the second lens group G2 based on the d line is νce2p and an Abbe number of the negative lens in the cemented lens closest to the object in the second lens group G2 based on the d line is νce2n, it is preferable to satisfy Conditional Expression (27). By not allowing the result of Conditional Expression (27) to be equal to or less than the lower limit, correction of longitudinal chromatic aberration becomes easy. By not allowing the result of Conditional Expression (27) to be equal to or greater than the upper limit, it becomes easy to suppress occurrence of longitudinal chromatic aberration and to suppress occurrence of the difference in spherical aberration depending on wavelength. Further, it is possible to suppress occurrence of chromatic coma aberration caused by the lower ray on the cemented surface. In addition, in a case of a configuration in which Conditional Expression (27-1) is satisfied, it is possible to obtain more favorable characteristics.

$$0 < \nu ce2p - \nu ce2n < 70 \tag{27}$$

$$5 < \nu ce2p - \nu ce2n < 55 \tag{27-1}$$

It is more preferable that Conditional Expressions (26) and (27) are simultaneously satisfied. It is even more preferable that Conditional Expressions (26) and (27) are simultaneously satisfied, and at least one of Conditional Expression (26-1) or (27-1) is satisfied.

It is preferable that the second lens group G2 includes a cemented lens in which a positive lens convex toward the object side and a negative lens concave toward the image side are cemented in order from the object side. In such a case, since the entire cemented lens has a meniscus shape, it becomes a shape close to an aplanatic lens, and it becomes easy to suppress occurrence of spherical aberration and coma aberration. Further, the concave surface closest to the image side in this cemented lens is also able to have a function of correcting the Petzval sum. In a case where the second lens group G2 has a plurality of cemented lenses, it is preferable that the cemented lens closest to the object side in the second lens group G2 is a cemented lens in which a positive lens convex toward the object side and a negative lens concave toward the image side are cemented in order from the object side.

It is preferable that the third lens group G3 includes a three-piece cemented lens in which a positive lens, a negative lens, and a positive lens are cemented in order from the object side. By cementing these three lenses, a refractive power of each lens can be increased as compared with a case where the lenses are not cemented. Therefore, there is an advantage in correcting chromatic aberration and Petzval sum, and it becomes easy to suppress fluctuation in astigmatism during focusing.

In the configuration in which the third lens group G3 has the three-piece cemented lens, assuming that an average of refractive indices of all the positive lenses in the cemented lens at the d line is Nce3p and the refractive index of the negative lens in the cemented lens at the d line is Nce3n, it is preferable to satisfy Conditional Expression (28). By not allowing the result of Conditional Expression (28) to be equal to or less than the lower limit, the absolute value of the Petzval sum is reduced, and there is an advantage in reducing the field curvature. By not allowing the result of Conditional Expression (28) to be equal to or greater than the upper limit, it is possible to reduce the refractive index difference of the lenses composing the three-piece cemented lens. Therefore, it is possible to reduce an absolute value of the radius of curvature of the cemented surface while the cemented surface does not have a strong paraxial refractive power. As a result, it is possible to correct higher-order spherical aberration and sagittal coma aberration. In addition, in a case of a configuration in which Conditional Expression (28-1) is satisfied, it is possible to obtain more favorable characteristics.

$$0.1 < Nce3p - Nce3n < 0.4 \quad (28)$$

$$0.15 < Nce3p - Nce3n < 0.35 \quad (28\text{-}1)$$

In the configuration in which the third lens group G3 has the three-piece cemented lens, assuming that an average of Abbe numbers of all the positive lenses in the cemented lens based on the d line is vce3p and an Abbe number of the negative lens in the cemented lens based on the d line is vce3n, it is preferable to satisfy Conditional Expression (29). By not allowing the result of Conditional Expression (29) to be equal to or less than the lower limit, correction of longitudinal chromatic aberration becomes easy. By not allowing the result of Conditional Expression (29) to be equal to or greater than the upper limit, it becomes easy to suppress occurrence of longitudinal chromatic aberration and to suppress occurrence of the difference in spherical aberration depending on wavelength. In addition, in a case of a configuration in which Conditional Expression (29-1) is satisfied, it is possible to obtain more favorable characteristics.

$$0 < vce3p - vce3n < 20 \quad (29)$$

$$0 < vce3p - vce3n < 15 \quad (29\text{-}1)$$

It is more preferable that Conditional Expressions (28) and (29) are simultaneously satisfied. It is even more preferable that Conditional Expressions (28) and (29) are simultaneously satisfied, and at least one of Conditional Expressions (28-1) or (29-1) is satisfied.

As a group configuration, as shown in FIG. 1, the imaging lens may be configured to consist of a first lens group G1, a second lens group G2, an aperture stop St, and a third lens group G3. There is an advantage in achieving reduction in size and simplification of the structure. Alternatively, the imaging lens may be configured to further comprise a subsequent group which is disposed to be subsequent to the third lens group G3 on the image side of the third lens group G3 and of which the distance to the third lens group G3 changes during focusing. The fourth lens group G4 in the examples shown in FIGS. 2 and 12 corresponds to the subsequent group. In a case where the subsequent group is further provided, aberration correction can be performed using the fact that the ray height of the principal ray on each lens surface of the subsequent group changes during focusing. Therefore, it becomes easy to correct fluctuation in astigmatism, fluctuation in distortion, and fluctuation in lateral chromatic aberration during focusing. The subsequent group may be configured to move along the optical axis Z along a movement locus different from that of the third lens group G3 during focusing. In such a case, it becomes easier to correct fluctuation in aberrations during focusing is changed. Alternatively, the subsequent group may be configured to remain stationary with respect to the image plane Sim during focusing. In such a case, as compared with the case where the subsequent group moves during focusing, it is possible to simplify the lens barrel structure. In a case where the subsequent group is a lens group having a positive refractive power, there is an advantage in reducing the incident angle of the principal ray, which has the maximum angle of view, incident on the image plane Sim. In a case where the subsequent group is a lens group having a negative refractive power, the refractive power of the focus group can be increased. Therefore, it is possible to reduce the amount of movement of the focus group during focusing.

Next, the detailed configuration of the lenses in each lens group and the functions and effects thereof will be described with reference to the configuration examples shown in FIGS. 1 to 13. It should be noted that the reference numerals used for the lenses in FIGS. 1 to 13 are used independently for each figure in order to avoid complication of explanation due to an increase in the number of digits of the reference numerals. For this reason, even in a case where the reference numerals commonly used in the other drawings are provided, the configurations thereof are not necessarily a common configuration. In the following description, for convenience of explanation, regarding the cemented lens in the first lens group G1, the cemented lens which is second from the image side is referred to as an A cemented lens, and the cemented lens closest to the image side is referred to as a B cemented lens. In the following description, the paraxial ray parallel to the optical axis Z is referred to as a paraxial on-axis ray.

First, the first lens group G1 will be described. The first lens group G1 of the first configuration example shown in FIG. 1 consists of, in order from the object side, a lens L11 that is a positive meniscus lens convex toward the image side, a lens L12 that is a biconcave lens, a lens L13 that is a positive lens convex toward the image side, a cemented lens (A cemented lens) that is formed by cementing a lens L14 which is a biconcave lens and a lens L15 which is a biconvex lens in order from the object side, a lens L16 that is a biconvex lens, and a cemented lens (B cemented lens) which is formed by cementing a lens L17 which is a biconvex lens and a lens L18 which is a negative meniscus lens concave toward the object side in order from the object side. In this configuration example, since the lens L11 having a positive refractive power is disposed closest to the object side, it is possible to balance distortion and longitudinal chromatic aberration caused by the lens closer to the image side than this lens. In particular, by forming a meniscus shape convex toward the image side, the function of adjusting the above balance can be enhanced while suppressing the effect on spherical aberration as much as possible. Since the on-axis ray is raised through the negative lens L12 and the negative lens L14 having an air contact surface concave toward the object side, it is possible to reduce the angle of the principal ray with respect to the optical axis Z in the lenses closer to the image side than the lenses L12 and L14. Therefore, it is possible to reduce occurrence of sagittal coma aberration. The lens L16 is located at a position where the paraxial on-axis ray is high, or is located in the vicinity thereof. By forming the lens L16 as a biconvex lens, it is possible to suppress occurrence of spherical aberration while reducing the height of the paraxial on-axis ray in the lens closer to the image side than the lens L16. The lenses L11 to L16 have a higher height of the principal ray than the B cemented lens, and therefore contribute more to lateral chromatic aberration than longitudinal chromatic aberration. In other words, the B cemented lens located closest to the aperture stop St in the first lens group G1 has a lower height of the principal ray than the lenses L11 to L16, and therefore less contributes to lateral chromatic aberration. In such a manner, by using lenses having different degrees of contribution to lateral chromatic aberration, it is possible to appropriately balance lateral chromatic aberration and longitudinal chromatic aberration in the entire first lens group G1.

Figure 2:
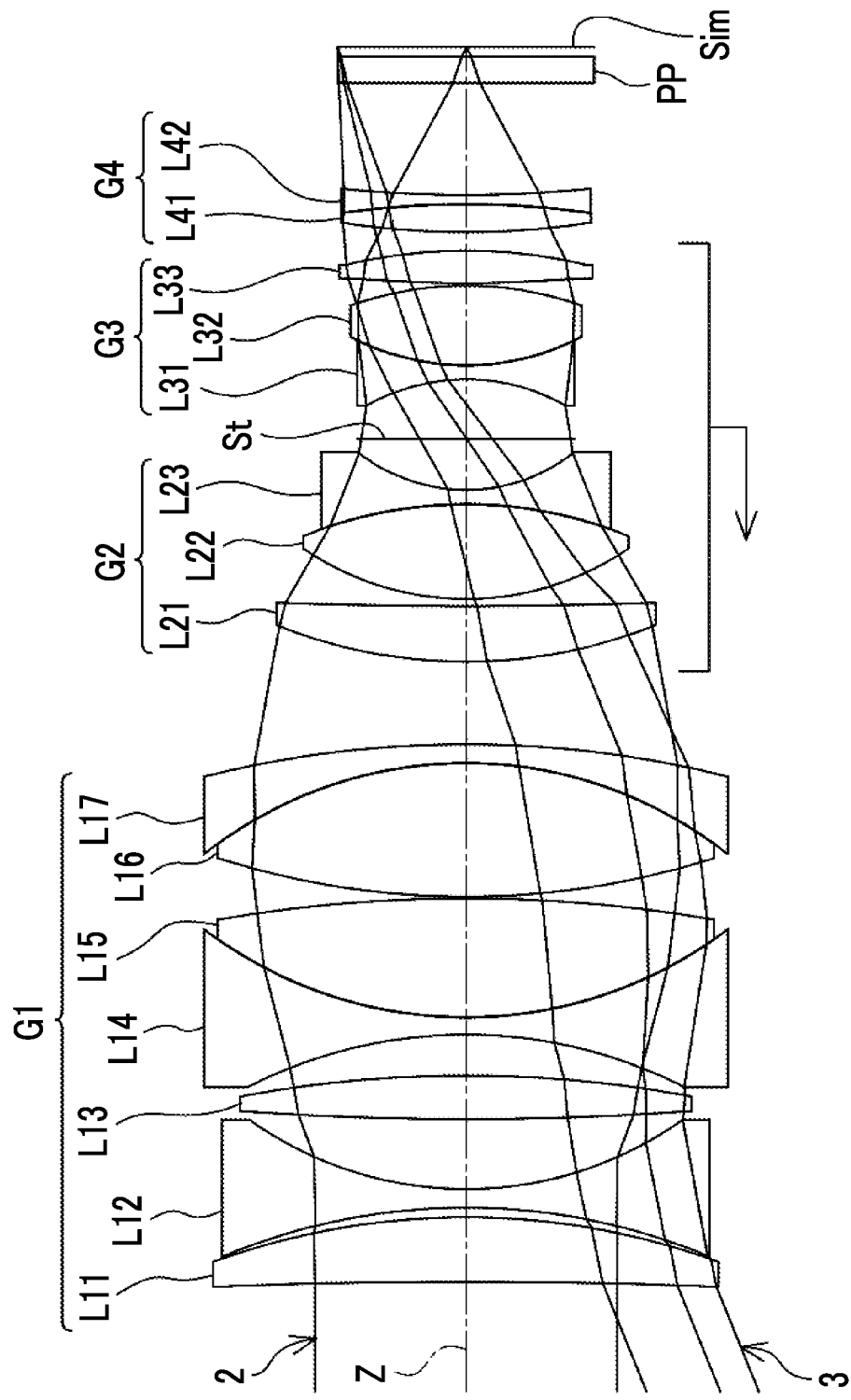
FIG. 2 is a cross-sectional view showing a configuration and rays of a second configuration example of an imaging lens according to an embodiment of the present disclosure corresponding to the imaging lens of Example 2 of the present disclosure.

The first lens group G1 of the second configuration example shown in FIG. 2 consists of, in order from the object side, a lens L11 that is a positive meniscus lens convex toward the image side, a lens L12 that is a biconcave lens, a lens L13 that is a positive lens convex toward the image side, a cemented lens (A cemented lens) that is formed by cementing a lens L14 which is a biconcave lens and a lens L15 which is a biconvex lens in order from the object side, and a cemented lens (B cemented lens) which is formed by cementing a lens L16 which is a biconvex lens and a lens L17 which is a negative meniscus lens concave toward the object side in order from the object side. The lenses L11 to L17 in the second configuration example have the same functions and effects as the lenses L11 to L15, L17, and L18 of the first configuration example, respectively.

The first lens group G1 of the third to eighth configuration examples shown in FIGS. 3 to 8 consists of, in order from the object side, a lens LI that is a positive lens convex toward the image side, a lens L12 that is a biconcave lens, a cemented lens (A cemented lens) that is formed by cementing a lens L13 which is a biconcave lens and a lens L14 which is a biconvex lens in order from the object side, a cemented lens (B cemented lens) that is formed by cementing a lens L15 which is a biconvex lens and a lens L16 which is a negative meniscus lens concave toward the object side in order from the object side, a lens L17 that is a biconvex lens, and a lens L18 that is a positive meniscus lens convex toward the object side. In such a configuration example, since the lens L11 having a positive refractive power is disposed closest to the object side, it is possible to balance distortion and longitudinal chromatic aberration caused by the lens closer to the image side than this lens. In particular, by forming a shape convex toward the image side, the function of adjusting the above balance can be enhanced while suppressing the effect on spherical aberration. The lens L12 is able to raise the paraxial ray at a position close to the object and reduce the incident angle of the principal ray at the maximum angle of view to the image side lens. Therefore, there is an advantage in suppressing occurrence of sagittal coma aberration. Since the lens L12 is formed in a biconcave shape so as to have a strong refractive power, the above-mentioned function of the lens L12 can be made more remarkable. By successively arranging two negative lenses L12 and L13, a sufficient negative refractive power is provided, and by making these two lenses biconcave, it is possible to suppress spherical aberration occurring on each surface. By cementing the lens L13 and the positive lens L14 on the image side, it is possible to correct longitudinal chromatic aberration and lateral chromatic aberration. By forming the lens L14 as a biconvex lens, it is possible to suppress spherical aberration occurring on each surface. The lenses L11 to L14 have a higher height of the principal ray than the B cemented lens, and therefore contribute more to lateral chromatic aberration than longitudinal chromatic aberration. The B cemented lens, which is the cemented lens closest to the aperture stop St in the first lens group G1, has a lower height of the principal ray than the A cemented lens, and therefore less contributes to lateral chromatic aberration. In such a manner, by using lenses having different degrees of contribution to lateral chromatic aberration, it is possible to appropriately balance lateral chromatic aberration and longitudinal chromatic aberration in the entire first lens group G1. The lenses L17 and L18 are able to reduce the height of the on-axis marginal ray incident on the second lens group G2 while suppressing occurrence of spherical aberration.

Figure 9:
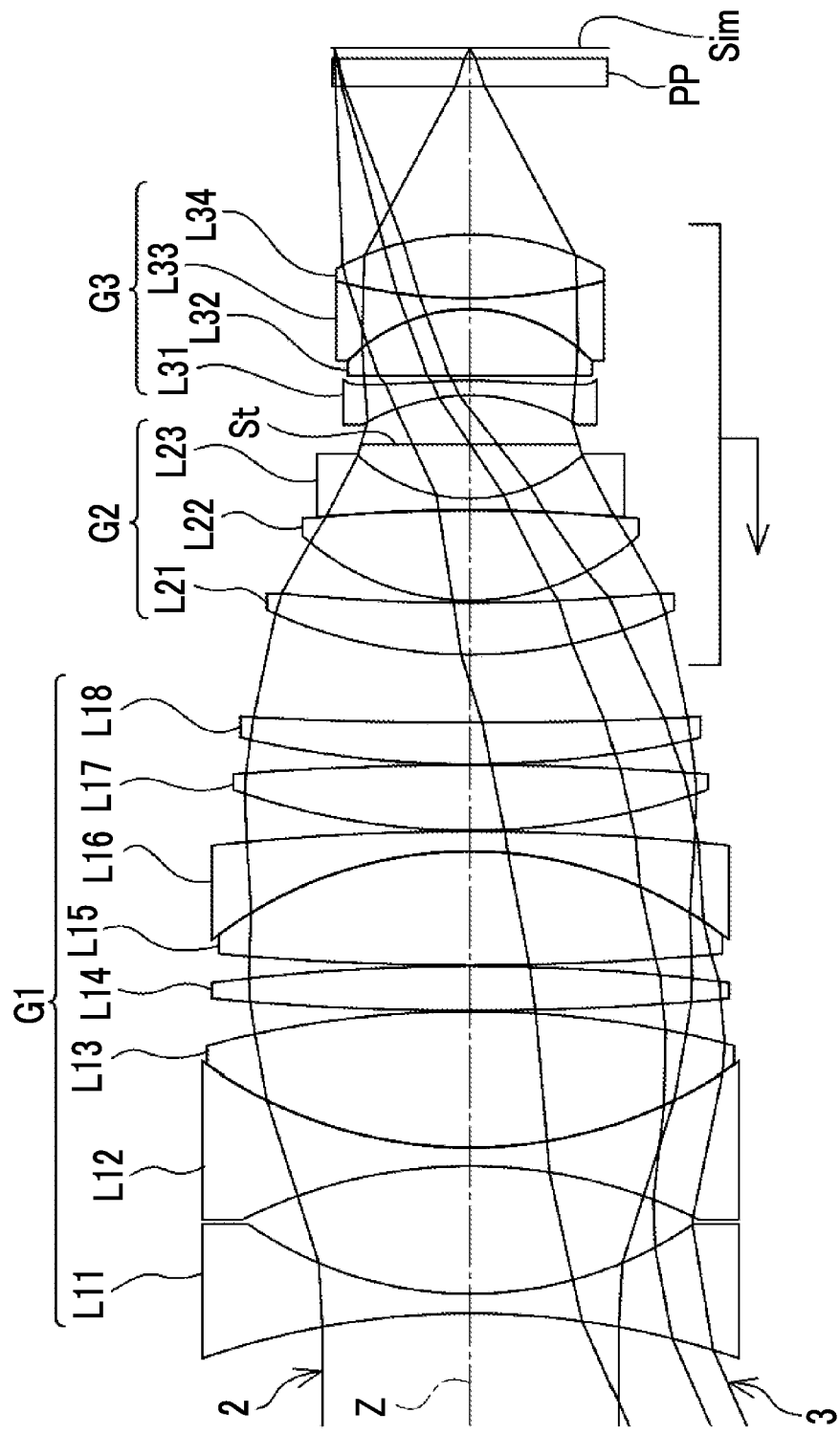
FIG. 9 is a cross-sectional view showing a configuration and rays of a ninth configuration example of an imaging lens according to an embodiment of the present disclosure corresponding to the imaging lens of Example 9 of the present disclosure.

The first lens group G1 of the ninth configuration example shown in FIG. 9 consists of, in order from the object side, a lens L11 that is a biconcave lens, a cemented lens (A cemented lens) which is formed by cementing a lens L12 which is a biconcave lens and a lens L13 which is a biconvex lens in order from the object side, a lens L14 that is a biconvex lens, a cemented lens (B cemented lens) which is formed by cementing a lens L15 which is a biconvex lens and a lens L16 which is a negative meniscus lens concave toward the object side in order from the object side, a lens L17 that is a biconvex lens, and a lens L18 that is a positive meniscus lens convex toward the object side. In this configuration example, the lens L11 is able to raise the paraxial ray at a position close to the object and reduce the incident angle of the principal ray at the maximum angle of view to the image side lens. Therefore, there is an advantage in suppressing occurrence of sagittal coma aberration. For this reason, it is more advantageous to dispose a negative lens closest to the object side. Further, since the lens L11 is formed in a biconcave shape so as to have a strong refractive power, the above-mentioned function of the lens L11 can be made more remarkable. By successively arranging two negative lenses L11 and L12, a sufficient negative refractive power is provided, and by making these two lenses biconcave, it is possible to suppress spherical aberration occurring on each surface. By cementing the lens L12 and the positive lens L13 on the image side, it is possible to correct longitudinal chromatic aberration and lateral chromatic aberration. By forming the lens L13 as a biconvex lens, it is possible to suppress spherical aberration occurring on each surface. The lens L14 is located at a position where the paraxial on-axis ray is high, or is located in the vicinity thereof. By forming the lens L14 as a biconvex lens, it is possible to suppress occurrence of spherical aberration while reducing the height of the paraxial on-axis ray in the lens closer to the image side than the lens L14. The lenses L11 to L14 have a higher height of the principal ray than the B cemented lens, and therefore contribute more to lateral chromatic aberration than longitudinal chromatic aberration. The B cemented lens, which is the cemented lens closest to the aperture stop St in the first lens group G1, has a lower height of the principal ray than the A cemented lens, and therefore less contributes to lateral chromatic aberration. In such a manner, by using lenses having different degrees of contribution to lateral chromatic aberration, it is possible to appropriately balance lateral chromatic aberration and longitudinal chromatic aberration in the entire first lens group G1. The lenses L17 and L18 are able to reduce the height of the on-axis marginal ray incident on the second lens group G2 while suppressing occurrence of spherical aberration.

Figure 10:
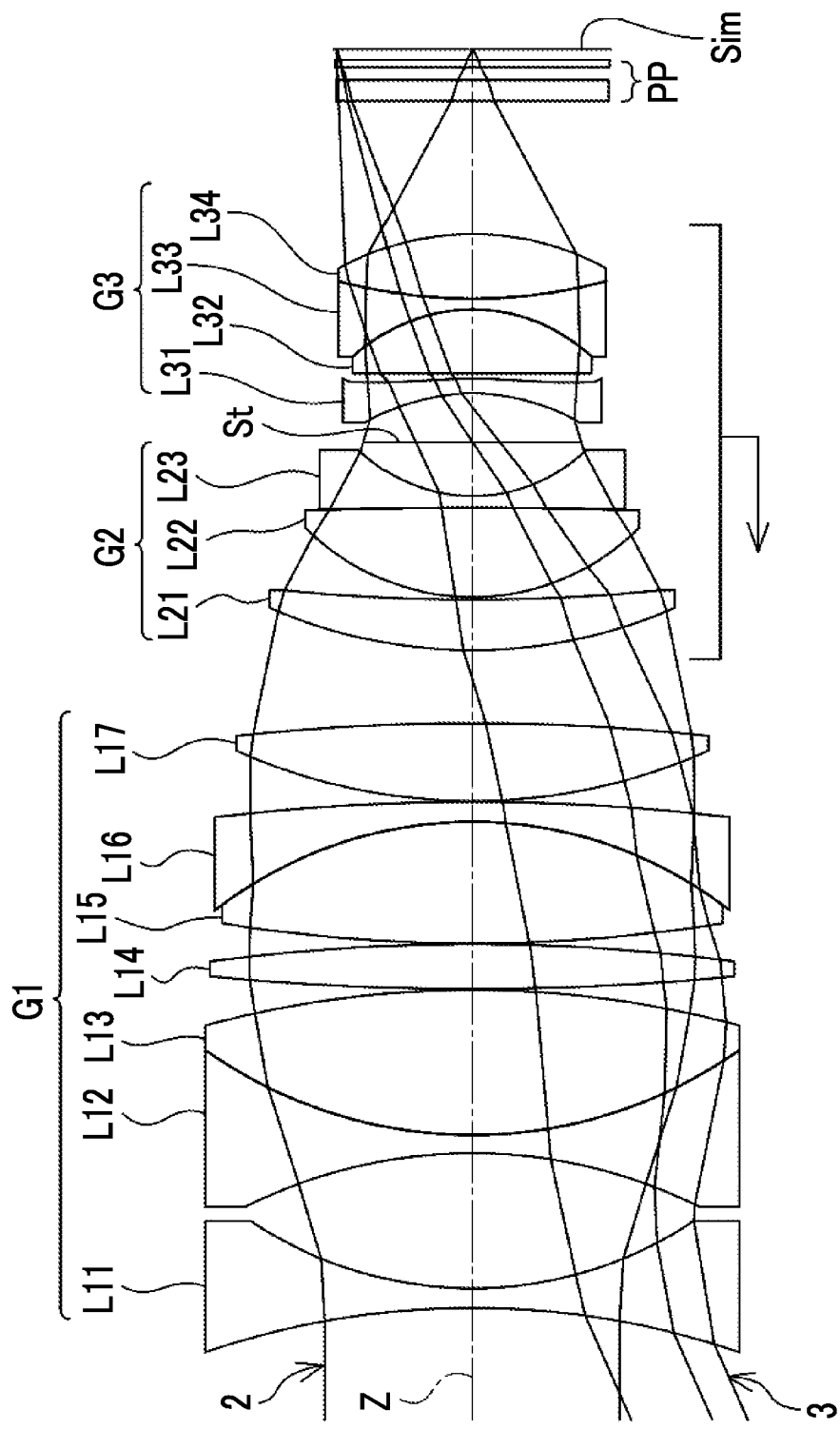
FIG. 10 is a cross-sectional view showing a configuration and rays of a tenth configuration example of an imaging lens according to an embodiment of the present disclosure corresponding to the imaging lens of Example 10 of the present disclosure.
Figure 11:
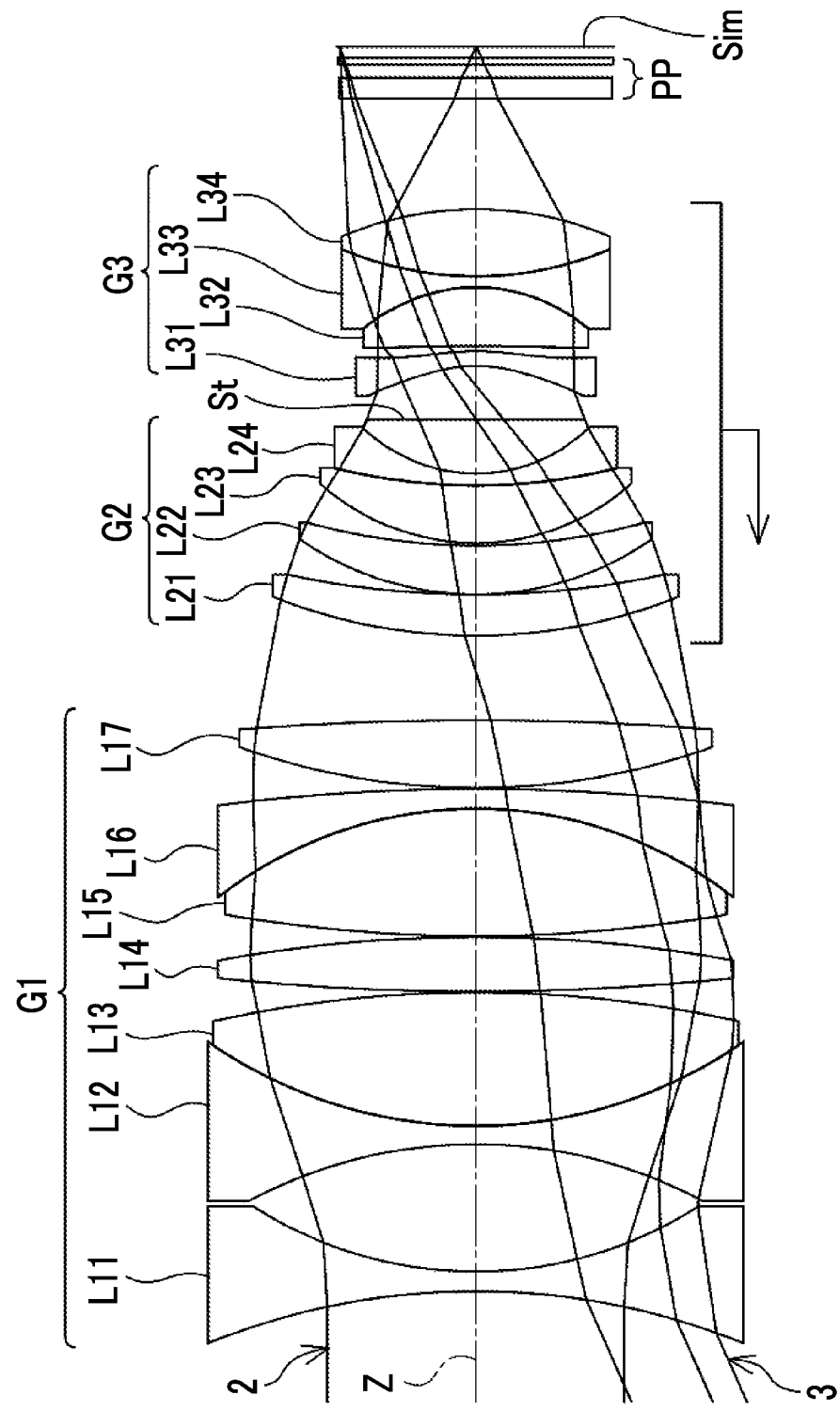
FIG. 11 is a cross-sectional view showing a configuration and rays of an eleventh configuration example of an imaging lens according to an embodiment of the present disclosure corresponding to the imaging lens of Example 11 of the present disclosure.

The first lens group G1 of the tenth and eleventh configuration examples shown in FIGS. 10 and 11 consists of, in order from the object side, a lens L11 that is a biconcave lens, a cemented lens (A cemented lens) which is formed by cementing a lens L12 which is a biconcave lens and a lens L13 which is a biconvex lens in order from the object side, a lens L14 that is a biconvex lens, a cemented lens (B cemented lens) which is formed by cementing a lens L15 which is a biconvex lens and a lens L16 which is a negative meniscus lens concave toward the object side in order from the object side, and a lens L17 that is a biconvex lens. The lenses L11 to L16 have the same functions and effects as the lenses L11 to L16 of the ninth configuration example, respectively. The lens L17 is able to reduce the height of the on-axis marginal ray incident on the second lens group G2 while suppressing occurrence of spherical aberration.

Figure 12:
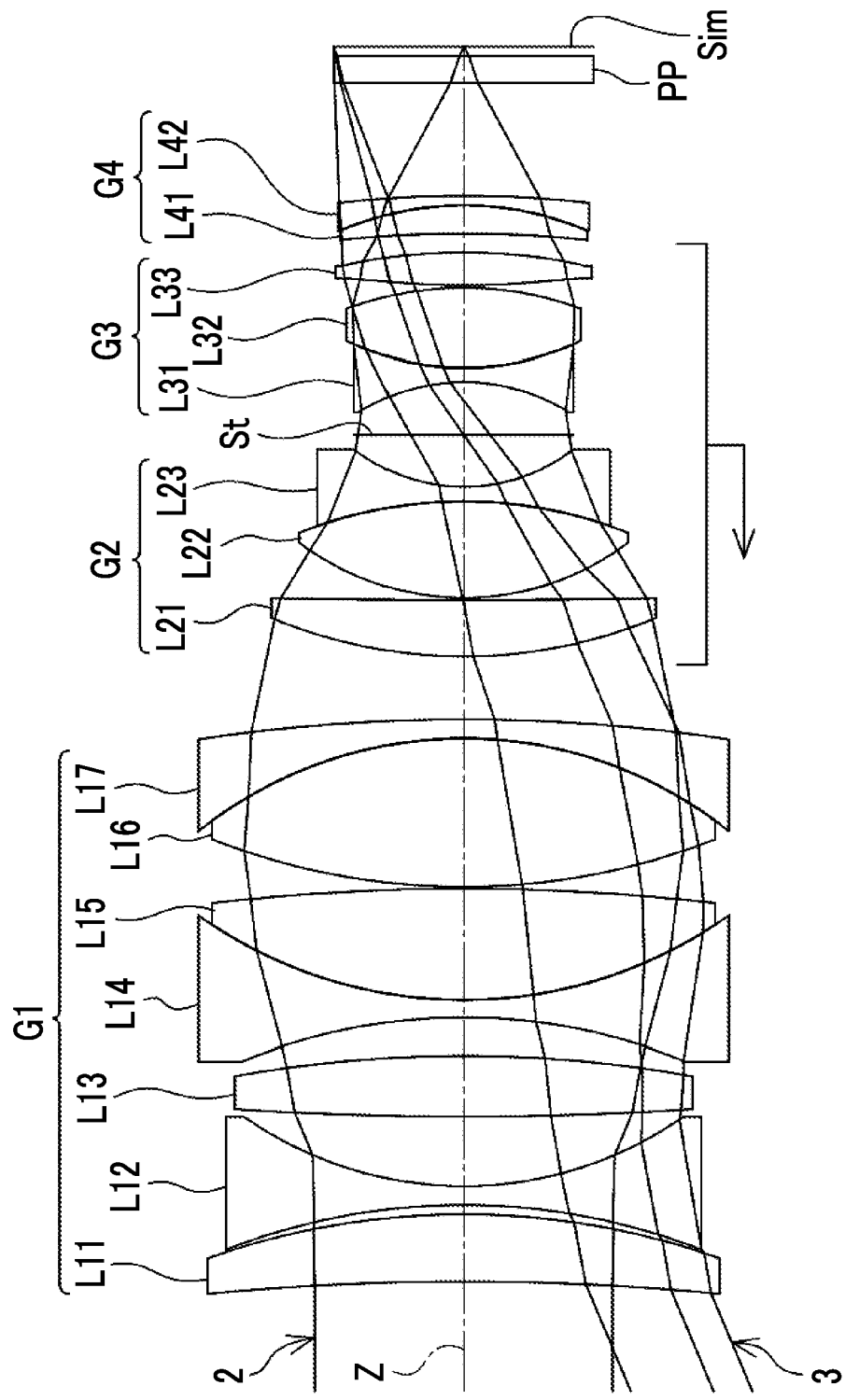
FIG. 12 is a cross-sectional view showing a configuration and rays of a twelfth configuration example of an imaging lens according to an embodiment of the present disclosure corresponding to the imaging lens of Example 12 of the present disclosure.

The first lens group G1 of the twelfth configuration example shown in FIG. 12 consists of, in order from the object side, a lens L11 that is a positive meniscus lens convex toward the image side, a lens L12 that is a biconcave lens, a lens L13 that is a positive lens convex toward the image side, a cemented lens (A cemented lens) that is formed by cementing a lens L14 which is a biconcave lens and a lens L15 which is a biconvex lens in order from the object side, and a cemented lens (B cemented lens) which is formed by cementing a lens L16 which is a biconvex lens and a lens L17 which is a negative meniscus lens concave toward the object side in order from the object side. In this configuration example, since the lens L11 having a positive refractive power is disposed closest to the object side, it is possible to balance distortion and longitudinal chromatic aberration caused by the lens closer to the image side than this lens. In particular, by forming a meniscus shape convex toward the image side, the function of adjusting the above balance can be enhanced while suppressing the effect on spherical aberration as much as possible. The lens L12 is able to raise the on-axis ray and reduce the angle of the principal ray with respect to the optical axis Z in the lens on the image side. Therefore, it is possible to reduce occurrence of sagittal coma aberration. By making the lens L12 biconcave, it is possible to suppress spherical aberration occurring on each surface. The lens L13 is able to correct spherical aberration occurring in the lens L12. The A cemented lens is able to appropriately balance lateral chromatic aberration at the low angle of view and lateral chromatic aberration at the wide angle of view. The B cemented lens is able to correct longitudinal chromatic aberration without greatly changing lateral chromatic aberration.

Figure 13:
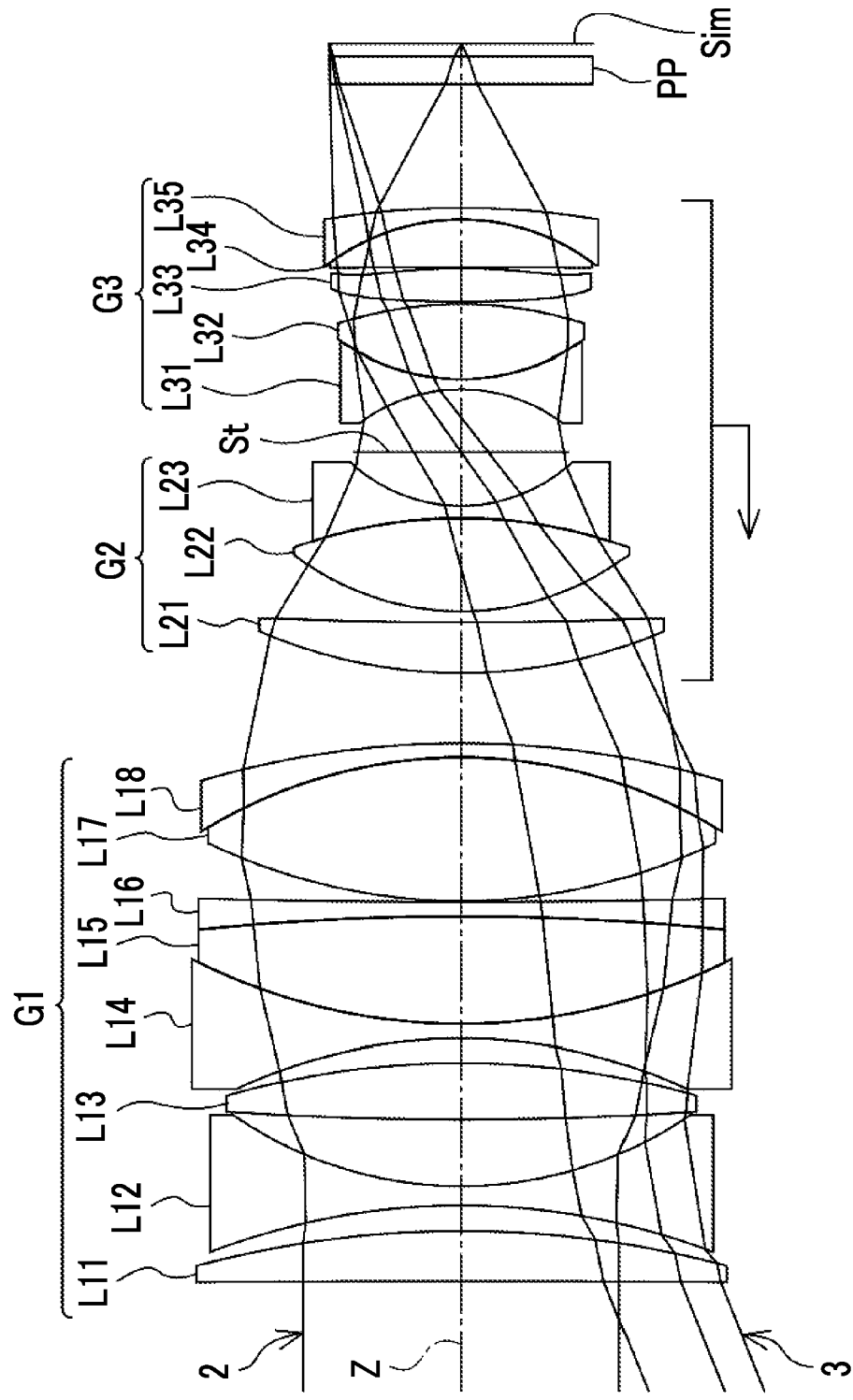
FIG. 13 is a cross-sectional view showing a configuration and rays of a thirteenth configuration example of an imaging lens according to an embodiment of the present disclosure, corresponding to the imaging lens of Example 13 of the present disclosure.

The first lens group G1 of the thirteenth configuration example shown in FIG. 13 consists of, in order from the object side, a lens L11 that is a positive meniscus lens convex toward the image side, a lens L12 that is a biconcave lens, a lens L13 that is a positive lens convex toward the image side, a cemented lens (A cemented lens) that is formed by cementing a lens L14 which is a biconcave lens, a lens L15 which is a biconvex lens in order from the object side, and a lens L16 which is a negative meniscus lens concave toward the object side, and a cemented lens (B cemented lens) which is formed by cementing a lens L17 which is a biconvex lens and a lens L18 which is a negative meniscus lens concave toward the object side in order from the object side. The lenses L11 to L13 and the B cemented lens in the thirteenth configuration example have the same functions and effects as the lenses L11 to L13 and the B cemented lens in the twelfth configuration example, respectively. The A cemented lens in the thirteenth configuration example is a three-piece cemented lens, and it becomes easy to appropriately balance lateral chromatic aberration and longitudinal chromatic aberration.

Next, the second lens group G2 will be described. The second lens group G2 of the first to fourth, sixth to tenth, twelfth, and thirteenth configuration examples respectively shown in FIGS. 1 to 4, 6 to 10, 12, and 13 consists of, in order from the object side, a lens L21 that is a positive meniscus lens convex toward the object side, and a cemented lens which is formed by cementing a lens L22 which is a biconvex lens and a lens L23 which is a biconcave lens in order from the object side. Since the first lens group G1 has a positive refractive power, the on-axis rays incident into the lens L21 are convergent light. The lens L21 has a meniscus shape convex toward the object side, and thus has a shape close to that of an aplanatic lens. Therefore, a positive refractive power can be applied while suppressing occurrence of spherical aberration and coma aberration. Thereby, it becomes easy to form an optical system with a small F number. Since the cemented lens composed of the lenses L22 and L23 having the above-mentioned shapes has a meniscus shape convex toward the object side as a whole, it becomes easy to suppress generation of spherical aberration and coma aberration similarly to the lens L21. Further, since a refractive power of each of a positive lens and a negative lens can be increased by cementing a biconvex lens and a biconcave lens, there is an advantage in correcting longitudinal chromatic aberration. Furthermore, the concave surface of the lens L23 can also have a function of correcting the Petzval sum.

Figure 5:
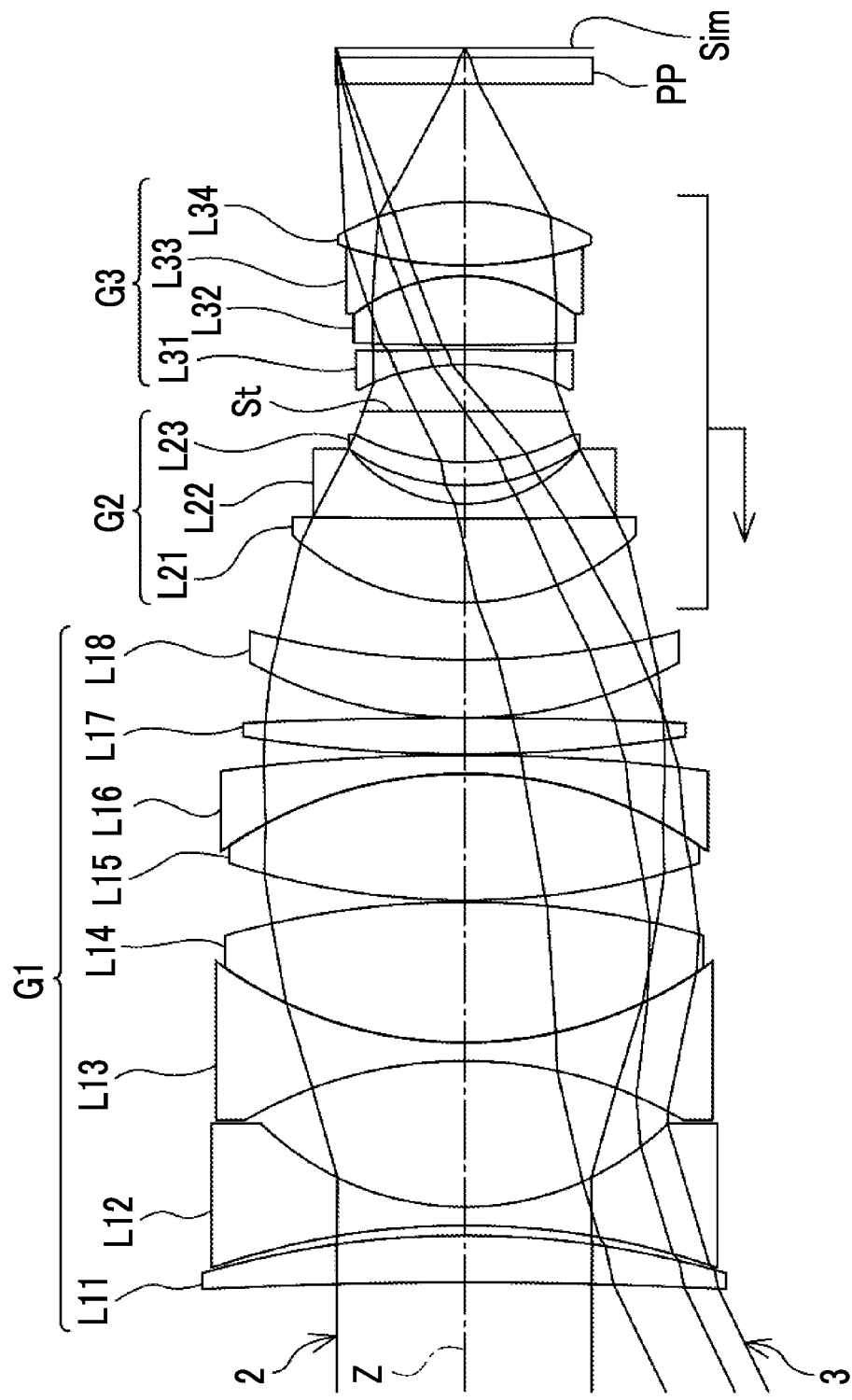
FIG. 5 is a cross-sectional view showing a configuration and rays of a fifth configuration example of an imaging lens according to an embodiment of the present disclosure corresponding to the imaging lens of Example 5 of the present disclosure.

The second lens group G2 of the fifth configuration example shown in FIG. 5 consists of, in order from the object side, a cemented lens that is formed by cementing a lens L21 which is a positive lens convex toward the object side and a lens L22 which is a negative lens concave toward the image side in order from the object side, and a lens L23 that is a positive meniscus convex toward the object side. Similarly to the first configuration example, the cemented lens of this configuration example has a meniscus shape convex toward the object side as a whole. Therefore, it becomes easy to suppress occurrence of spherical aberration and coma aberration as described above. The concave surface closest to the image side in the cemented lens of the fifth configuration example is able to have a function of correcting the Petzval sum. The on-axis rays incident into the lens L23 in this configuration example are convergent light. The lens L23 has a meniscus shape convex toward the object side, and thus has a shape close to that of an aplanatic lens. Therefore, a positive refractive power can be applied while suppressing occurrence of spherical aberration and coma aberration. Thereby, it becomes easy to form an optical system with a small F number.

The second lens group G2 in the eleventh configuration example shown in FIG. 11 consists of, in order from the object side, a lens L21 that is a positive meniscus lens convex toward the object side, a lens L22 that is a positive meniscus lens convex toward the object side, and a cemented lens that is formed by cementing a lens L23 which is a positive meniscus lens convex toward the object side and a lens L24 which is a negative meniscus lens convex toward the object side in order from the object side. The lenses L21 and L22 in the eleventh configuration example have the same functions and effects as the lens L21 in the first configuration example. In the eleventh configuration example, the difference in spherical aberration depending on wavelength can be suppressed by the cemented lens consisting of the lenses L23 and L24 having the above-mentioned shapes.

Next, the third lens group G3 will be described. The third lens group G3 of the first and thirteenth configuration examples shown in FIGS. 1 and 13 consists of, in order from the object side, a cemented lens that is formed by cementing a lens L31 which is a biconcave lens and a lens L32 which is a biconvex lens in order from the object side, a lens L33 that is a biconvex lens, and a cemented lens that is formed by cementing a lens L34 which is a positive meniscus convex toward the image side and a lens L35 which is a negative meniscus lens concave toward the object side in order from the object side. In this configuration example, the on-axis ray is diverged by the concave surface on the object side of the lens L31. Thus, it is possible to ensure the back focal length. The cemented lens consisting of the lenses L31 and L32 has a meniscus shape as a whole, and has a shape close to an aplanatic lens in terms of divergent ray. Therefore, it becomes easy to suppress occurrence of spherical aberration and coma aberration. Further, by cementing the biconcave lens and the biconvex lens, the refractive power of each of the negative lens and the positive lens can be increased. Therefore, there is an advantage in correcting longitudinal chromatic aberration. The on-axis ray changes from a divergence state to a convergence state through the lens L33. Since the lens L33 has a biconvex shape so as to share a positive refractive power, it is possible to suppress occurrence of spherical aberration. Since the cemented lens consisting of the lenses L34 and L35 has a surface shape in which the off-axis principal ray is incident on all surfaces at a small angle, it is possible to minimize generation of astigmatism and lateral chromatic aberration. Further, this cemented lens is able to correct longitudinal chromatic aberration without having great effect on lateral chromatic aberration, and is thus useful in balancing longitudinal chromatic aberration and lateral chromatic aberration.

The third lens group G3 of the second and twelfth configuration examples respectively shown in FIGS. 2 and 12 consists of, in order from the object side, a cemented lens that is formed by cementing a lens L31 that is a biconcave lens and a lens L32 that is a biconvex lens in order from the object side, and a lens L33 that is a biconvex lens. The cemented lens consisting of the lenses L31 and L32 has the same functions and effects as the cemented lens consisting of the lenses L31 and L32 in the first configuration example. The lens L33 is responsible for the main imaging function. The lens L33 is able to reduce the incident angle of the principal ray with the maximum angle of view incident on the image plane Sim.

The third lens group G3 in the third, fifth, and ninth to eleventh configuration examples respectively shown in FIGS. 3, 5, and 9 to 11 consists of, in order from the object side, a lens L31 that is a negative meniscus lens concave toward the object side, and a three-piece cemented lens that is formed by cementing a lens L32 which is a positive lens convex toward the image side, a lens L33 which is a biconcave lens, and a lens L34 which is a biconvex lens in order from the object side and that has a positive refractive power as a whole. In such a configuration example, the on-axis ray is diverged by the concave surface on the object side of the lens L31. Thus, it is possible to ensure the back focal length. The lens L31 has a meniscus shape concave toward the object side, and has a shape close to an aplanatic lens in terms of divergent ray. Therefore, it becomes easy to suppress occurrence of spherical aberration and coma aberration while correcting longitudinal chromatic aberration. The concave surface on the image side of the lens L31 is able to have a function of correcting the Petzval sum. The three-piece cemented lens is responsible for the main imaging function. By cementing these three lenses, a refractive power of each lens can be increased as compared with a case where the lenses are not cemented. Therefore, there is an advantage in correcting chromatic aberration and Petzval sum.

Figure 4:
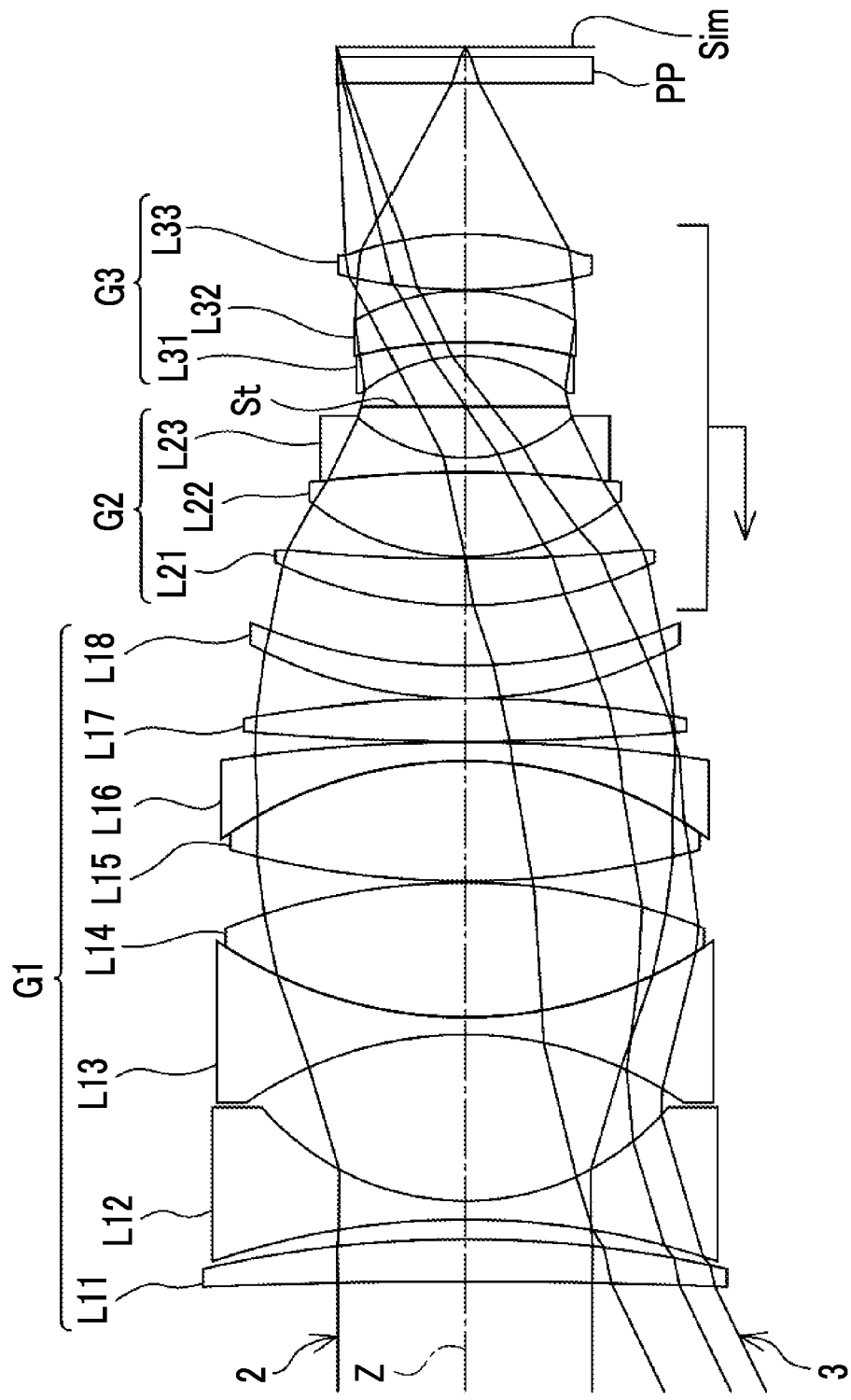
FIG. 4 is a cross-sectional view showing a configuration and rays of a fourth configuration example of an imaging lens according to an embodiment of the present disclosure corresponding to the imaging lens of Example 4 of the present disclosure.

The third lens group G3 of the fourth configuration example shown in FIG. 4 consists of, in order from the object side, a cemented lens that is formed by cementing a lens L31 which is a negative meniscus lens concave toward the object side and a lens L32 which is a positive meniscus lens convex toward the image side in order from the object side, and a lens L33 that is a biconvex lens. The lens L31 has the same functions and effects as the lens L31 of the third configuration example. The lens L32 is able to suppress the generation of astigmatism while the diverged on-axis ray changes to be converged. The lens L33 is responsible for the main imaging function. The lens L33 is able to reduce the incident angle of the principal ray with the maximum angle of view incident on the image plane Sim.

Figure 6:
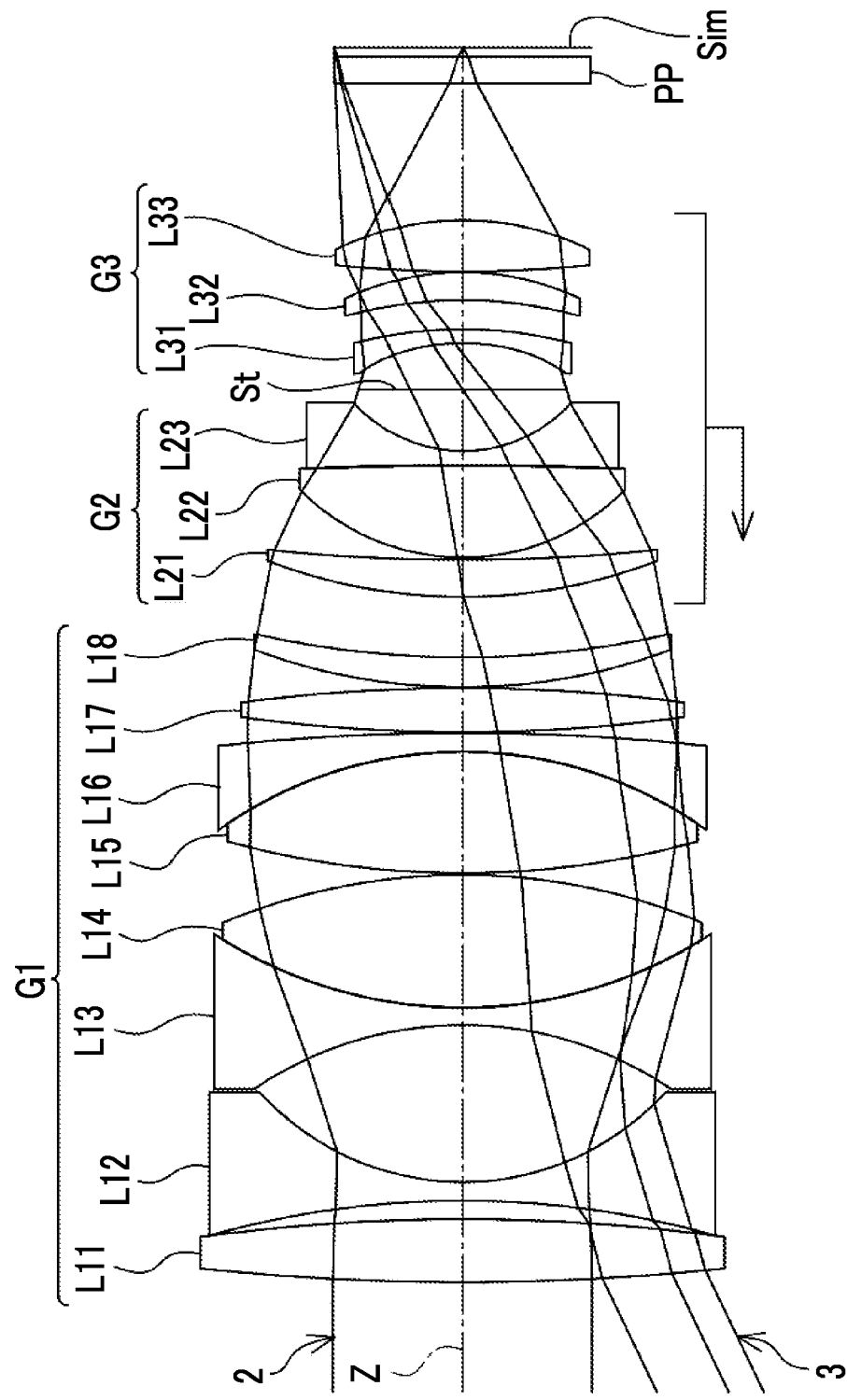
FIG. 6 is a cross-sectional view showing a configuration and rays of a sixth configuration example of an imaging lens according to an embodiment of the present disclosure corresponding to the imaging lens of Example 6 of the present disclosure.

The third lens group G3 of the sixth configuration example shown in FIG. 6 consists of, in order from the object side, a lens L31 that is a negative meniscus lens concave toward the object side, a lens L32 that is a positive meniscus lens convex toward the image side, and a lens L33 that is a biconvex lens. The lenses L31 to L33 in the sixth configuration example have the same functions and effects as the lenses L31 to L33 in the fourth configuration example, respectively.

Figure 7:
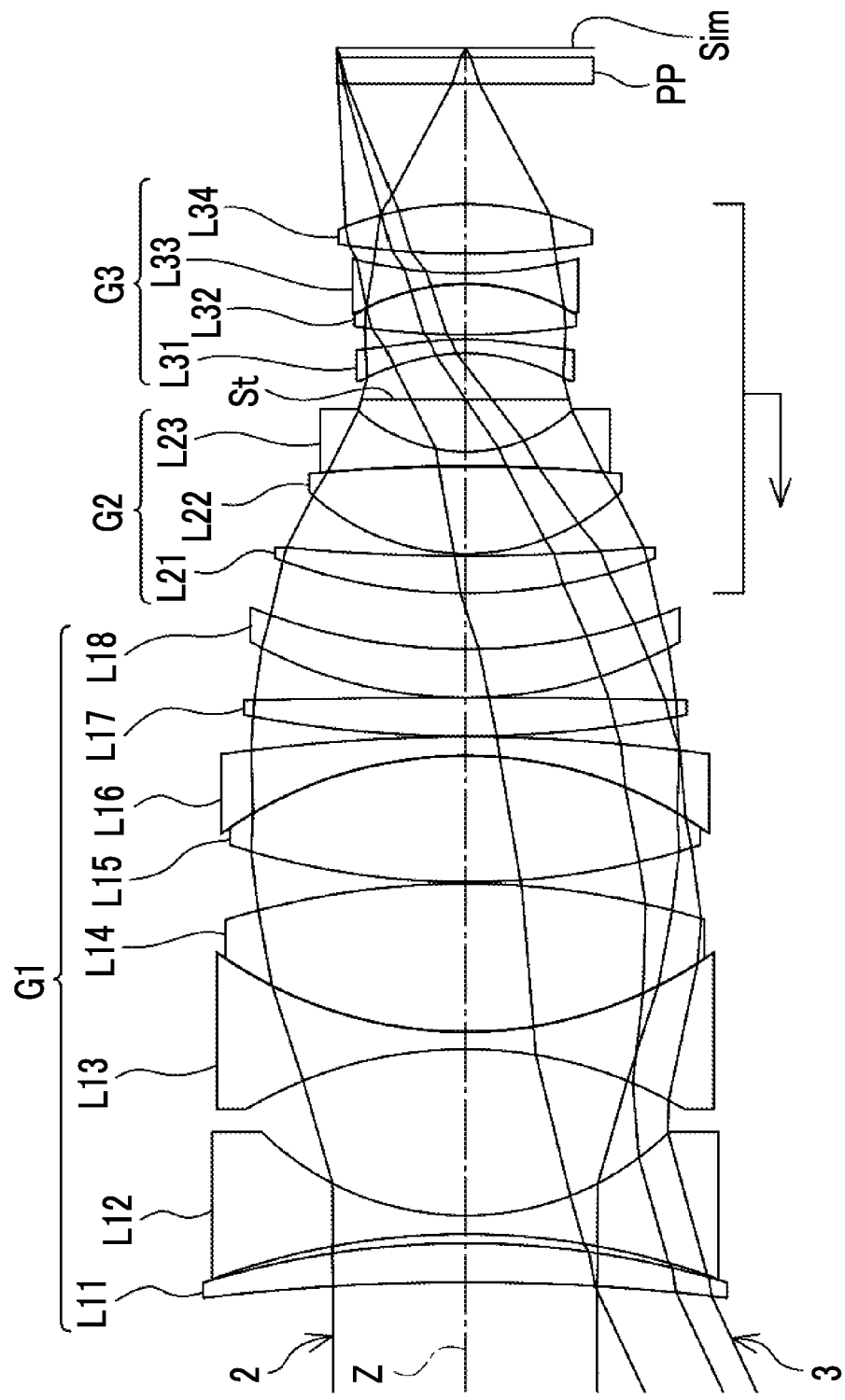
FIG. 7 is a cross-sectional view showing a configuration and rays of a seventh configuration example of an imaging lens according to an embodiment of the present disclosure corresponding to the imaging lens of Example 7 of the present disclosure.

The third lens group G3 of the seventh configuration example shown in FIG. 7 consists of, in order from the object side, a lens L31 that is a negative meniscus lens concave toward the object side, a cemented lens that is formed by cementing a lens L32 which is a positive lens convex toward the image side in order from the object side and a lens L33 which is a biconcave lens in order from the object side, and a lens L34 that is a biconvex lens. The lenses L31 and L34 in the seventh configuration example have the same functions and effects as the lenses L31 and L33 in the sixth configuration example, respectively. In the seventh configuration example, Petzval sum correction and lateral chromatic aberration adjustment can be performed by the cemented lens consisting of the lenses L32 and L33.

Figure 8:
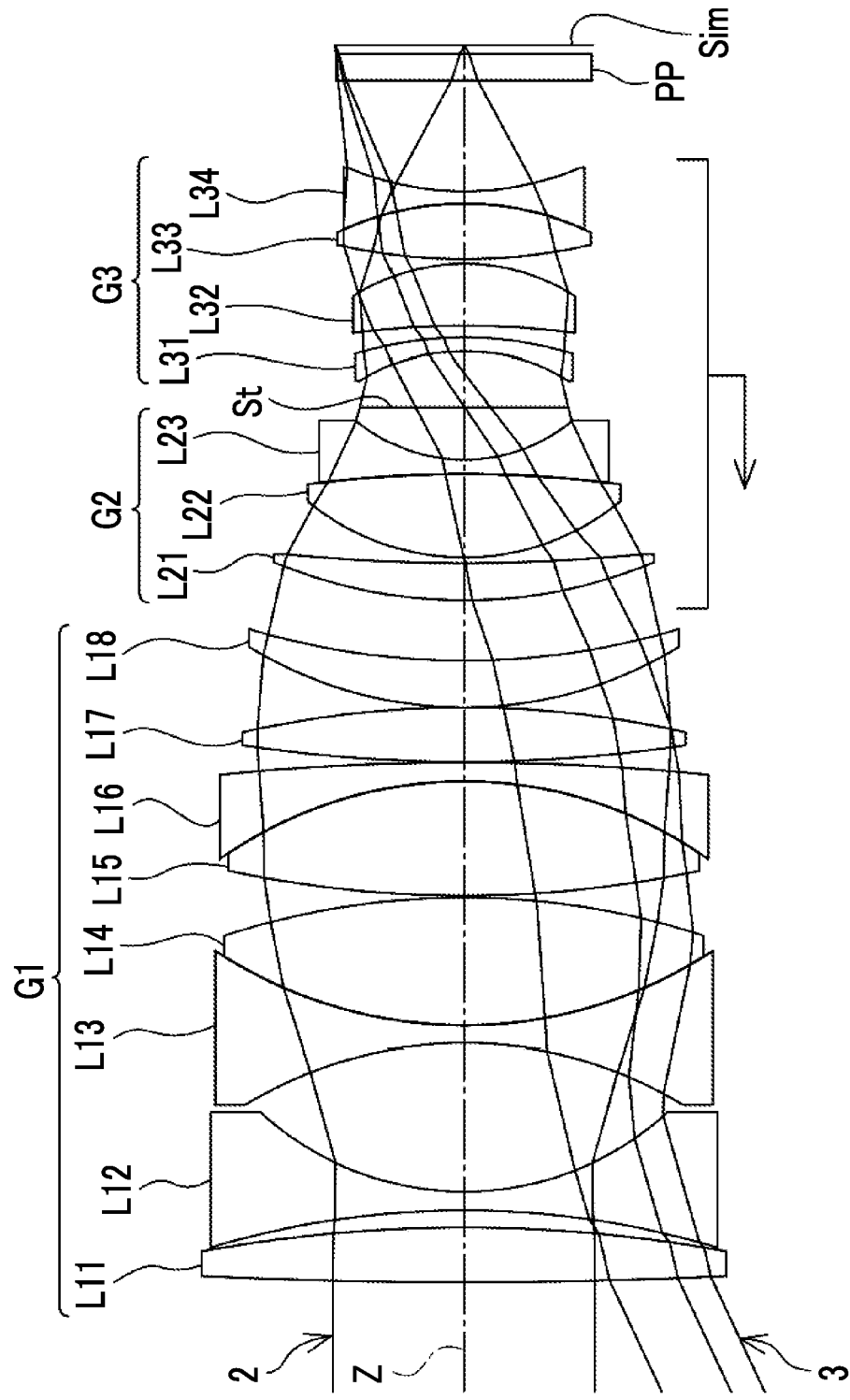
FIG. 8 is a cross-sectional view showing a configuration and rays of an eighth configuration example of an imaging lens according to an embodiment of the present disclosure corresponding to the imaging lens of Example 8 of the present disclosure.

The third lens group G3 of the eighth configuration example shown in FIG. 8 consists of, in order from the object side, a lens L31 that is a negative meniscus lens concave toward the object side, a lens L32 that is a positive meniscus lens convex toward the image side, and a cemented lens that is formed by cementing a lens L33 which is a biconvex lens and a lens L34 which is a biconcave lens in order from the object side. The lenses L31 and L32 in the eighth configuration example have the same functions and effects as the lenses L31 and L32 in the sixth configuration example, respectively. In the eighth configuration example, Petzval sum correction and lateral chromatic aberration adjustment can be performed by the cemented lens consisting of the lenses L33 and L34.

Next, the subsequent group will be described. Regarding the subsequent group, the fourth lens group G4 of the second configuration example shown in FIG. 2 is a subsequent group, and consists of a cemented lens that is formed by cementing a biconvex lens and a biconcave lens in order from the object side. Lateral chromatic aberration, astigmatism, and distortion can be finely adjusted through this cemented lens, and it becomes easy to suppress fluctuation in astigmatism during focusing. By making the cemented surface of this cemented lens convex toward the image side, it becomes easy to prevent rapid change in astigmatism accompanying an increase in image height.

The fourth lens group G4 in the twelfth configuration example shown in FIG. 12 is a subsequent group, and consists of a cemented lens that is formed by cementing a positive meniscus lens convex toward the image side and a negative meniscus lens concave toward the object side in order from the object side. Lateral chromatic aberration and astigmatism can be finely adjusted through this cemented lens, and it becomes easy to suppress fluctuation in astigmatism during focusing. By making all the lens surfaces of the cemented surface of this cemented lens convex toward the image side, it becomes easy to prevent rapid change in astigmatism accompanying an increase in image height.

The above-mentioned preferred configurations and available configurations may be optional combinations, and it is preferable to selectively adopt the configurations in accordance with required specification. According to the technique of the present disclosure, it is possible to realize an imaging lens having high optical performance by reducing the weight of the focus group and satisfactorily correcting aberrations while having a small F number. It should be noted that the term "small F number" described herein means that an F number is less than 1.2.

Next, numerical examples of the imaging lens of the present disclosure will be described.

Example 1

FIG. 1 shows a cross-sectional configuration of an imaging lens of Example 1, and an illustration method thereof is as described above. Therefore, repeated description is omitted herein. The imaging lens of Example 1 consists of, in order from the object side: a first lens group G1 that has a positive refractive power; a second lens group G2 that has a negative refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of five lenses L31 to L35 in order from the object side.

Regarding the imaging lens of Example 1, Table 1 shows basic lens data, Table 2 shows a specification, Table 3 shows variable surface distances, and Table 4 shows aspheric surface coefficients. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element at the d line, and the column of θgF shows a partial dispersion ratio of each constituent element between the g line and the F line.

In Table 1, the sign of the radius of curvature of the surface convex toward the object side is positive and the sign of the radius of curvature of the surface convex toward the image side is negative. Table 1 also shows the aperture stop St and the optical member PP, and in the column of the surface number of the surface corresponding to the aperture stop St, the surface number and (St) are noted. In Table 1, the surface number and the term (Hm) are noted in the surface number column of the surface where the height of the paraxial ray from the optical axis Z used in Conditional Expression (1) is H1 max. A value at the bottom place of D in Table 1 indicates a distance between the image plane Sim and the surface closest to the image side in the table. In Table 1, the variable surface distances, which are distances variable during focusing, are referenced by the reference signs DD[ ], and are written into places of D, where object side surface numbers of distances are noted in [ ].

Table 2 shows values of the focal length f, the F number FNo, and the maximum total angle of view 2ω of the imaging lens. (°) in the place of 2ω indicates that the unit thereof is a degree. The values shown in Table 2 are values in the case of using the d line as a reference in a state where the object at infinity is in focus.

In Table 3, the column labelled "Infinity" shows values of the variable surface distance in the state where the object at infinity is in focus and the column labelled "0.3 m" shows values of the variable surface distance in the state where an object at a distance of 0.3 m (meters) from the object to the image surface Sim is in focus.

In Table 1, the reference sign * is attached to surface numbers of aspheric surfaces, and numerical values of the paraxial radius of curvature are written into the column of the radius of curvature of the aspheric surface. In Table 4, the row of Sn shows surface numbers of the aspheric surfaces, and the rows of KA and Am (m is an integer of 3 or more, and is different for each surface) shows numerical values of the aspheric surface coefficients for each aspheric surface. The "E±n" (n: an integer) in numerical values of the aspheric surface coefficients of Table 4 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of paraxial radius of curvature, KA and Am are aspheric surface coefficients, and $\Sigma$ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd | θgF |
|---|---|---|---|---|---|
| 1 | −294.85538 | 5.250 | 1.90043 | 37.37 | 0.57720 |
| 2 | −83.39278 | 1.062 | | | |
| 3 | −70.80262 | 2.000 | 1.78470 | 26.29 | 0.61360 |
| 4 | 46.24212 | 8.397 | | | |
| 5 | −4550.08114 | 5.900 | 1.88299 | 40.78 | 0.56829 |
| 6 | −75.85635 | 2.500 | | | |
| 7 | −50.40062 | 1.860 | 1.67300 | 38.26 | 0.57580 |
| 8 | 52.09217 | 11.423 | 2.00272 | 19.32 | 0.64514 |
| 9 | −270.28321 | 0.100 | | | |
| 10 | 460.57724 | 3.500 | 1.59522 | 67.73 | 0.54426 |
| 11 | −458.32715 | 0.100 | | | |
| 12(Hm) | 77.81679 | 14.981 | 1.74320 | 49.34 | 0.55312 |
| 13 | −49.08041 | 2.020 | 1.95906 | 17.47 | 0.65993 |
| 14 | −113.73776 | DD[14] | | | |
| 15 | 53.60895 | 5.300 | 2.00069 | 25.46 | 0.61364 |
| 16 | 314.30291 | 0.341 | | | |
| 17 | 33.85922 | 9.760 | 1.59522 | 67.73 | 0.54426 |
| 18 | −53.05711 | 1.300 | 1.85478 | 24.80 | 0.61232 |
| 19 | 18.69310 | 5.689 | | | |
| 20(St) | ∞ | 7.625 | | | |
| 21 | −20.47468 | 1.060 | 1.59551 | 39.24 | 0.58043 |

TABLE 1-continued

| | | Example 1 | | | |
|---|---|---|---|---|---|
| Sn | R | D | Nd | vd | θgF |
| 22 | 23.13360 | 7.750 | 1.88299 | 40.78 | 0.56829 |
| 23 | −43.19825 | 0.270 | | | |
| *24 | 212.06850 | 3.500 | 1.85135 | 40.10 | 0.56954 |
| *25 | −49.44970 | 0.100 | | | |
| 26 | −198.30901 | 5.000 | 1.88299 | 40.78 | 0.56829 |
| 27 | −26.00594 | 1.200 | 1.80518 | 25.42 | 0.61616 |
| 28 | −102.97698 | DD[28] | | | |
| 29 | ∞ | 2.850 | 1.51680 | 64.20 | 0.53430 |
| 30 | ∞ | 1.384 | | | |

TABLE 2

| Example 1 | |
|---|---|
| f | 34.686 |
| FNo. | 1.03 |
| 2ω(°) | 45.4 |

TABLE 3

| | Example 1 | |
|---|---|---|
| | Infinity | 0.3 m |
| DD[14] | 9.714 | 3.111 |
| DD[28] | 13.000 | 19.603 |

TABLE 4

| | Example 1 | |
|---|---|---|
| Sn | 24 | 25 |
| KA | 1.0000000E+00 | 1.0000000E+00 |
| A4 | −4.7482432E−06 | 7.7941132E−06 |
| A6 | 1.7599809E−08 | 1.3131271E−08 |
| A8 | −8.0047716E−11 | 1.0492084E−10 |
| A10 | 8.9303669E−13 | −1.2564838E−13 |
| A12 | 5.1154366E−16 | 3.9366622E−15 |

Figure 14:
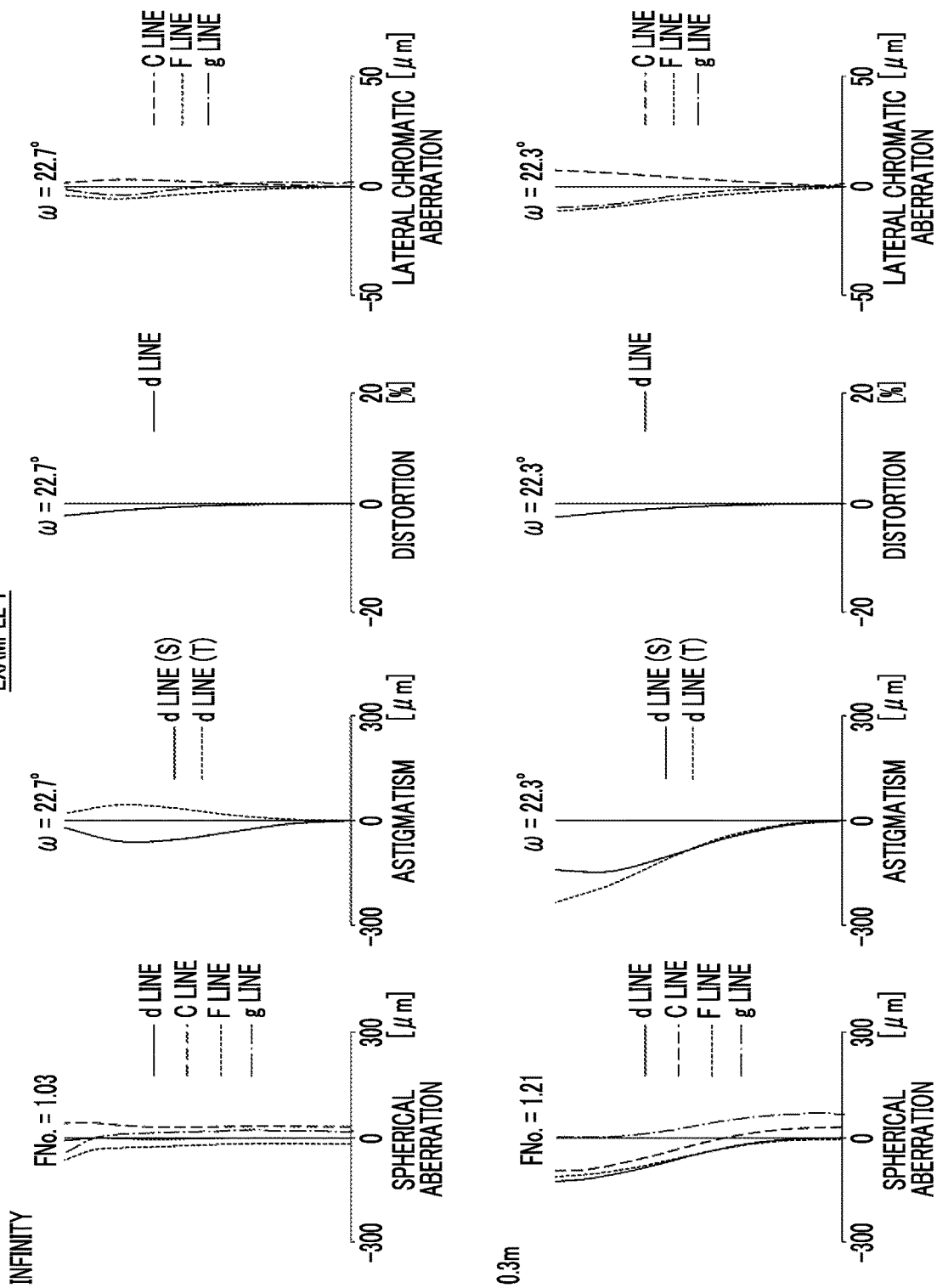
FIG. 14 shows spherical aberration diagrams, astigmatism diagrams, distortion diagrams, lateral chromatic aberration diagrams of the imaging lens of Example 1 of the present disclosure.
Figure 15:
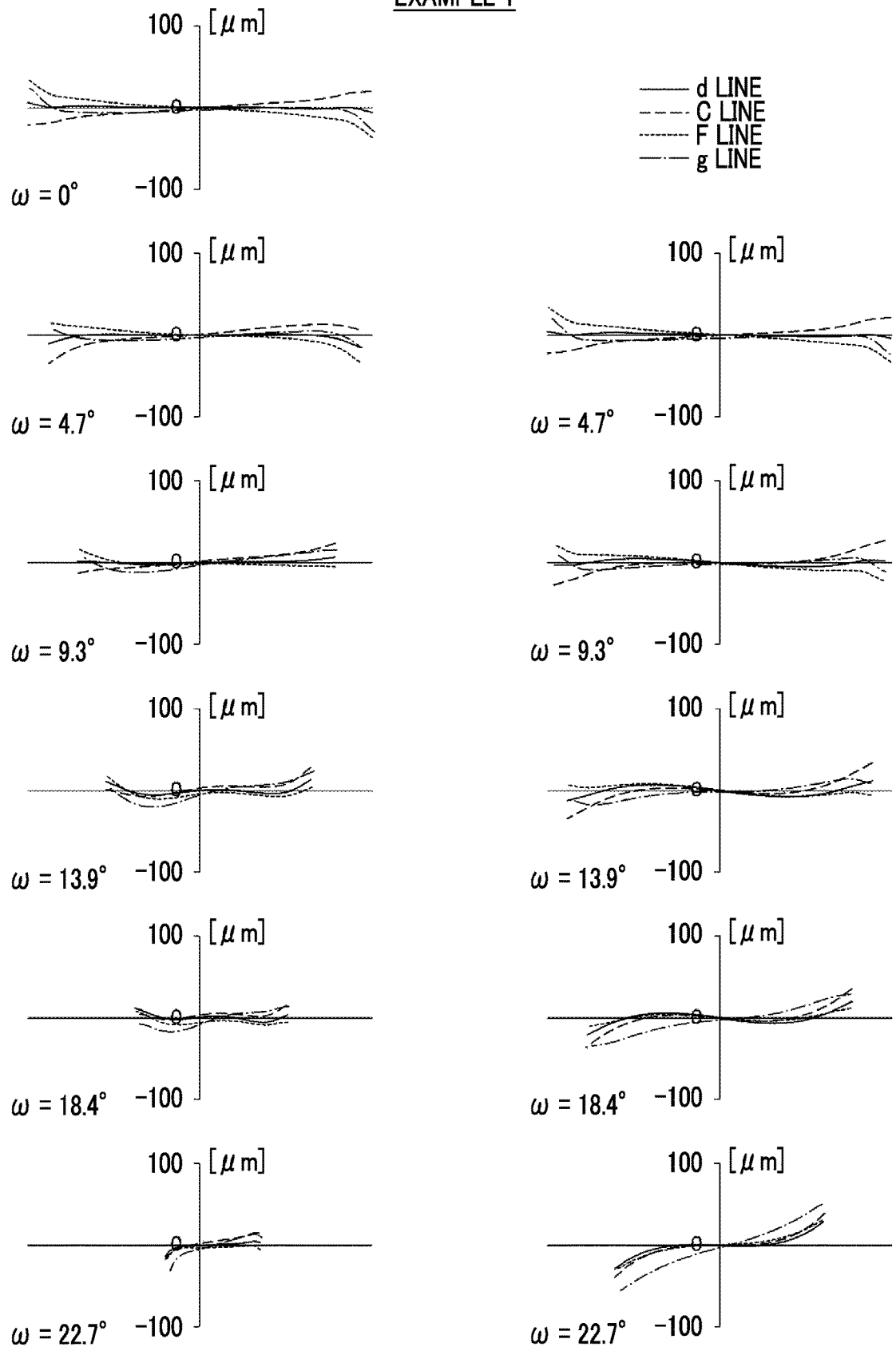
FIG. 15 is a lateral aberration diagram of the imaging lens according to Example 1 of the present disclosure.

FIGS. 14 and 15 each show aberration diagrams of the imaging lens of Example 1. FIG. 14 shows spherical aberration diagrams, astigmatism diagrams, distortion diagrams, and lateral chromatic aberration diagrams in order from the left. In FIG. 14, the upper part labeled "INFINITY" shows aberration diagrams in a state where the object at infinity is in focus, and the lower part labeled "0.3 m" shows aberration diagrams in a state where an object at the distance of 0.3 m (meter) from the object to the image plane Sim is in focus. In the spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line, the F line, and the g line are respectively indicated by the long dashed line, the short dashed line, and the chain line. In the spherical aberration diagram, FNo. indicates an F number. In the other aberration diagrams, ω indicates a half angle of view. FIG. 14 shows values of FNo. and ω corresponding to the upper part in the vertical axis of each diagram.

FIG. 15 shows lateral aberration diagram in a state in which the object at infinity is in focus. The left column shows tangential aberration and the right column shows sagittal aberration for each angle of view. In FIG. 15, ω means a half angle of view. In the lateral aberration diagram, aberrations at the d line, the C line, the F line, and the g line are indicated by the solid line, the long dashed line, the short dashed line, and the chain line, respectively.

Symbols, meanings, description methods, and illustration methods of the respective data pieces according to Example 1 are the same as those in the following examples unless otherwise noted. Therefore, in the following description, repeated description will be partially omitted.

Example 2

FIG. 2 shows a cross-sectional configuration of the imaging lens of Example 2. The imaging lens of Example 2 consists of, in order from the object side: a first lens group G1 that has a positive refractive power; a second lens group G2 that has a negative refractive power; an aperture stop St; a third lens group G3 that has a positive refractive power; and a fourth lens group G4 that has a positive refractive power. During focusing from the object at infinity to the closest object, the first lens group G1 and the fourth lens group G4 remains stationary with respect to the image plane Sim, and the second lens group G2, the aperture stop St, and the third lens group G3 integrally move to the object side along the axis Z. The first lens group G1 consists of seven lenses L11 to L17 in order from the object side. The second lens group G2 consists of three lenses L21 to L23 in order from the object side. The third lens group G3 consists of three lenses L31 to L33 in order from the object side. The fourth lens group G4 consists of two lenses L41 and L42 in order from the object side.

Figure 16:
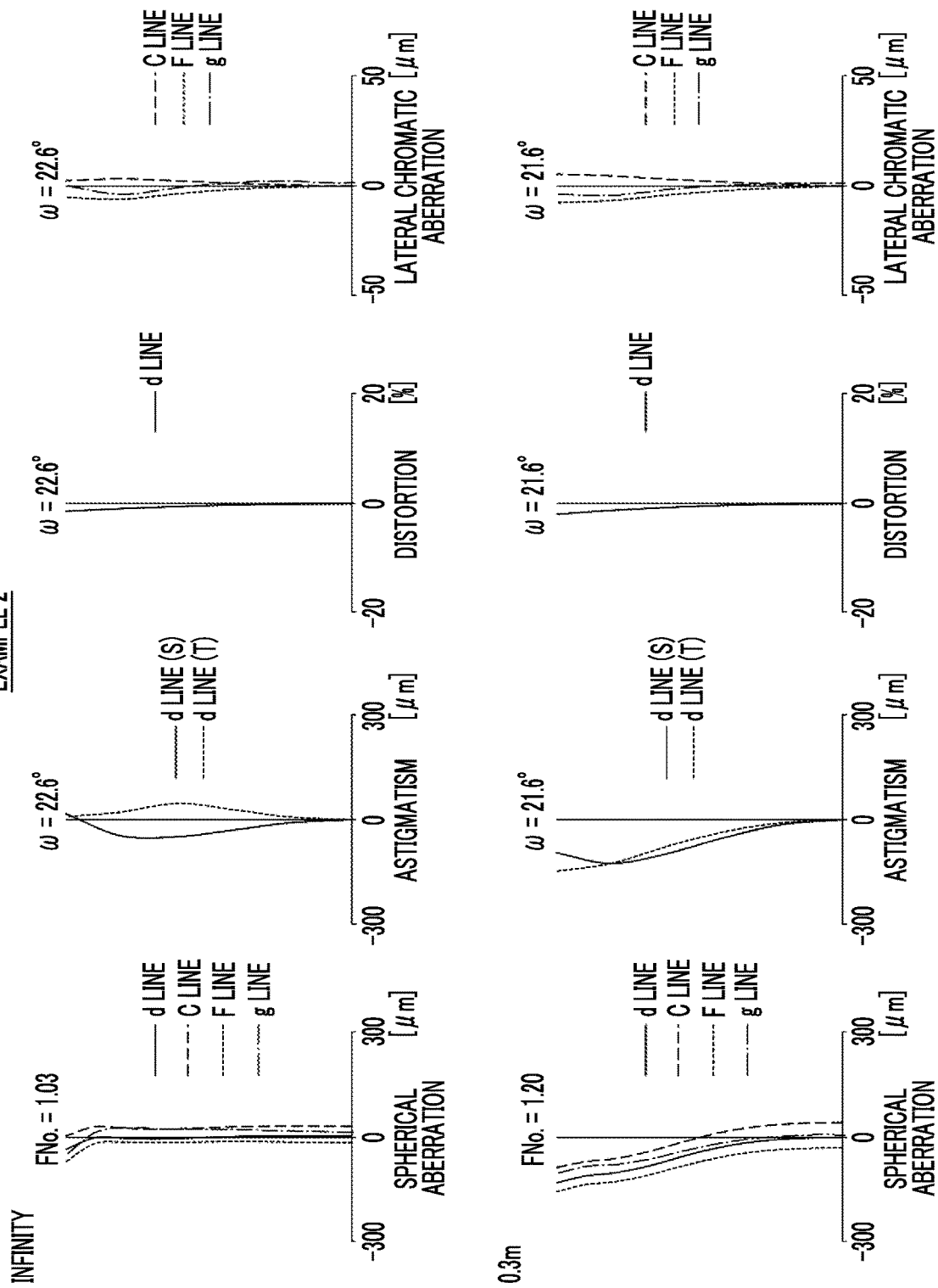
FIG. 16 shows spherical aberration diagrams, astigmatism diagrams, distortion diagrams, lateral chromatic aberration diagrams of the imaging lens of Example 2 of the present disclosure.
Figure 17:
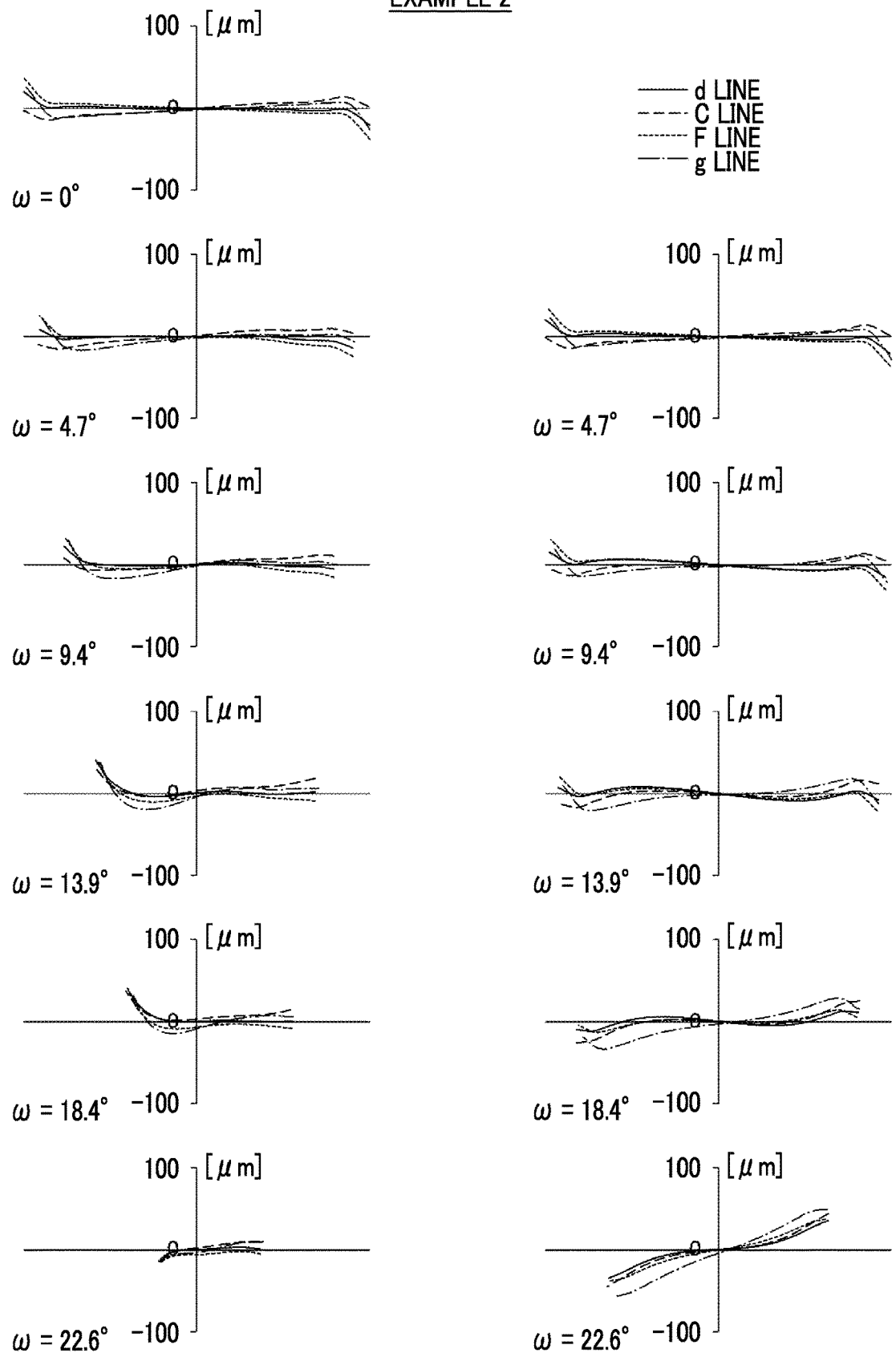
FIG. 17 is a lateral aberration diagram of the imaging lens according to Example 2 of the present disclosure.

Regarding the imaging lens of Example 2, Table 5 shows basic lens data, Table 6 shows specification, Table 7 shows variable surface distances, Table 8 shows aspheric surface coefficients, and FIGS. 16 and 17 show aberration diagrams. In FIG. 16, the upper part shows aberration diagrams in a state where the object at infinity is in focus, and the lower part shows aberration diagrams in a state where the object at the distance of 0.3 m (meter) from the object to the image plane Sim is in focus. FIG. 17 shows lateral aberration diagram in a state in which the object at infinity is in focus.

TABLE 5

| | | Example 2 | | | |
|---|---|---|---|---|---|
| Sn | R | D | Nd | vd | θgF |
| 1 | −725.39048 | 6.973 | 1.78943 | 49.06 | 0.55067 |
| 2 | −83.54081 | 1.033 | | | |
| 3 | −71.32865 | 2.000 | 1.70753 | 29.62 | 0.59920 |
| 4 | 42.31175 | 7.552 | | | |
| 5 | 370.52165 | 4.673 | 1.91104 | 36.90 | 0.57625 |
| 6 | −140.28048 | 4.426 | | | |
| 7 | −54.54081 | 1.860 | 1.68742 | 31.46 | 0.59487 |
| 8 | 49.05925 | 12.822 | 1.99857 | 17.88 | 0.64395 |
| 9 | −165.42113 | 0.200 | | | |
| 10 | 92.78127 | 14.401 | 1.80646 | 47.35 | 0.55343 |
| 11 | −47.76709 | 2.020 | 1.99966 | 15.02 | 0.65506 |
| 12(Hm) | −122.59813 | DD[12] | | | |
| 13 | 57.72885 | 6.000 | 2.00001 | 21.12 | 0.63152 |
| 14 | 600.21497 | 0.757 | | | |
| 15 | 32.42031 | 10.220 | 1.59529 | 61.33 | 0.54201 |
| 16 | −48.73177 | 1.550 | 1.86052 | 21.97 | 0.62342 |
| 17 | 19.60172 | 5.500 | | | |
| 18(St) | ∞ | 6.424 | | | |

TABLE 5-continued

Example 2

| Sn | R | D | Nd | vd | θgF |
|---|---|---|---|---|---|
| 19 | −22.63101 | 1.510 | 1.61799 | 36.20 | 0.58419 |
| 20 | 28.00746 | 8.587 | 1.88484 | 39.05 | 0.57097 |
| 21 | −39.11818 | 0.270 | | | |
| *22 | 122.65799 | 3.500 | 1.86565 | 41.44 | 0.56502 |
| *23 | −57.88263 | DD[23] | | | |
| 24 | 93.64106 | 3.010 | 1.76155 | 51.84 | 0.54664 |
| 25 | −98.80881 | 1.000 | 1.80371 | 32.58 | 0.59280 |
| 26 | 140.32828 | 12.084 | | | |
| 27 | ∞ | 2.850 | 1.51680 | 64.20 | 0.53430 |
| 28 | ∞ | 0.998 | | | |

TABLE 6

Example 2

| f | 34.581 |
|---|---|
| FNo. | 1.03 |
| 2ω(°) | 45.2 |

TABLE 7

Example 2

| | Infinity | 0.3 m |
|---|---|---|
| DD[12] | 8.797 | 3.079 |
| DD[23] | 2.000 | 7.718 |

TABLE 8

Example 2

| Sn | 22 | 23 |
|---|---|---|
| KA | 1.0000000E+00 | 1.0000000E+00 |
| A4 | −5.6507931E−06 | 1.4557802E−06 |
| A6 | 1.0303015E−08 | 2.8788290E−10 |
| A8 | −1.7237445E−10 | −4.2359087E−11 |
| A10 | 4.9611788E−13 | 2.1637160E−15 |
| A12 | −7.5754679E−16 | 1.4115532E−16 |

Example 3

Figure 3:
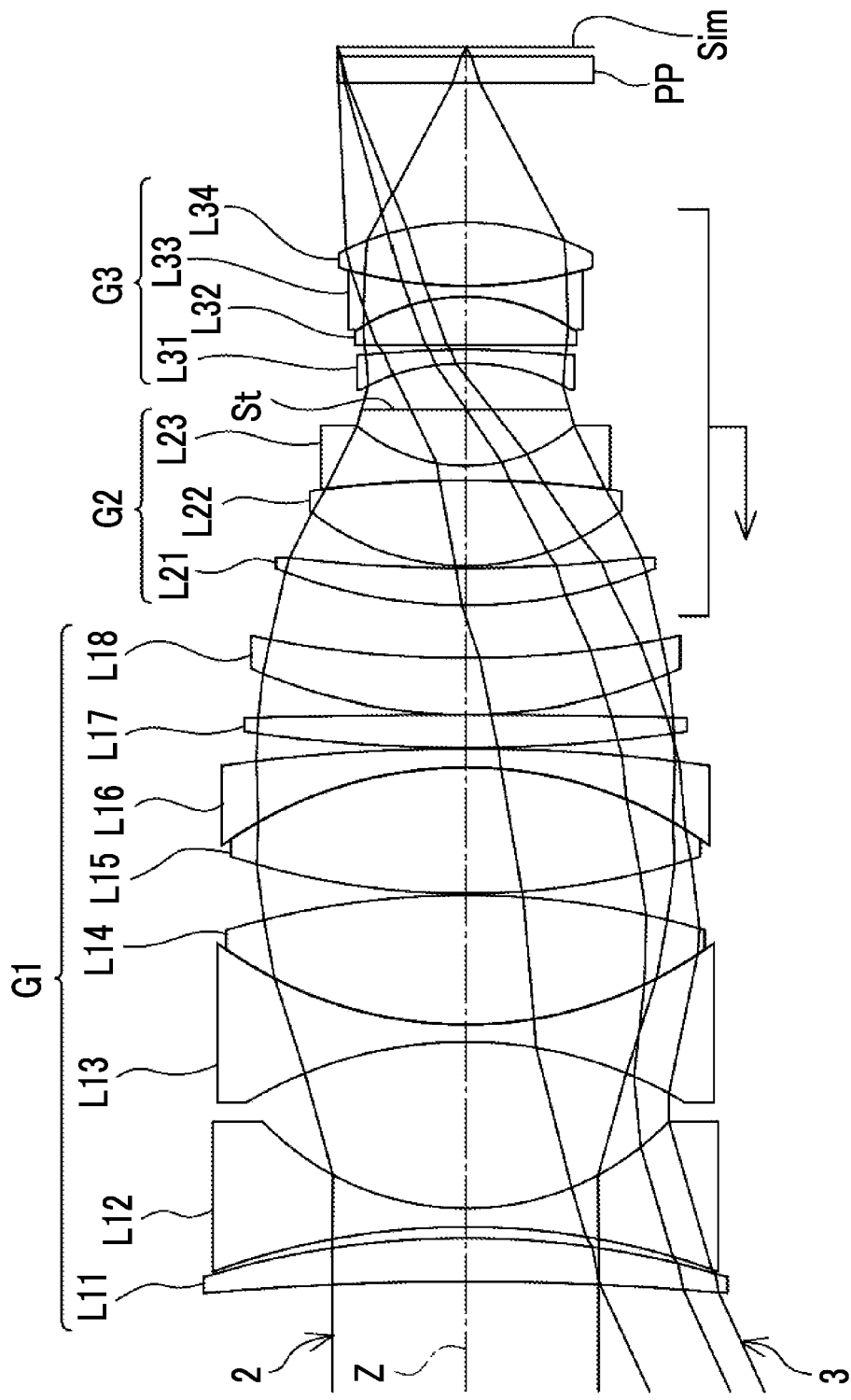
FIG. 3 is a cross-sectional view showing a configuration and rays of a third configuration example of an imaging lens according to an embodiment of the present disclosure corresponding to the imaging lens of Example 3 of the present disclosure.

FIG. 3 shows a cross-sectional configuration of the imaging lens of Example 3. The imaging lens of Example 3 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of four lenses L31 to L34 in order from the object side.

Figure 18:
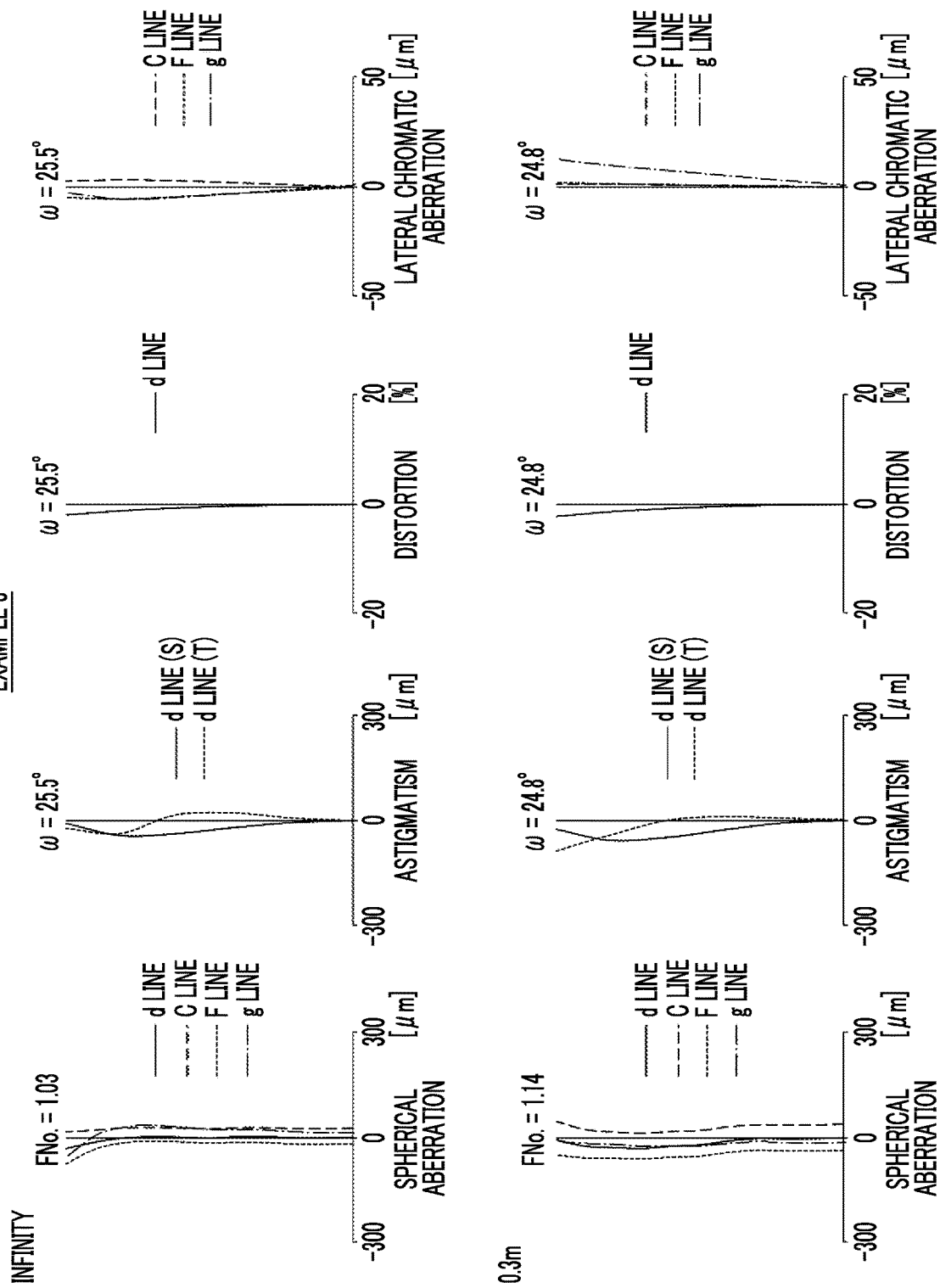
FIG. 18 shows spherical aberration diagrams, astigmatism diagrams, distortion diagrams, lateral chromatic aberration diagrams of the imaging lens of Example 3 of the present disclosure.
Figure 19:
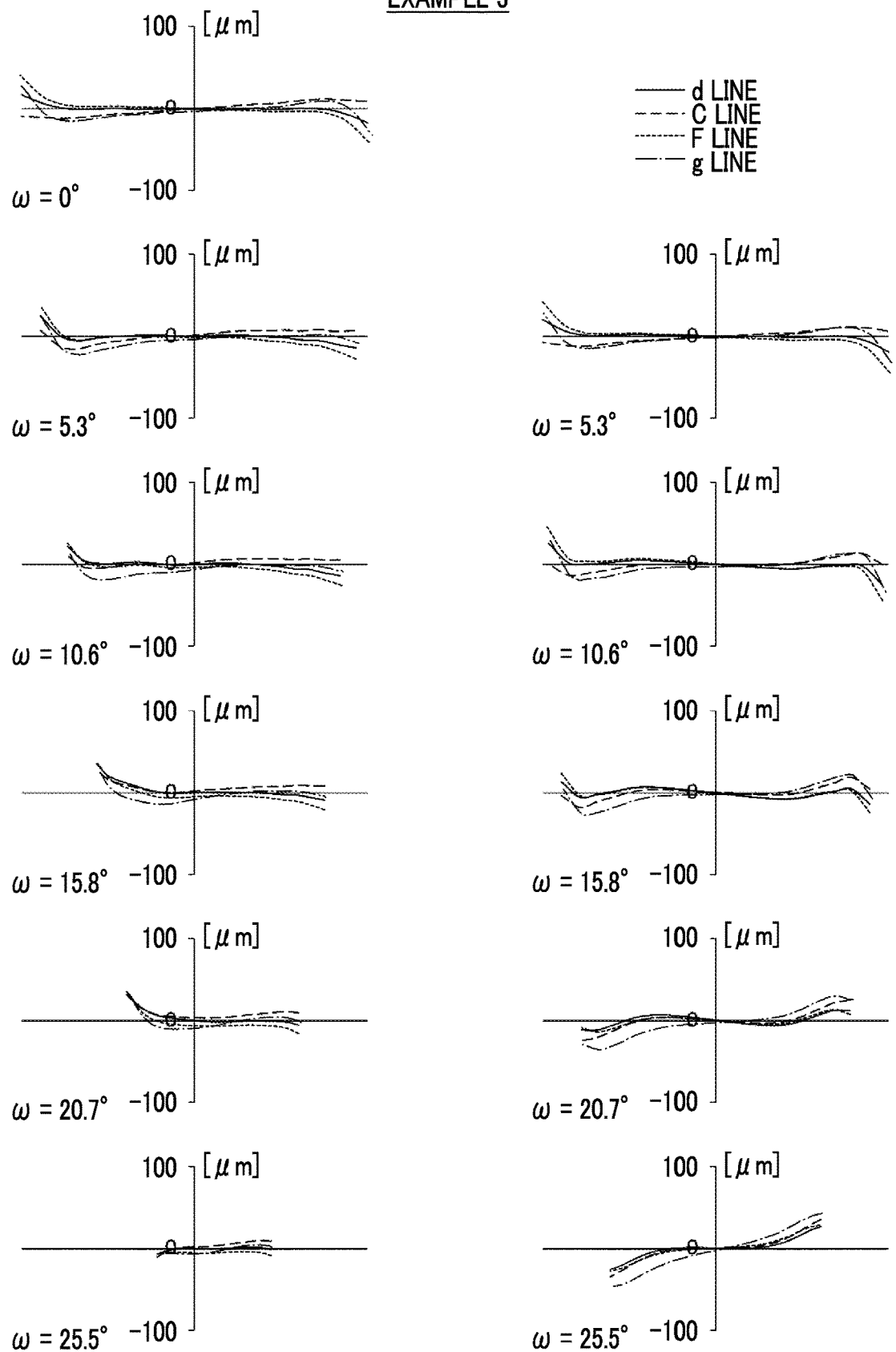
FIG. 19 is a lateral aberration diagram of the imaging lens according to Example 3 of the present disclosure.

Regarding the imaging lens of Example 3, Table 9 shows basic lens data, Table 10 shows specification, Table 11 shows variable surface distances, Table 12 shows aspheric surface coefficients, and FIGS. 18 and 19 show aberration diagrams. In FIG. 18, the upper part shows aberration diagrams in a state where the object at infinity is in focus, and the lower part shows aberration diagrams in a state where the object at the distance of 0.3 m (meter) from the object to the image plane Sim is in focus. FIG. 19 shows lateral aberration diagram in a state

TABLE 9

Example 3

| Sn | R | D | Nd | vd | θgF |
|---|---|---|---|---|---|
| 1 | −333.15506 | 4.691 | 1.89622 | 38.38 | 0.57235 |
| 2 | −102.12639 | 1.206 | | | |
| 3 | −83.34891 | 2.000 | 1.49102 | 56.68 | 0.54712 |
| 4 | 31.71528 | 17.951 | | | |
| 5 | −48.39938 | 1.860 | 1.71277 | 29.36 | 0.59990 |
| 6 | 47.43068 | 13.952 | 1.99710 | 20.98 | 0.63196 |
| 7 | −95.23842 | 0.200 | | | |
| 8 | 86.62572 | 13.593 | 1.73052 | 54.95 | 0.54279 |
| 9 | −47.49914 | 2.020 | 1.99151 | 15.42 | 0.65290 |
| 10(Hm) | −198.88669 | 0.100 | | | |
| 11 | 174.26264 | 3.545 | 1.41390 | 100.82 | 0.53373 |
| 12 | −871.82219 | 0.010 | | | |
| 13 | 60.39739 | 5.995 | 1.59522 | 67.73 | 0.54426 |
| 14 | 118.41560 | DD[14] | | | |
| 15 | 57.29202 | 4.000 | 2.00001 | 15.56 | 0.65300 |
| 16 | 170.26620 | 0.250 | | | |
| 17 | 27.93782 | 9.235 | 1.59522 | 67.73 | 0.54426 |
| 18 | −127.35688 | 1.550 | 1.76832 | 26.58 | 0.60779 |
| 19 | 18.81182 | 6.039 | | | |
| 20(St) | ∞ | 5.008 | | | |
| *21 | −28.74482 | 1.500 | 1.84494 | 22.75 | 0.62051 |
| *22 | −98.78010 | 0.500 | | | |
| 23 | −1687.62776 | 5.188 | 1.86310 | 41.69 | 0.56445 |
| 24 | −21.73057 | 1.170 | 1.58360 | 39.64 | 0.57730 |
| 25 | 50.75265 | 6.850 | 1.87935 | 39.50 | 0.56994 |
| 26 | −31.14815 | DD[26] | | | |
| 27 | ∞ | 2.850 | 1.51680 | 64.20 | 0.53430 |
| 28 | ∞ | 1.031 | | | |

TABLE 10

Example 3

| f | 30.369 |
|---|---|
| FNo. | 1.03 |
| 2ω(°) | 51.0 |

TABLE 11

Example 3

| | Infinity | 0.3 m |
|---|---|---|
| DD[14] | 5.692 | 1.553 |
| DD[26] | 15.041 | 19.180 |

TABLE 12

Example 3

| Sn | 21 | 22 |
|---|---|---|
| KA | 1.0000000E+00 | 1.0000000E+00 |
| A4 | −1.9639176E−05 | 6.1985348E−06 |
| A6 | −1.1520024E−06 | −8.6193774E−07 |
| A8 | 5.8666667E−08 | 3.8273478E−08 |
| A10 | −1.6643161E−09 | −8.8436866E−10 |
| A12 | 2.9805280E−11 | 1.2716517E−11 |
| A14 | −3.3935724E−13 | −1.1527155E−13 |
| A16 | 2.3716398E−15 | 6.3612120E−16 |

TABLE 12-continued

| | Example 3 | |
|---|---|---|
| Sn | 21 | 22 |
| A18 | −9.2569738E−18 | −1.9399672E−18 |
| A20 | 1.5427560E−20 | 2.4891543E−21 |

Example 4

FIG. 4 shows a cross-sectional configuration of the imaging lens of Example 4. The imaging lens of Example 4 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of three lenses L31 to L33 in order from the object side.

Figure 20:
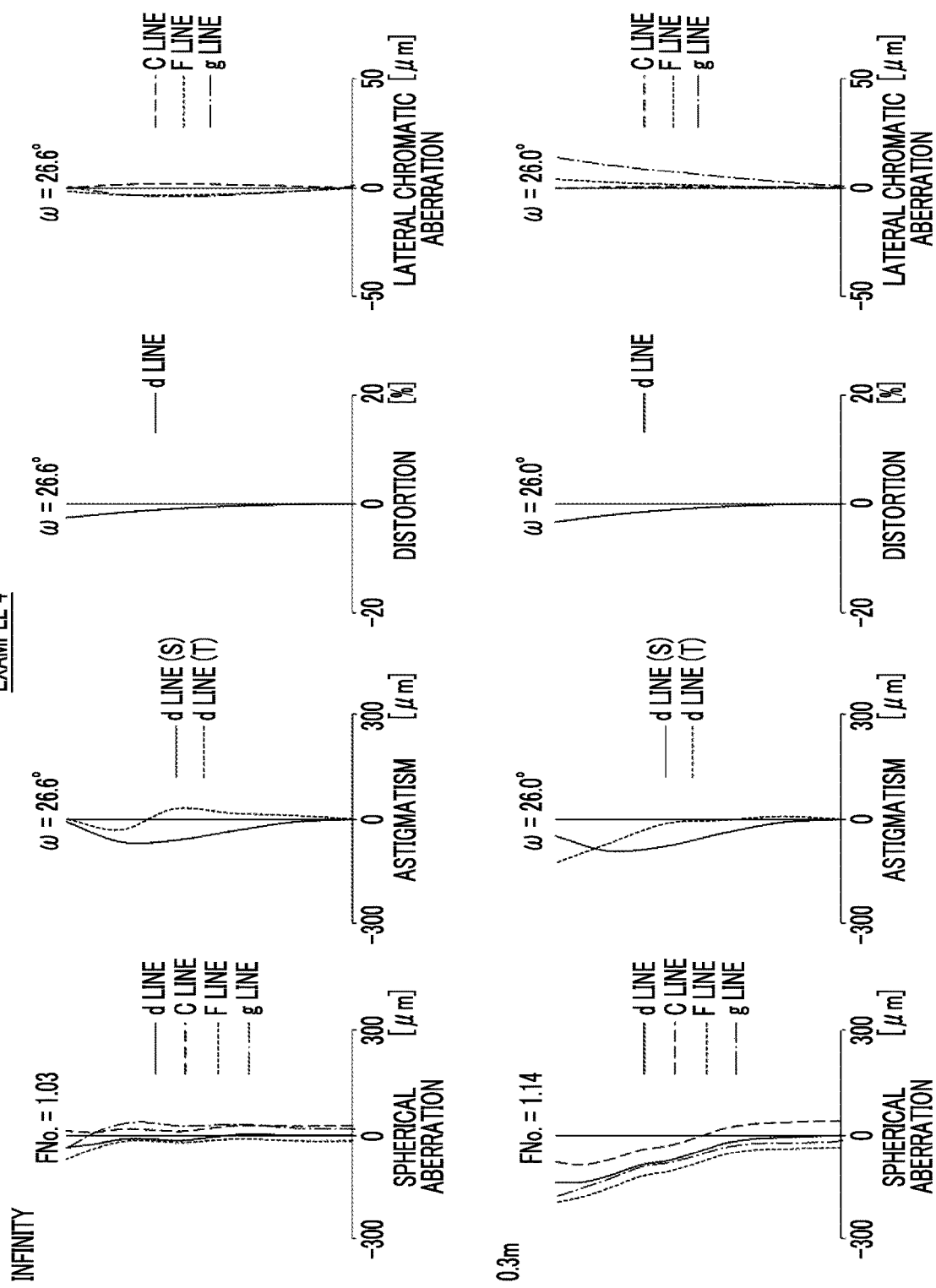
FIG. 20 shows spherical aberration diagrams, astigmatism diagrams, distortion diagrams, lateral chromatic aberration diagrams of the imaging lens of Example 4 of the present disclosure.
Figure 21:
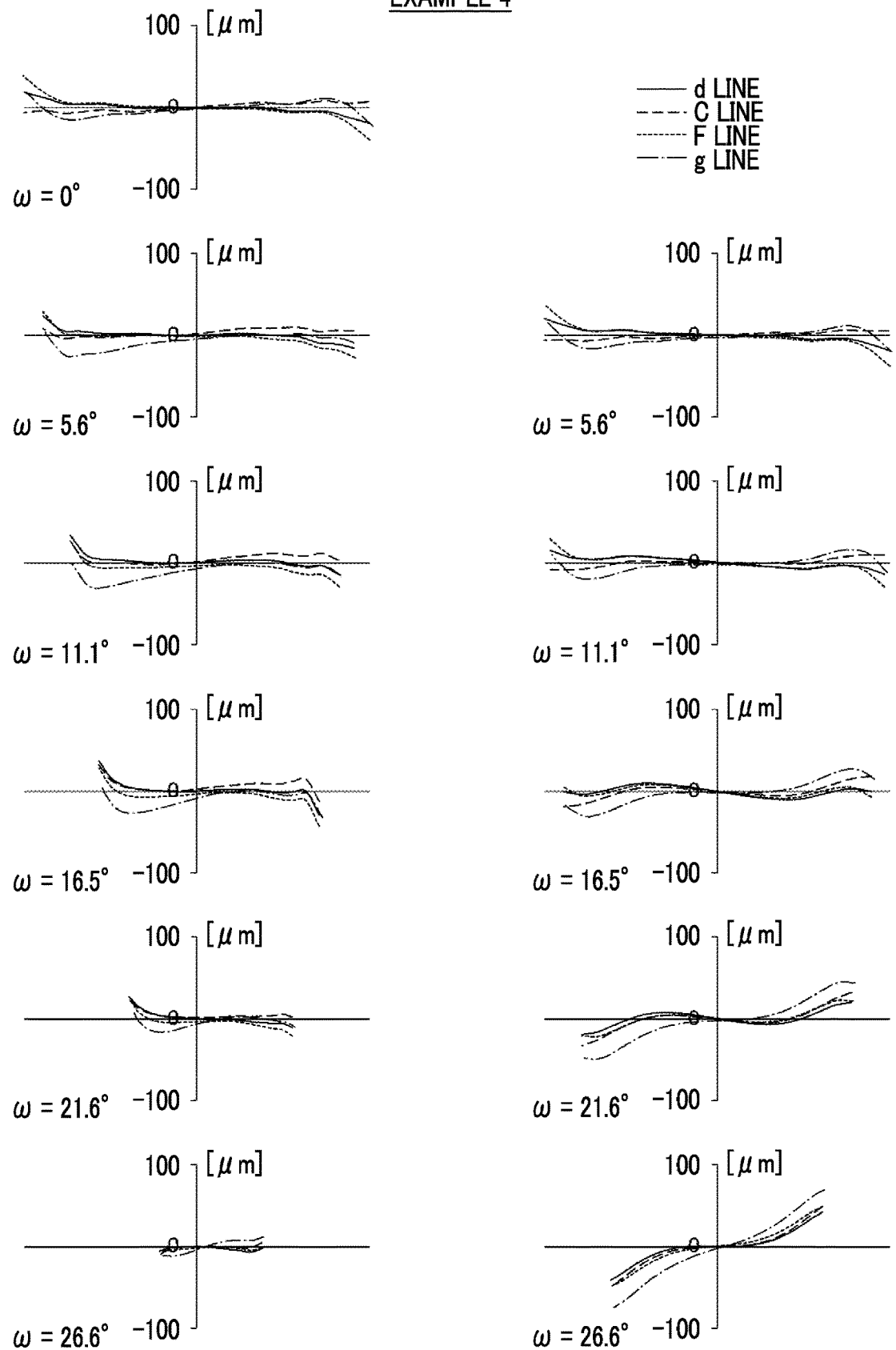
FIG. 21 is a lateral aberration diagram of the imaging lens according to Example 4 of the present disclosure.

Regarding the imaging lens of Example 4, Table 13 shows basic lens data, Table 14 shows specification, Table 15 shows variable surface distances, Table 16 shows aspheric surface coefficients, and FIGS. 20 and 21 show aberration diagrams. In FIG. 20, the upper part shows aberration diagrams in a state where the object at infinity is in focus, and the lower part shows aberration diagrams in a state where the object at the distance of 0.3 m (meter) from the object to the image plane Sim is in focus. FIG. 21 shows lateral aberration diagram in a state

TABLE 13

| | Example 4 | | | | |
|---|---|---|---|---|---|
| Sn | R | D | Nd | vd | θgF |
| 1 | −741.84965 | 4.557 | 2.00001 | 16.35 | 0.64993 |
| 2 | −133.27267 | 2.137 | | | |
| 3 | −88.69549 | 2.000 | 1.51957 | 51.33 | 0.55675 |
| 4 | 30.12135 | 17.951 | | | |
| 5 | −43.59777 | 1.860 | 1.72220 | 28.89 | 0.60118 |
| 6 | 50.07951 | 14.509 | 1.99166 | 26.42 | 0.61104 |
| 7 | −73.94447 | 0.200 | | | |
| 8 | 102.81602 | 12.918 | 1.72183 | 55.41 | 0.54271 |
| 9 | −47.50103 | 2.020 | 1.96573 | 16.71 | 0.64633 |
| 10(Hm) | −188.35959 | 0.100 | | | |
| 11 | 282.52887 | 4.513 | 1.43875 | 94.66 | 0.53402 |
| 12 | −146.67361 | 0.010 | | | |
| 13 | 51.37757 | 3.531 | 1.59522 | 67.73 | 0.54426 |
| 14 | 63.46607 | DD[14] | | | |
| 15 | 49.82440 | 5.000 | 2.00001 | 15.00 | 0.65515 |
| 16 | 197.53926 | 0.250 | | | |
| 17 | 27.63615 | 9.109 | 1.59522 | 67.73 | 0.54426 |
| 18 | −134.79322 | 1.550 | 1.85370 | 22.31 | 0.62213 |
| 19 | 18.23355 | 5.500 | | | |
| 20(St) | ∞ | 5.487 | | | |
| 21 | −18.30655 | 1.500 | 1.63029 | 39.17 | 0.57925 |
| 22 | −48.92302 | 5.529 | 1.48984 | 65.39 | 0.53509 |
| 23 | −24.64229 | 0.100 | | | |
| *24 | 56.89240 | 6.000 | 1.79341 | 48.66 | 0.55129 |
| *25 | −36.65031 | DD[25] | | | |
| 26 | ∞ | 2.850 | 1.51680 | 64.20 | 0.53430 |
| 27 | ∞ | 1.066 | | | |

TABLE 14

| Example 4 | |
|---|---|
| f | 29.079 |
| FNo. | 1.03 |
| 2ω(°) | 53.2 |

TABLE 15

| | Example 4 | |
|---|---|---|
| | Infinity | 0.3 m |
| DD[14] | 6.500 | 2.810 |
| DD[25] | 16.276 | 19.966 |

TABLE 16

| | Example 4 | |
|---|---|---|
| Sn | 24 | 25 |
| KA | 1.0000000E+00 | 1.0000000E+00 |
| A4 | −1.6809135E−06 | 8.5774318E−06 |
| A6 | −2.1517689E−07 | −2.0857403E−07 |
| A8 | 9.2942401E−09 | 6.7208947E−09 |
| A10 | −2.1073323E−10 | −1.2334691E−10 |
| A12 | 2.8305897E−12 | 1.3706654E−12 |
| A14 | −2.3236997E−14 | −9.4138699E−15 |
| A16 | 1.1475262E−16 | 3.9270429E−17 |
| A18 | −3.1366558E−19 | −9.1668061E−20 |
| A20 | 3.6536989E−22 | 9.2574233E−23 |

Example 5

FIG. 5 shows a cross-sectional configuration of the imaging lens of Example 5. The imaging lens of Example 5 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of four lenses L31 to L34 in order from the object side.

Figure 22:
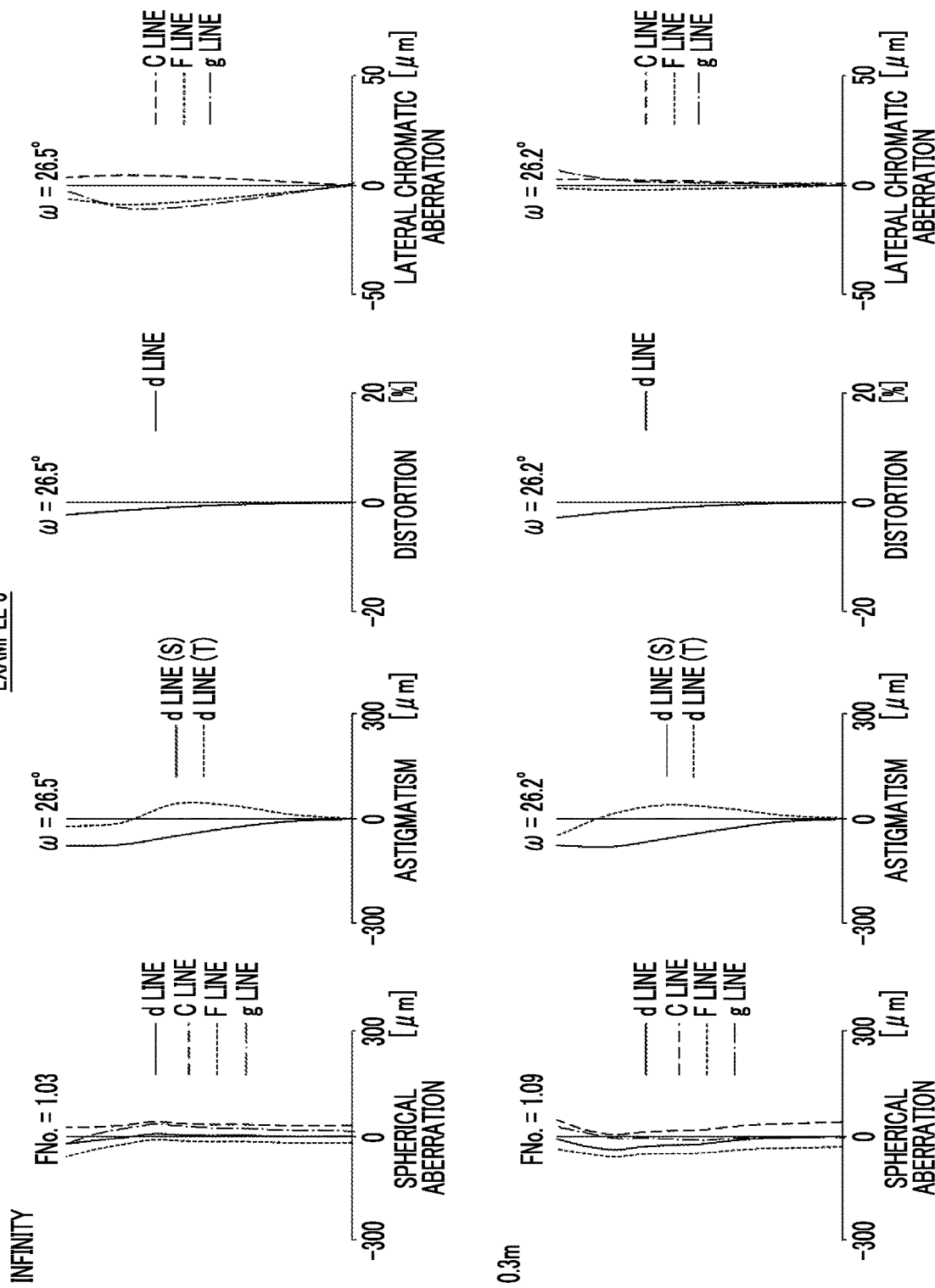
FIG. 22 shows spherical aberration diagrams, astigmatism diagrams, distortion diagrams, lateral chromatic aberration diagrams of the imaging lens of Example 5 of the present disclosure.
Figure 23:
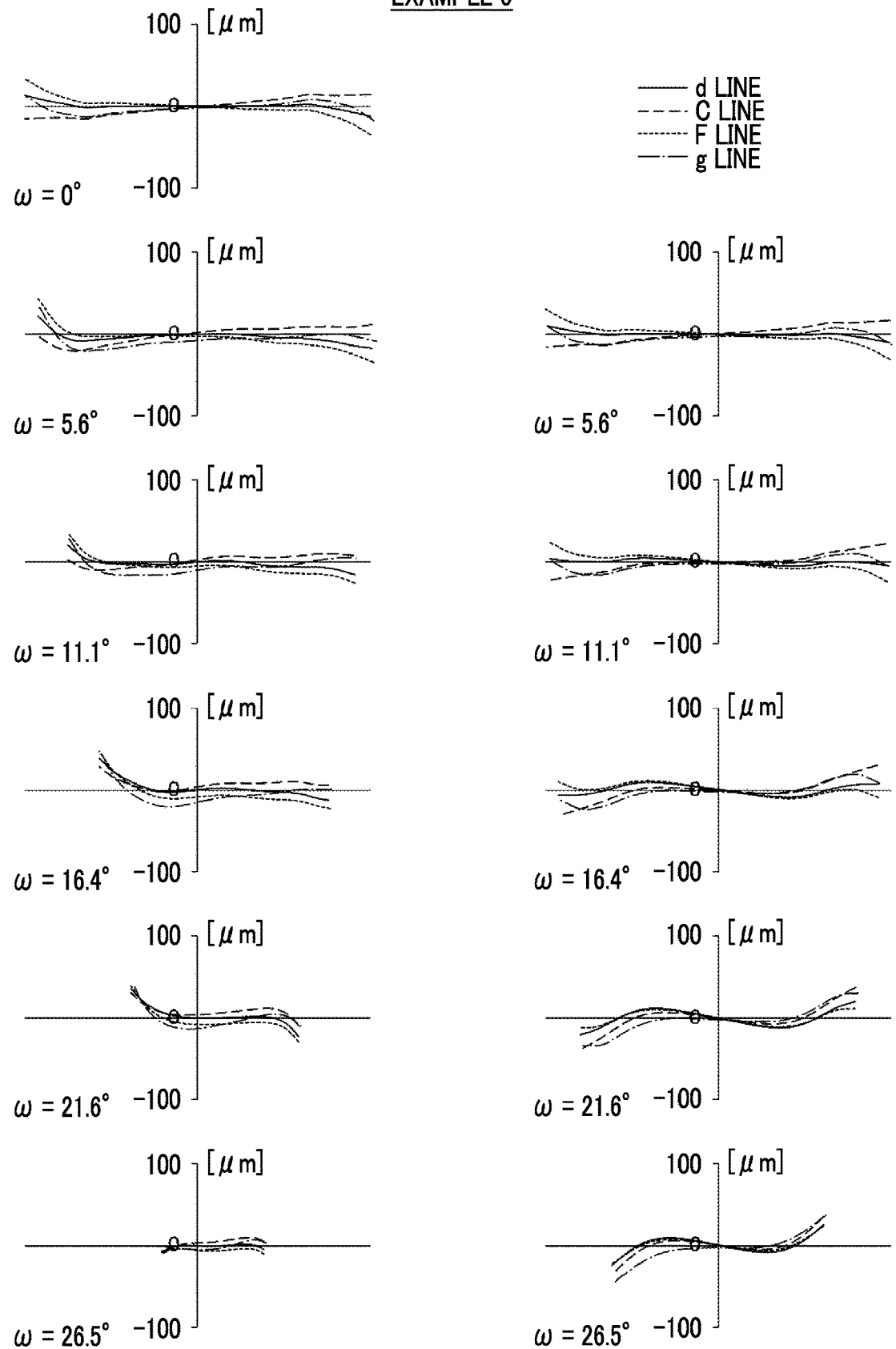
FIG. 23 is a lateral aberration diagram of the imaging lens according to Example 5 of the present disclosure.

Regarding the imaging lens of Example 5, Table 17 shows basic lens data, Table 18 shows specification, Table 19 shows variable surface distances, Table 20 shows aspheric surface coefficients, and FIGS. 22 and 23 show aberration diagrams. In FIG. 22, the upper part shows aberration diagrams in a state where the object at infinity is in focus, and the lower part shows aberration diagrams in a state where the object at the distance of 0.3 m (meter) from the object to the image plane Sim is in focus. FIG. 23 shows lateral aberration diagram in a state

TABLE 17

Example 5

| Sn | R | D | Nd | vd | θgF |
|---|---|---|---|---|---|
| 1 | −579.01593 | 5.063 | 1.90861 | 37.14 | 0.57560 |
| 2 | −105.22446 | 1.089 | | | |
| 3 | −88.22394 | 2.000 | 1.56576 | 42.67 | 0.57184 |
| 4 | 32.63215 | 15.760 | | | |
| 5 | −49.28608 | 1.860 | 1.70995 | 29.50 | 0.59952 |
| 6 | 47.50722 | 15.180 | 2.00000 | 19.69 | 0.63702 |
| 7 | −98.51761 | 0.200 | | | |
| 8 | 86.98840 | 13.641 | 1.73283 | 54.72 | 0.54305 |
| 9 | −47.49919 | 2.020 | 1.96769 | 16.62 | 0.64682 |
| 10(Hm) | −210.71580 | 0.100 | | | |
| 11 | 158.16842 | 3.892 | 1.43875 | 94.66 | 0.53402 |
| 12 | −552.62976 | 0.010 | | | |
| 13 | 50.24351 | 6.293 | 1.59522 | 67.73 | 0.54426 |
| 14 | 93.76344 | DD[14] | | | |
| 15 | 28.53601 | 9.077 | 1.79767 | 48.23 | 0.55198 |
| 16 | 1390.07200 | 1.560 | 1.61684 | 36.32 | 0.58395 |
| 17 | 16.64969 | 2.000 | | | |
| 18 | 22.54820 | 2.500 | 2.00001 | 18.27 | 0.64253 |
| 19 | 25.69710 | 5.500 | | | |
| 20(St) | ∞ | 5.036 | | | |
| *21 | −28.49925 | 1.500 | 1.80801 | 24.60 | 0.61407 |
| *22 | −125.87546 | 0.500 | | | |
| 23 | 332.87234 | 7.425 | 1.84767 | 43.23 | 0.56115 |
| 24 | −20.20695 | 1.170 | 1.63141 | 34.90 | 0.58688 |
| 25 | 44.12968 | 6.850 | 1.83788 | 44.21 | 0.55918 |
| 26 | −28.76348 | DD[26] | | | |
| 27 | ∞ | 2.850 | 1.51680 | 64.20 | 0.53430 |
| 28 | ∞ | 1.037 | | | |

TABLE 18

Example 5

| | |
|---|---|
| f | 29.119 |
| FNo. | 1.03 |
| 2ω(°) | 53.0 |

TABLE 19

Example 5

| | | 0.3 m |
|---|---|---|
| DD[14] | 6.170 | 2.319 |
| DD[26] | 12.745 | 16.596 |

TABLE 20

Example 5

| Sn | 21 | 22 |
|---|---|---|
| KA | 1.0000000E+00 | 1.0000000E+00 |
| A4 | 1.0453623E−05 | 4.2274678E−05 |
| A6 | −1.1904801E−06 | −9.7361871E−07 |
| A8 | 4.6875478E−08 | 3.3035893E−08 |
| A10 | −1.2670671E−09 | −7.3155829E−10 |
| A12 | 2.2209082E−11 | 1.0582950E−11 |
| A14 | −2.4698192E−13 | −9.8169320E−14 |
| A16 | 1.6687970E−15 | 5.5648232E−16 |
| A18 | −6.2330369E−18 | −1.7423917E−18 |
| A20 | 9.8579129E−21 | 2.2954722E−21 |

Example 6

FIG. 6 shows a cross-sectional configuration of the imaging lens of Example 6. The imaging lens of Example 6 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of three lenses L31 to L33 in order from the object side.

Figure 24:
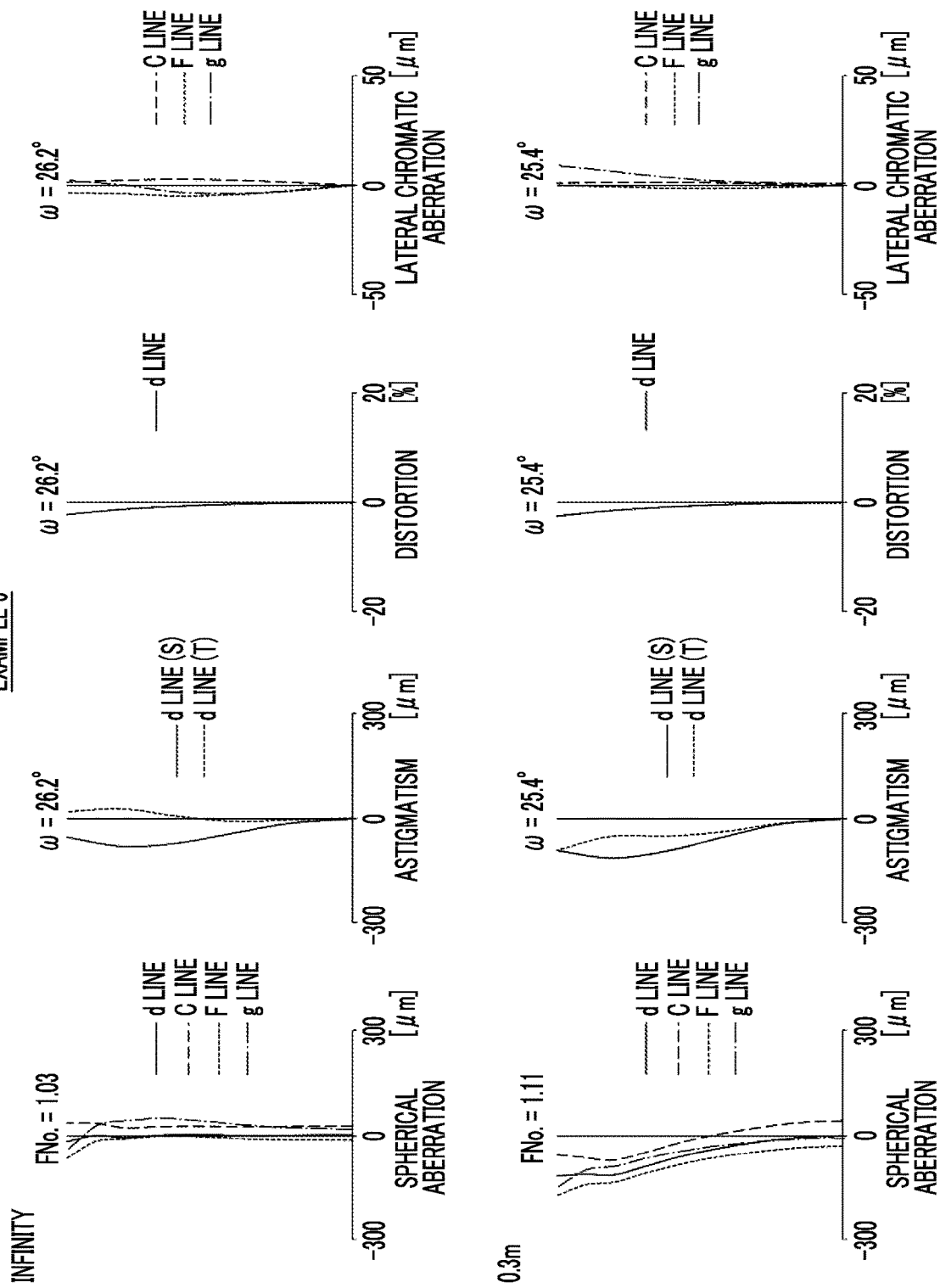
FIG. 24 shows spherical aberration diagrams, astigmatism diagrams, distortion diagrams, lateral chromatic aberration diagrams of the imaging lens of Example 6 of the present disclosure.
Figure 25:
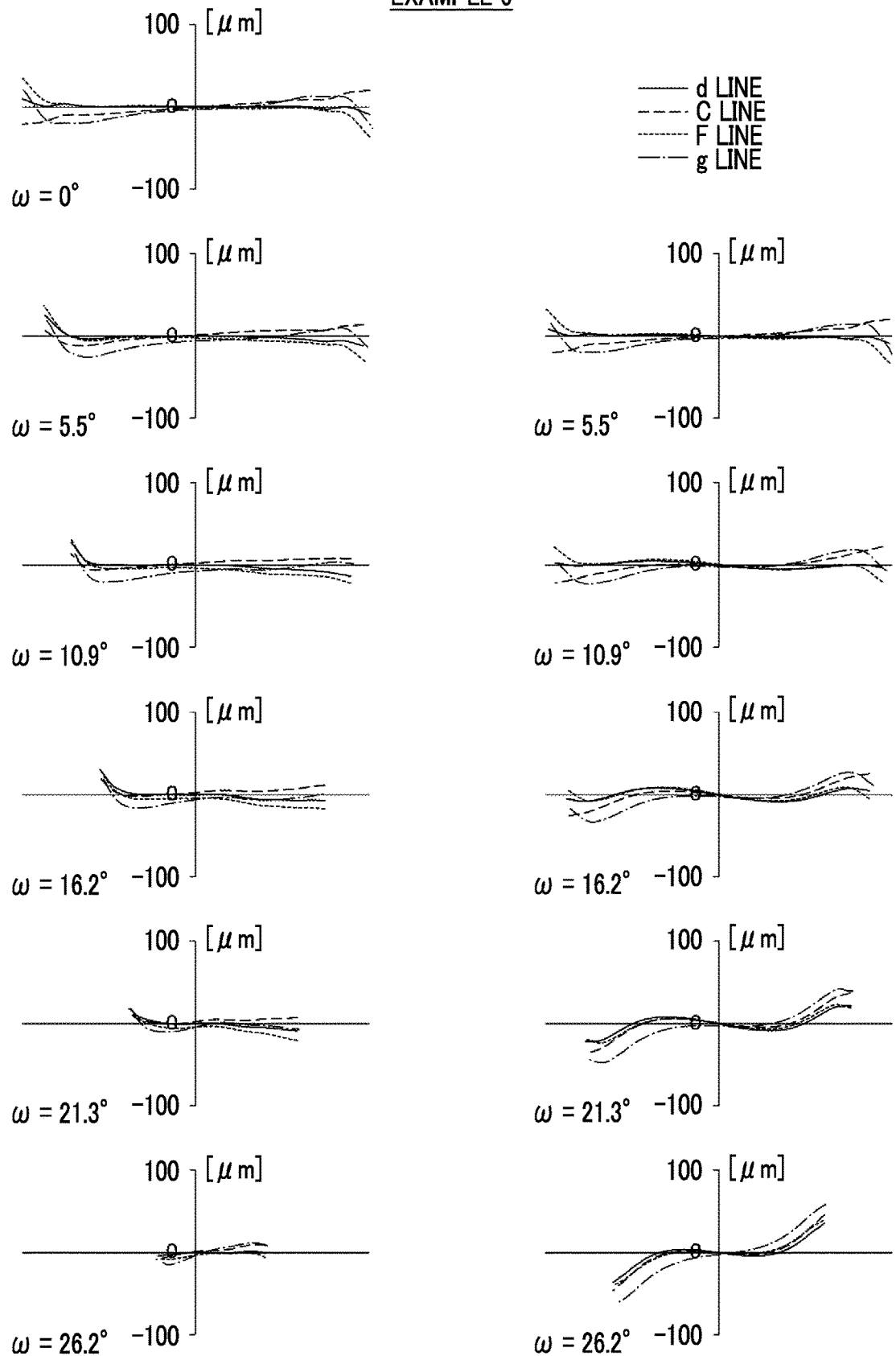
FIG. 25 is a lateral aberration diagram of the imaging lens according to Example 6 of the present disclosure.

Regarding the imaging lens of Example 6, Table 21 shows basic lens data, Table 22 shows specification, Table 23 shows variable surface distances, Table 24 shows aspheric surface coefficients, and FIGS. 24 and 25 show aberration diagrams. In FIG. 24, the upper part shows aberration diagrams in a state where the object at infinity is in focus, and the lower part shows aberration diagrams in a state where the object at the distance of 0.3 m (meter) from the object to the image plane Sim is in focus. FIG. 25 shows lateral aberration diagram in a state

TABLE 21

Example 6

| Sn | R | D | Nd | vd | θgF |
|---|---|---|---|---|---|
| 1 | 285.79276 | 6.788 | 2.00001 | 15.00 | 0.65515 |
| 2 | −220.76676 | 2.000 | | | |
| 3 | −106.25998 | 2.000 | 1.62947 | 35.50 | 0.58575 |
| 4 | 30.87680 | 16.951 | | | |
| 5 | −41.94190 | 1.860 | 1.74496 | 27.75 | 0.60436 |
| 6 | 51.61394 | 14.322 | 2.00001 | 26.36 | 0.61129 |
| 7 | −70.71601 | 0.200 | | | |
| 8 | 101.26178 | 13.069 | 1.72298 | 55.35 | 0.54271 |
| 9 | −47.50064 | 2.020 | 1.88780 | 20.61 | 0.62879 |
| 10 | −265.75722 | 0.100 | | | |
| 11(Hm) | 183.78841 | 4.637 | 1.43875 | 94.66 | 0.53402 |
| 12 | −194.40031 | 0.100 | | | |
| 13 | 67.77652 | 3.220 | 1.59522 | 67.73 | 0.54426 |
| 14 | 105.73049 | DD[14] | | | |
| 15 | 61.65482 | 4.000 | 2.00001 | 15.00 | 0.65515 |
| 16 | 210.21003 | 0.250 | | | |
| 17 | 25.73302 | 9.928 | 1.72839 | 55.08 | 0.54272 |
| 18 | −466.55174 | 1.550 | 1.84428 | 22.79 | 0.62039 |
| 19 | 16.41774 | 6.626 | | | |
| 20(St) | ∞ | 5.000 | | | |
| *21 | −27.68296 | 1.500 | 1.68948 | 31.02 | 0.59874 |
| *22 | −60.28702 | 3.153 | | | |
| 23 | −49.49333 | 3.000 | 1.83016 | 44.98 | 0.55768 |
| 24 | −31.18561 | 0.100 | | | |
| 25 | 147.69834 | 5.500 | 1.76371 | 51.63 | 0.54693 |
| 26 | −32.86585 | DD[26] | | | |
| 27 | ∞ | 2.850 | 1.51680 | 64.20 | 0.53430 |
| 28 | ∞ | 1.004 | | | |

TABLE 22

Example 6

| | |
|---|---|
| f | 29.508 |
| FNo. | 1.03 |
| 2ω(°) | 52.4 |

TABLE 23

Example 6

| | Infinity | 0.3 m |
|---|---|---|
| DD[14] | 6.500 | 2.709 |
| DD[26] | 14.791 | 18.582 |

TABLE 24

Example 6

| Sn | 21 | 22 |
|---|---|---|
| KA | 1.0000000E+00 | 1.0000000E+00 |
| A4 | −7.9311453E−05 | −5.2483658E−05 |
| A6 | 1.1731444E−06 | 1.1496595E−06 |
| A8 | −3.9320786E−08 | −3.6133771E−08 |
| A10 | 9.8954729E−10 | 8.6710554E−10 |
| A12 | −1.5713412E−11 | −1.3073451E−11 |
| A14 | 1.5755056E−13 | 1.2339516E−13 |
| A16 | −9.7699490E−16 | −7.1215068E−16 |
| A18 | 3.4271200E−18 | 2.3001063E−18 |
| A20 | −5.1975050E−21 | −3.1840466E−21 |

Example 7

FIG. 7 shows a cross-sectional configuration of the imaging lens of Example 7. The imaging lens of Example 7 consists of, in order from the object side: a first lens group G1 that has a positive refractive power; a second lens group G2 that has a negative refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of four lenses L31 to L34 in order from the object side.

Figure 26:
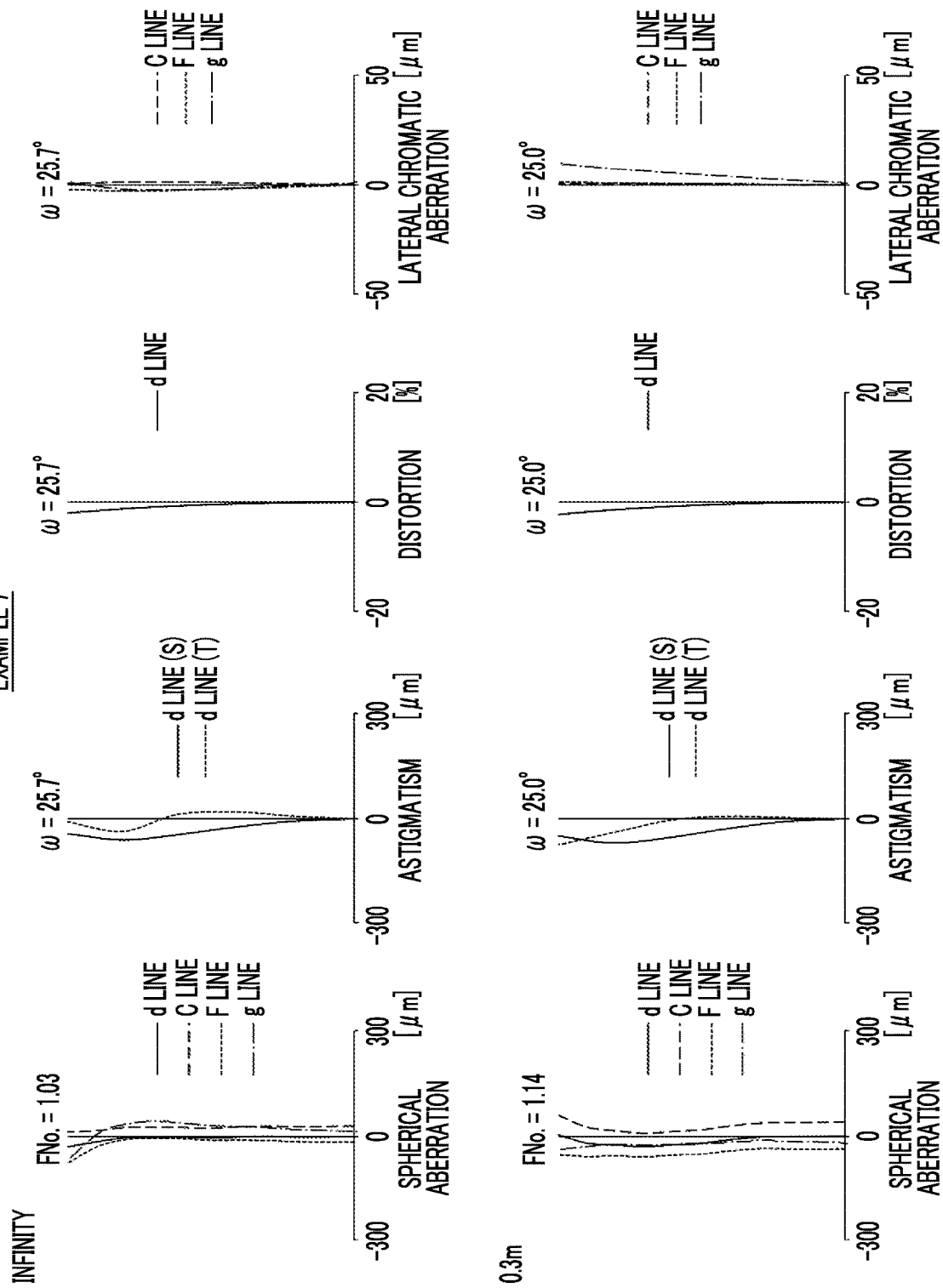
FIG. 26 shows spherical aberration diagrams, astigmatism diagrams, distortion diagrams, lateral chromatic aberration diagrams of the imaging lens of Example 7 of the present disclosure.
Figure 27:
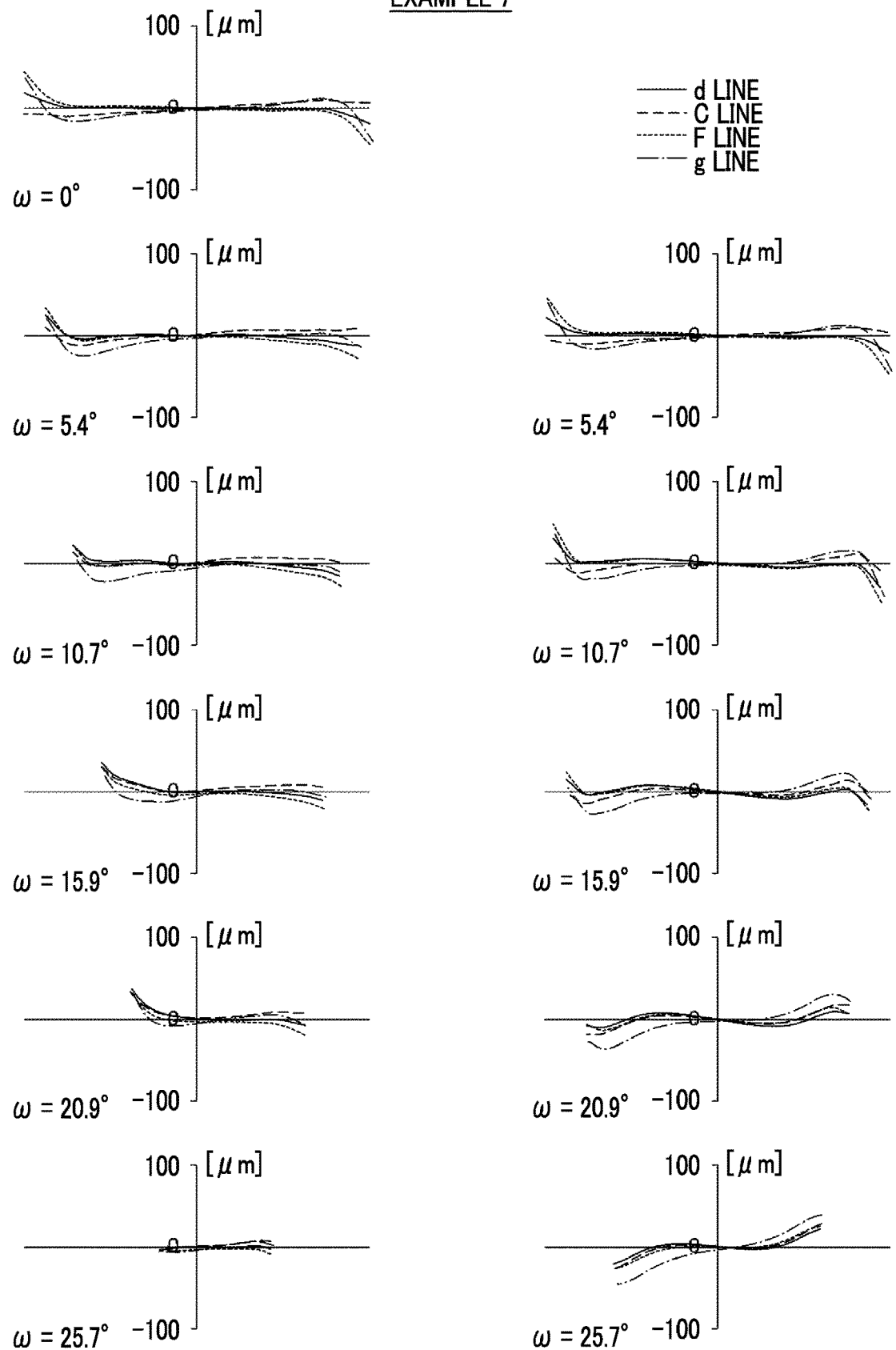
FIG. 27 is a lateral aberration diagram of the imaging lens according to Example 7 of the present disclosure.

Regarding the imaging lens of Example 7, Table 25 shows basic lens data, Table 26 shows specification, Table 27 shows variable surface distances, Table 28 shows aspheric surface coefficients, and FIGS. 26 and 27 show aberration diagrams. In FIG. 26, the upper part shows aberration diagrams in a state where the object at infinity is in focus, and the lower part shows aberration diagrams in a state where the object at the distance of 0.3 m (meter) from the object to the image plane Sim is in focus. FIG. 27 shows lateral aberration diagram in a state

TABLE 25

Example 7

| Sn | R | D | Nd | vd | θgF |
|---|---|---|---|---|---|
| 1 | −248.76632 | 4.190 | 1.99671 | 28.33 | 0.60371 |
| 2 | −101.41422 | 1.000 | | | |
| 3 | −83.13940 | 2.000 | 1.51473 | 52.24 | 0.55516 |
| 4 | 32.64250 | 17.951 | | | |
| 5 | −48.65521 | 1.860 | 1.69659 | 30.24 | 0.59760 |
| 6 | 48.34934 | 15.986 | 1.99008 | 21.02 | 0.63155 |
| 7 | −91.87867 | 0.200 | | | |
| 8 | 87.15203 | 13.607 | 1.73295 | 54.70 | 0.54307 |
| 9(Hm) | −47.50030 | 2.020 | 1.99835 | 15.08 | 0.65471 |

TABLE 25-continued

Example 7

| Sn | R | D | Nd | vd | θgF |
|---|---|---|---|---|---|
| 10 | −195.15071 | 0.100 | | | |
| 11 | 131.87672 | 4.014 | 1.43875 | 94.66 | 0.53402 |
| 12 | −1043.40984 | 0.010 | | | |
| 13 | 49.90909 | 5.225 | 1.59522 | 67.73 | 0.54426 |
| 14 | 64.86257 | DD[14] | | | |
| 15 | 60.38893 | 4.000 | 2.00000 | 15.09 | 0.65480 |
| 16 | 213.97298 | 0.250 | | | |
| 17 | 25.67324 | 9.443 | 1.59522 | 67.73 | 0.54426 |
| 18 | −181.64593 | 1.550 | 1.82692 | 23.65 | 0.61729 |
| 19 | 17.84438 | 5.614 | | | |
| 20(St) | ∞ | 5.000 | | | |
| *21 | −20.93809 | 1.500 | 1.68948 | 31.02 | 0.59874 |
| *22 | −36.32325 | 0.500 | | | |
| 23 | 82.90224 | 5.482 | 1.89221 | 38.78 | 0.57133 |
| 24 | −24.27033 | 1.160 | 1.58050 | 39.95 | 0.57669 |
| 25 | 50.78424 | 2.112 | | | |
| 26 | 96.92184 | 5.330 | 1.83563 | 44.44 | 0.55874 |
| 27 | −36.99695 | DD[27] | | | |
| 28 | ∞ | 2.850 | 1.51680 | 64.20 | 0.53430 |
| 29 | ∞ | 1.028 | | | |

TABLE 26

Example 7

| f | 30.058 |
|---|---|
| FNo. | 1.03 |
| 2ω(°) | 51.4 |

TABLE 27

Example 7

| | Infinity | 0.3 m |
|---|---|---|
| DD[14] | 6.051 | 1.979 |
| DD[27] | 12.993 | 17.065 |

TABLE 28

Example 7

| Sn | 21 | 22 |
|---|---|---|
| KA | 1.0000000E+00 | 1.0000000E+00 |
| A4 | 5.9564160E−05 | 7.2135754E−05 |
| A6 | −1.3434467E−06 | −1.0996397E−06 |
| A8 | 5.3783818E−08 | 3.6099162E−08 |
| A10 | −1.5405308E−09 | −8.5764993E−10 |
| A12 | 2.8404596E−11 | 1.3312949E−11 |
| A14 | −3.3085124E−13 | −1.3185779E−13 |
| A16 | 2.3443438E−15 | 7.9912348E−16 |
| A18 | −9.2056397E−18 | −2.6906518E−18 |
| A20 | 1.5338728E−20 | 3.8439329E−21 |

Example 8

FIG. 8 shows a cross-sectional configuration of the imaging lens of Example 8. The imaging lens of Example 8 consists of, in order from the object side: a first lens group G1 that has a positive refractive power; a second lens group G2 that has a negative refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of four lenses L31 to L34 in order from the object side.

Figure 28:
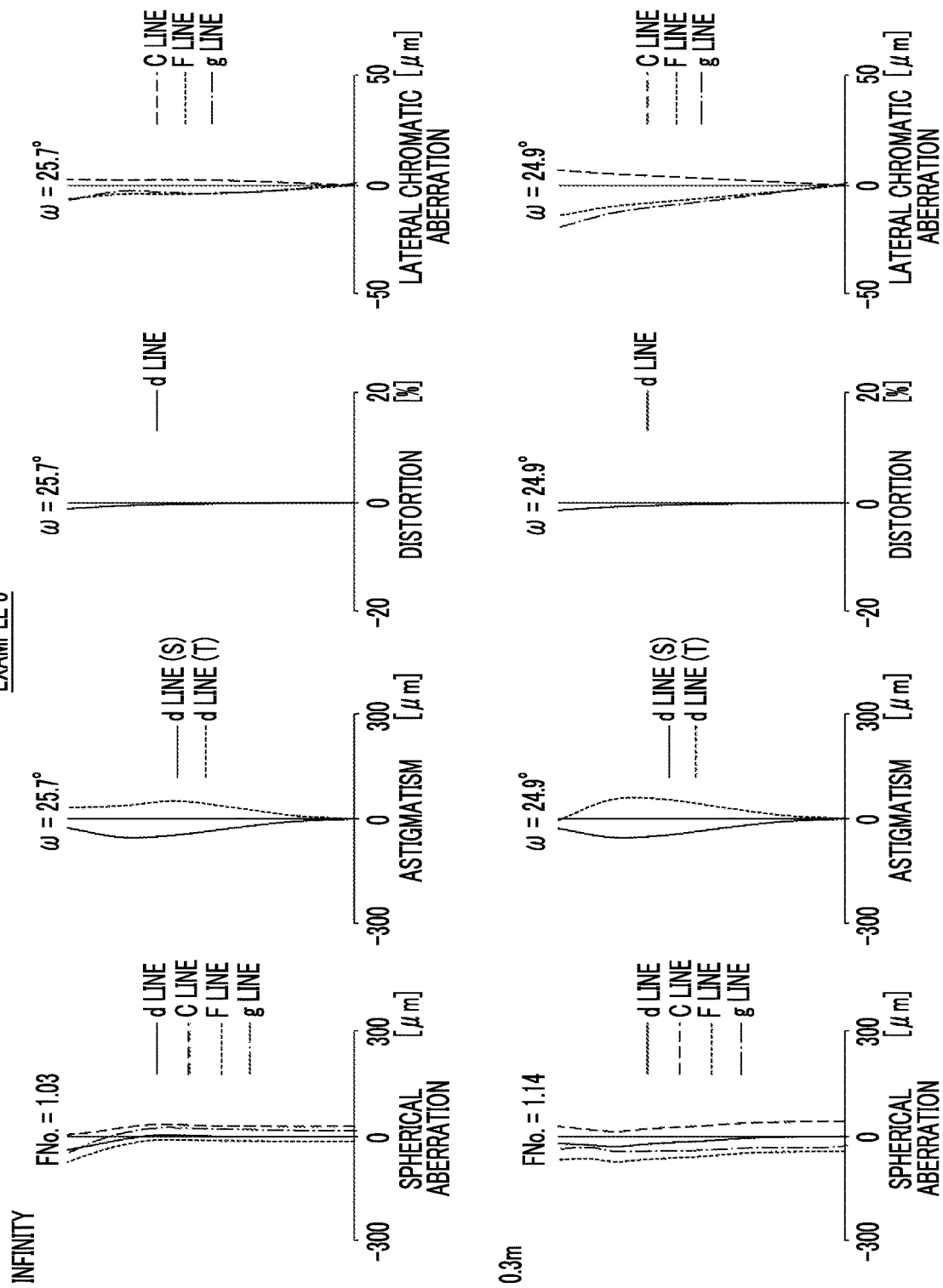
FIG. 28 shows spherical aberration diagrams, astigmatism diagrams, distortion diagrams, lateral chromatic aberration diagrams of the imaging lens of Example 8 of the present disclosure.
Figure 29:
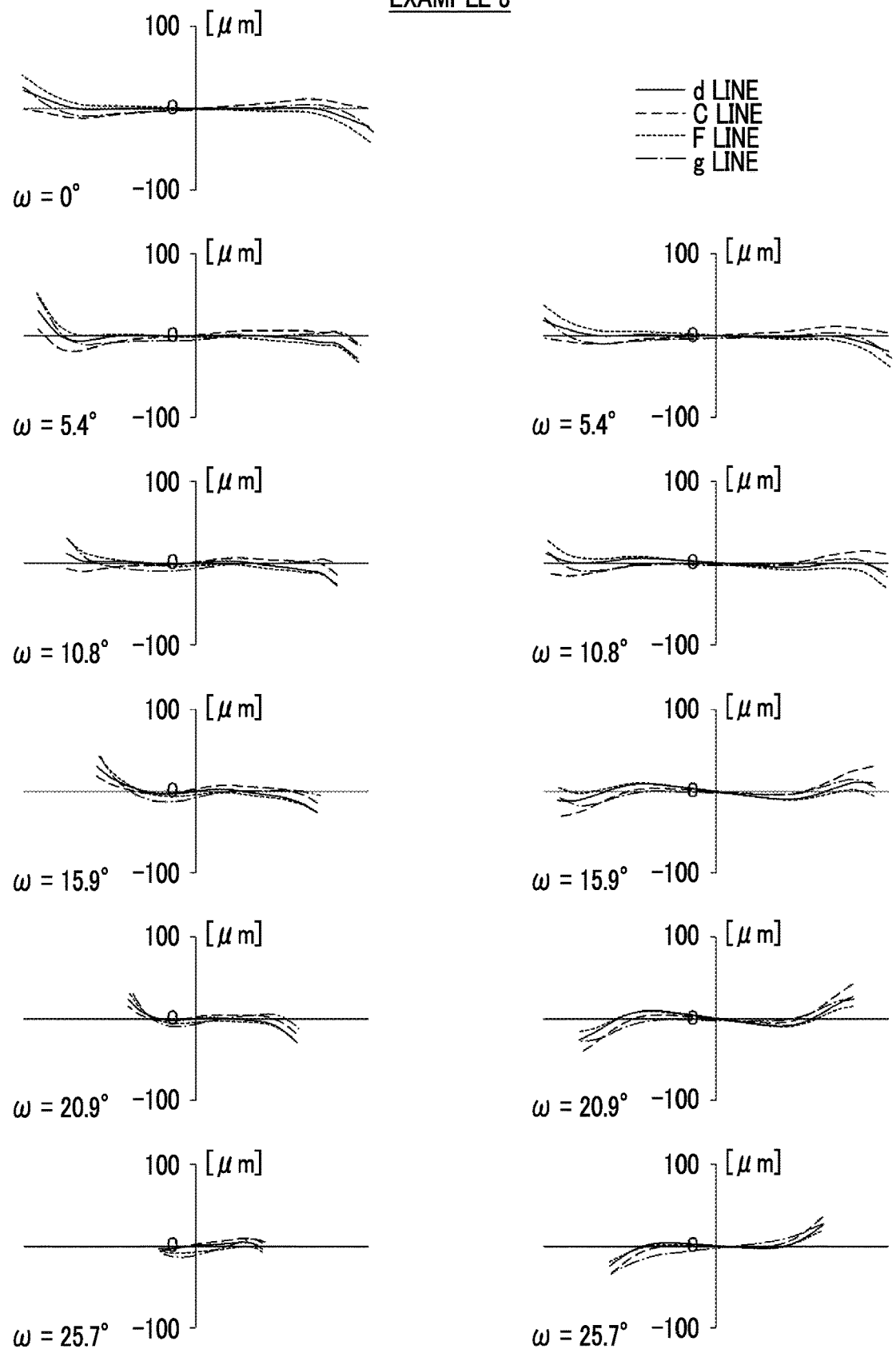
FIG. 29 is a lateral aberration diagram of the imaging lens according to Example 8 of the present disclosure.

Regarding the imaging lens of Example 8, Table 29 shows basic lens data, Table 30 shows specification, Table 31 shows variable surface distances, Table 32 shows aspheric surface coefficients, and FIGS. 28 and 29 show aberration diagrams. In FIG. 28, the upper part shows aberration diagrams in a state where the object at infinity is in focus, and the lower part shows aberration diagrams in a state where the object at the distance of 0.3 m (meter) from the object to the image plane Sim is in focus. FIG. 29 shows lateral aberration diagram in a state

TABLE 29

Example 8

| Sn | R | D | Nd | vd | θgF |
|---|---|---|---|---|---|
| 1 | 642.95860 | 5.882 | 2.00001 | 16.89 | 0.64786 |
| 2 | −164.66697 | 1.863 | | | |
| 3 | −99.52183 | 2.000 | 1.61064 | 54.41 | 0.55296 |
| 4 | 33.83357 | 15.951 | | | |
| 5 | −47.68180 | 1.860 | 1.70668 | 31.21 | 0.59581 |
| 6 | 51.06375 | 13.761 | 1.98542 | 25.79 | 0.61339 |
| 7 | −87.22549 | 0.200 | | | |
| 8 | 126.67025 | 12.325 | 1.72259 | 55.37 | 0.54271 |
| 9 | −47.54495 | 2.020 | 1.97455 | 17.92 | 0.64243 |
| 10 | −275.27420 | 0.100 | | | |
| 11 | 171.98328 | 5.821 | 1.43875 | 94.66 | 0.53402 |
| 12(Hm) | −113.39789 | 0.010 | | | |
| 13 | 46.43027 | 5.041 | 1.59522 | 67.73 | 0.54426 |
| 14 | 84.61748 | DD[14] | | | |
| 15 | 55.77297 | 4.000 | 2.00000 | 15.00 | 0.65515 |
| 16 | 202.80478 | 0.605 | | | |
| 17 | 27.63715 | 8.988 | 1.58689 | 61.66 | 0.54186 |
| 18 | −134.09655 | 1.550 | 1.85789 | 22.11 | 0.62292 |
| 19 | 19.09448 | 5.638 | | | |
| 20(St) | ∞ | 5.927 | | | |
| *21 | −28.03700 | 1.500 | 1.89872 | 28.11 | 0.60520 |
| *22 | −44.46753 | 1.250 | | | |
| 23 | −96.25411 | 6.671 | 1.74032 | 53.97 | 0.54394 |
| 24 | −23.20962 | 0.500 | | | |
| 25 | 63.33337 | 6.000 | 1.90048 | 37.95 | 0.57345 |
| 26 | −32.84508 | 1.310 | 1.47999 | 58.75 | 0.54320 |
| 27 | 33.51612 | DD[27] | | | |
| 28 | ∞ | 2.850 | 1.51680 | 64.20 | 0.53430 |
| 29 | ∞ | 0.929 | | | |

TABLE 30

Example 8

| | |
|---|---|
| f | 36.529 |
| FNo. | 1.03 |
| 2ω(°) | 51.4 |

TABLE 31

Example 8

| | Infinity | 0.3 m |
|---|---|---|
| DD[14] | 6.500 | 2.433 |
| DD[27] | 11.971 | 16.038 |

TABLE 32

Example 8

| Sn | 21 | 22 |
|---|---|---|
| KA | 1.0000000E+00 | 1.0000000E+00 |
| A4 | −5.0827829E−05 | −2.1426467E−05 |
| A6 | −1.1853379E−07 | −4.7548185E−08 |
| A8 | 9.4795512E−09 | 5.2403072E−09 |
| A10 | −2.7750209E−10 | −1.0968658E−10 |
| A12 | 5.8490730E−12 | 2.0277440E−12 |
| A14 | −7.6027021E−14 | −2.5419242E−14 |
| A16 | 5.7225628E−16 | 1.8641103E−16 |
| A18 | −2.2972054E−18 | −7.2476475E−19 |
| A20 | 3.8030548E−21 | 1.1546366E−21 |

Example 9

FIG. 9 shows a cross-sectional configuration of the imaging lens of Example 9. The imaging lens of Example 9 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of four lenses L31 to L34 in order from the object side.

Figure 30:
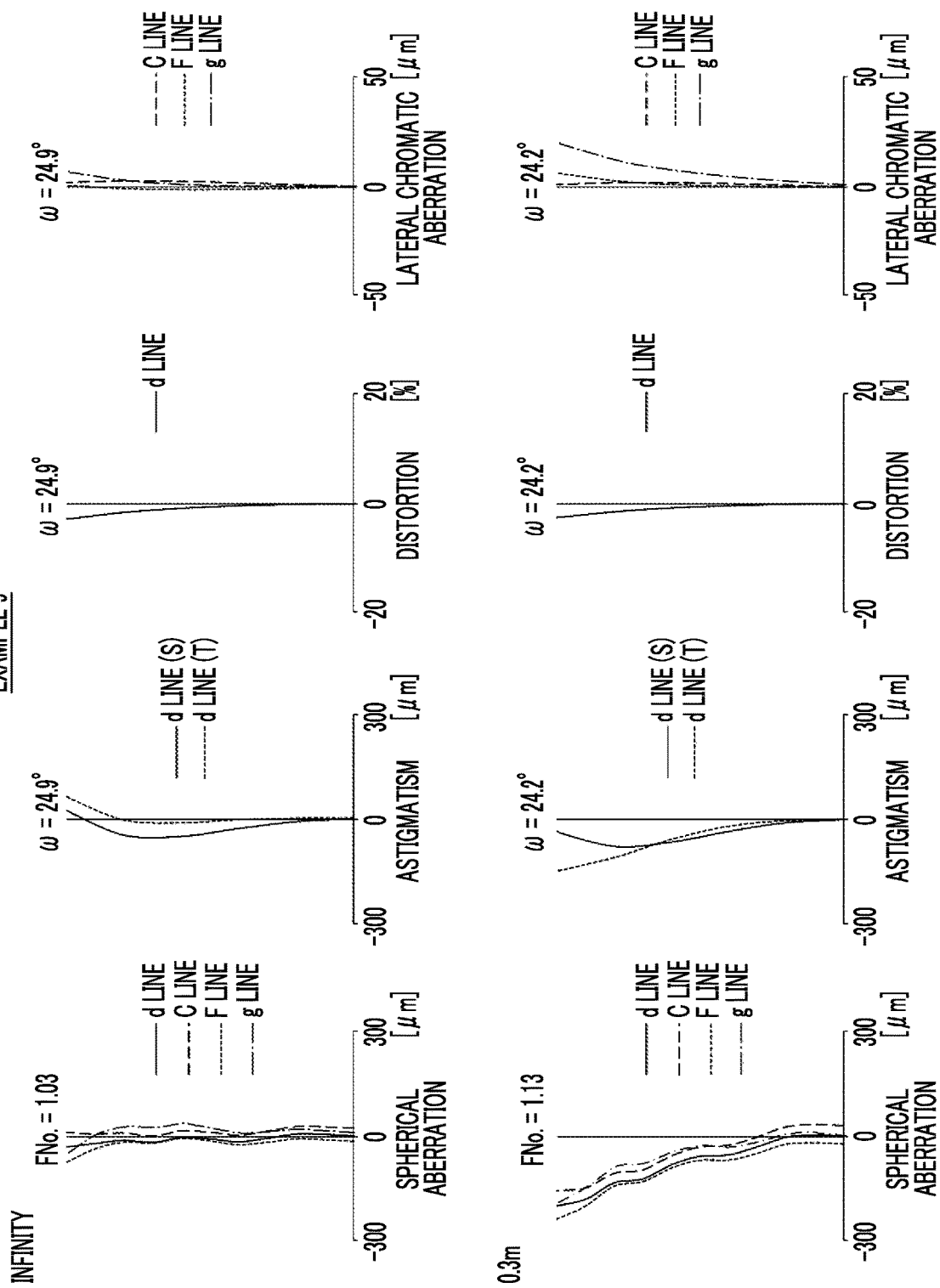
FIG. 30 shows spherical aberration diagrams, astigmatism diagrams, distortion diagrams, lateral chromatic aberration diagrams of the imaging lens of Example 9 of the present disclosure.
Figure 31:
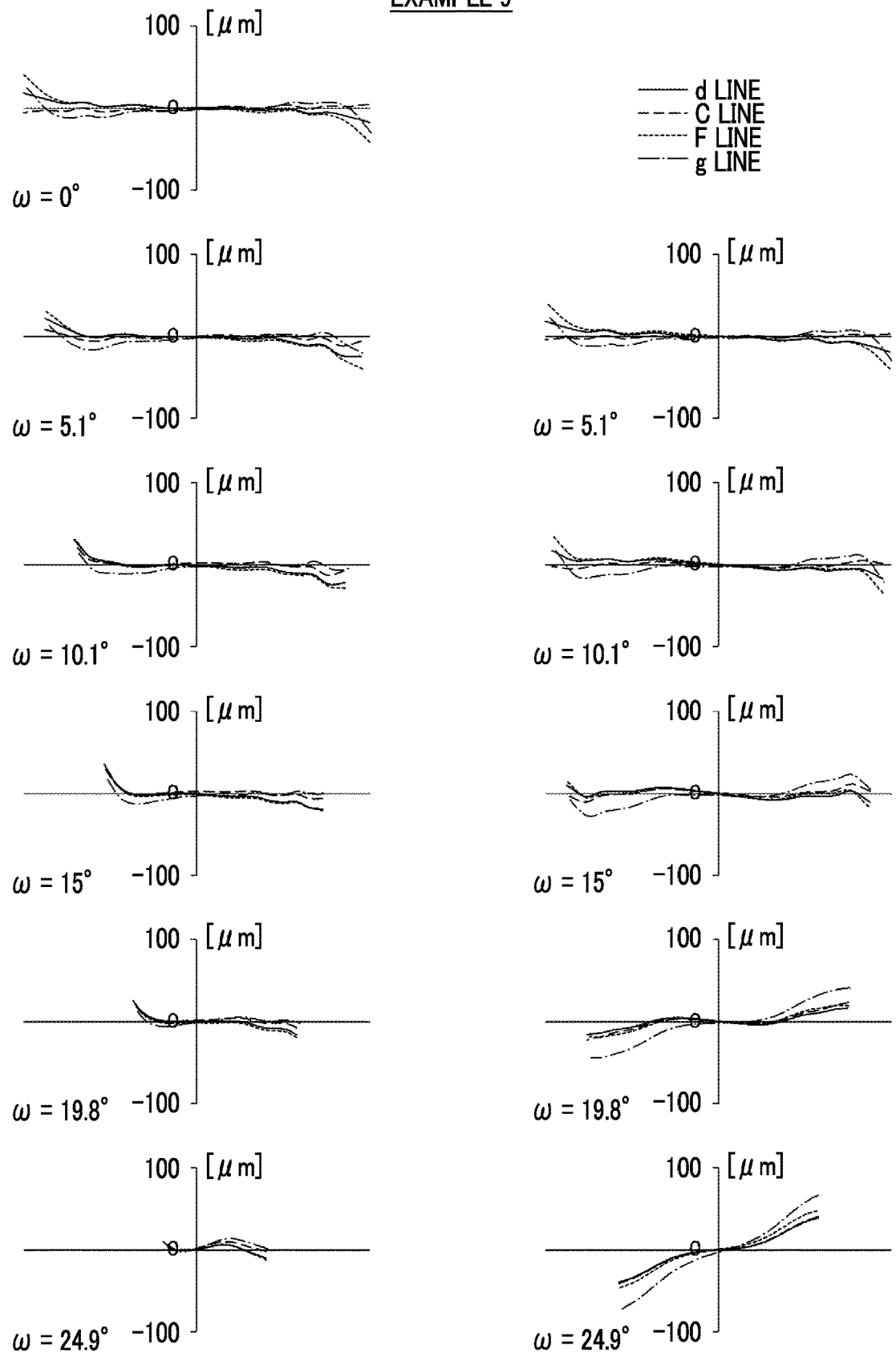
FIG. 31 is a lateral aberration diagram of the imaging lens according to Example 9 of the present disclosure.

Regarding the imaging lens of Example 9, Table 33 shows basic lens data, Table 34 shows specification, Table 35 shows variable surface distances, Table 36 shows aspheric surface coefficients, and FIGS. 30 and 31 show aberration diagrams. In FIG. 30, the upper part shows aberration diagrams in a state where the object at infinity is in focus, and the lower part shows aberration diagrams in a state where the object at the distance of 0.3 m (meter) from the object to the image plane Sim is in focus. FIG. 31 shows lateral aberration diagram in a state

TABLE 33

Example 9

| Sn | R | D | Nd | vd | θgF |
|---|---|---|---|---|---|
| 1 | −87.98811 | 2.000 | 1.48749 | 70.24 | 0.53007 |
| 2 | 41.58935 | 13.000 | | | |
| 3 | −54.68377 | 1.860 | 1.59551 | 39.24 | 0.58043 |
| 4 | 49.41491 | 13.739 | 1.88299 | 40.78 | 0.56829 |
| 5 | −111.00519 | 0.100 | | | |
| 6 | 298.84381 | 4.518 | 2.00069 | 25.46 | 0.61364 |
| 7 | −212.63552 | 0.100 | | | |
| 8 | 301.78208 | 11.581 | 1.49700 | 81.54 | 0.53748 |
| 9 | −44.98963 | 2.020 | 1.80518 | 25.42 | 0.61616 |
| 10 | −253.87354 | 0.100 | | | |
| 11 | 76.00840 | 6.643 | 1.43875 | 94.66 | 0.53402 |
| 12(Hm) | −330.55364 | 0.100 | | | |
| 13 | 108.67048 | 4.200 | 1.49700 | 81.54 | 0.53748 |
| 14 | 458.73232 | DD[14] | | | |
| 15 | 52.02302 | 5.265 | 1.95906 | 17.47 | 0.65993 |
| 16 | 204.64939 | 0.250 | | | |
| 17 | 26.65400 | 9.164 | 1.59282 | 68.62 | 0.54414 |
| 18 | −183.43791 | 1.200 | 1.80809 | 22.76 | 0.63073 |
| 19 | 17.86606 | 5.500 | | | |
| 20(St) | ∞ | 5.000 | | | |

TABLE 33-continued

Example 9

| Sn | R | D | Nd | vd | θgF |
|---|---|---|---|---|---|
| *21 | −19.03849 | 1.500 | 1.68948 | 31.02 | 0.59874 |
| *22 | −46.48268 | 0.500 | | | |
| 23 | 6158.26941 | 6.639 | 1.81600 | 46.62 | 0.55682 |
| 24 | −18.09363 | 1.120 | 1.62004 | 36.26 | 0.58800 |
| 25 | 57.52633 | 6.468 | 1.88299 | 40.78 | 0.56829 |
| 26 | −29.74982 | DD[26] | | | |
| 27 | ∞ | 2.850 | 1.51680 | 64.20 | 0.53430 |
| 28 | ∞ | 1.053 | | | |

TABLE 34

Example 9

| f | 32.022 |
|---|---|
| FNo. | 1.03 |
| 2ω(°) | 49.8 |

TABLE 35

Example 9

| | Infinity | 0.3 m |
|---|---|---|
| DD[14] | 6.935 | 2.392 |
| DD[26] | 15.077 | 19.620 |

TABLE 36

Example 9

| Sn | 21 | 22 |
|---|---|---|
| KA | 1.0000000E+00 | 1.0000000E+00 |
| A4 | 1.1067714E−04 | 1.2780916E−04 |
| A6 | −2.5465270E−07 | −9.6245386E−07 |
| A8 | −3.7899117E−08 | 1.2655245E−08 |
| A10 | 1.2141973E−09 | −4.1116410E−10 |
| A12 | −2.0648541E−11 | 9.1244080E−12 |
| A14 | 2.1271393E−13 | −1.1391104E−13 |
| A16 | −1.3190428E−15 | 8.0548483E−16 |
| A18 | 4.5209399E−18 | −3.0334692E−18 |
| A20 | −6.5682965E−21 | 4.7415213E−21 |

Example 10

FIG. 10 shows a cross-sectional configuration of the imaging lens of Example 10. The imaging lens of Example 10 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of seven lenses L11 to L17 in order from the object side. The second lens group G2 consists of three lenses L21 to L23 in order from the object side. The third lens group G3 consists of four lenses L31 to L34 in order from the object side.

Figure 32:
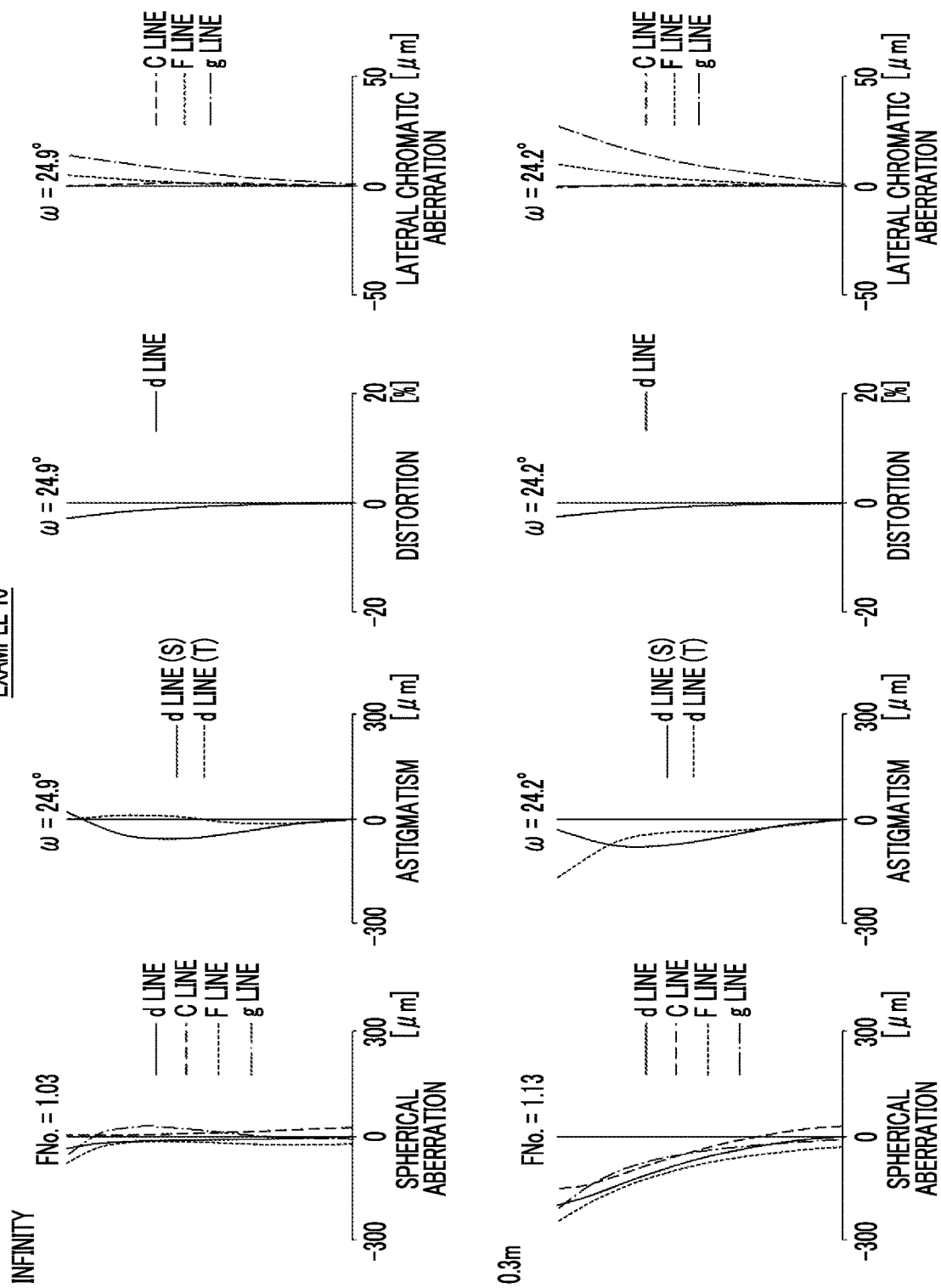
FIG. 32 shows spherical aberration diagrams, astigmatism diagrams, distortion diagrams, lateral chromatic aberration diagrams of the imaging lens of Example 10 of the present disclosure.
Figure 33:
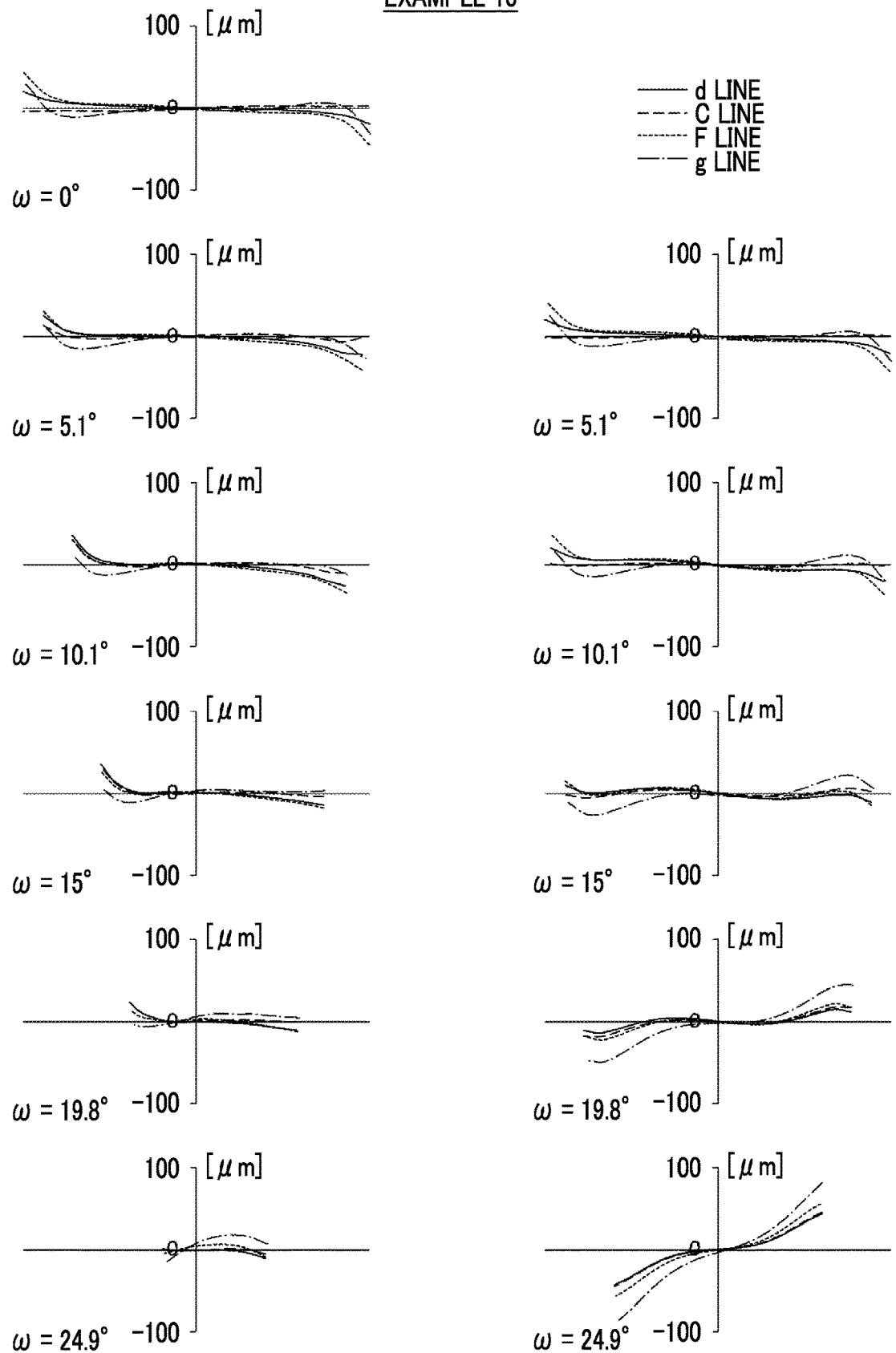
FIG. 33 is a lateral aberration diagram of the imaging lens according to Example 10 of the present disclosure.

Regarding the imaging lens of Example 10, Table 37 shows basic lens data, Table 38 shows specification, Table 39 shows variable surface distances, Table 40 shows aspheric surface coefficients, and FIGS. 32 and 33 show aberration diagrams. In FIG. 32, the upper part shows aberration diagrams in a state where the object at infinity is in focus, and the lower part shows aberration diagrams in a state where the object at the distance of 0.3 m (meter) from the object to the image plane Sim is in focus. FIG. 33 shows lateral aberration diagram in a state

TABLE 37

Example 10

| Sn | R | D | Nd | vd | θgF |
|---|---|---|---|---|---|
| 1 | −89.03336 | 2.000 | 1.48749 | 70.24 | 0.53007 |
| 2 | 42.68788 | 13.813 | | | |
| 3 | −54.49508 | 1.860 | 1.59551 | 39.24 | 0.58043 |
| 4 | 49.53548 | 14.817 | 1.88299 | 40.78 | 0.56829 |
| 5 | −109.77027 | 0.100 | | | |
| 6 | 291.58525 | 4.577 | 2.00069 | 25.46 | 0.61364 |
| 7(Hm) | −215.18952 | 0.100 | | | |
| 8 | 170.42922 | 12.418 | 1.49700 | 81.54 | 0.53748 |
| 9 | −44.77918 | 2.020 | 1.80518 | 25.42 | 0.61616 |
| 10 | −233.44679 | 0.100 | | | |
| 11 | 62.18317 | 7.955 | 1.41390 | 100.82 | 0.53373 |
| 12 | −236.08687 | DD[12] | | | |
| 13 | 54.23698 | 5.164 | 1.95906 | 17.47 | 0.65993 |
| 14 | 204.95157 | 0.250 | | | |
| 15 | 25.10749 | 9.144 | 1.59282 | 68.62 | 0.54414 |
| 16 | −617.46618 | 1.200 | 1.80809 | 22.76 | 0.63073 |
| 17 | 17.45656 | 5.500 | | | |
| 18(St) | ∞ | 5.000 | | | |
| *19 | −18.92095 | 1.500 | 1.68948 | 31.02 | 0.59874 |
| *20 | −46.11924 | 0.500 | | | |
| 21 | 3614.05196 | 6.558 | 1.81600 | 46.62 | 0.55682 |
| 22 | −18.60718 | 1.120 | 1.62004 | 36.26 | 0.58800 |
| 23 | 56.18803 | 6.590 | 1.88299 | 40.78 | 0.56829 |
| 24 | −29.75947 | DD[24] | | | |
| 25 | ∞ | 2.150 | 1.54763 | 54.98 | 0.55247 |
| 26 | ∞ | 1.310 | | | |
| 27 | ∞ | 0.700 | 1.49784 | 54.98 | 0.55000 |
| 28 | ∞ | 1.115 | | | |

TABLE 38

Example 10

| f | 32.020 |
|---|---|
| FNo. | 1.03 |
| 2ω(°) | 49.8 |

TABLE 39

Example 10

| | Infinity | 0.3 m |
|---|---|---|
| DD[12] | 7.342 | 2.823 |
| DD[24] | 13.598 | 18.117 |

TABLE 40

Example 10

| Sn | 19 | 20 |
|---|---|---|
| KA | 1.0000000E+00 | 1.0000000E+00 |
| A3 | −1.5683372E−19 | −2.0391534E−20 |
| A4 | 8.4385868E−05 | 9.3666439E−05 |
| A5 | 1.5457719E−05 | 1.6730201E−05 |
| A6 | −2.1436837E−06 | −2.3575197E−06 |
| A7 | −4.4677705E−07 | −4.6595681E−07 |

TABLE 40-continued

Example 10

| Sn | 19 | 20 |
|---|---|---|
| A8 | 4.2113367E−08 | 7.5623314E−08 |
| A9 | 1.3286748E−08 | 7.5974939E−09 |
| A10 | −1.2213681E−09 | −1.6231020E−09 |
| A11 | −2.4030207E−10 | −6.9012075E−11 |
| A12 | 2.5911791E−11 | 2.1325589E−11 |
| A13 | 2.3092387E−12 | 2.8238412E−13 |
| A14 | −3.0400933E−13 | −1.7220520E−13 |
| A15 | −1.0687588E−14 | 3.0353703E−16 |
| A16 | 1.8885715E−15 | 8.2894475E−16 |
| A17 | 1.5118950E−17 | −6.6230901E−18 |
| A18 | −5.6187028E−18 | −2.1722559E−18 |
| A19 | 2.2127791E−20 | 1.6083649E−20 |
| A20 | 5.6805263E−21 | 2.3734030E−21 |

Example 11

FIG. 11 shows a cross-sectional configuration of the imaging lens of Example 11. The imaging lens of Example 11 consists of, in order from the object side: a first lens group G1 that has a positive refractive power; a second lens group G2 that has a positive refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of seven lenses L11 to L17 in order from the object side. The second lens group G2 consists of four lenses L21 to L24 in order from the object side. The third lens group G3 consists of four lenses L31 to L34 in order from the object side.

Figure 34:
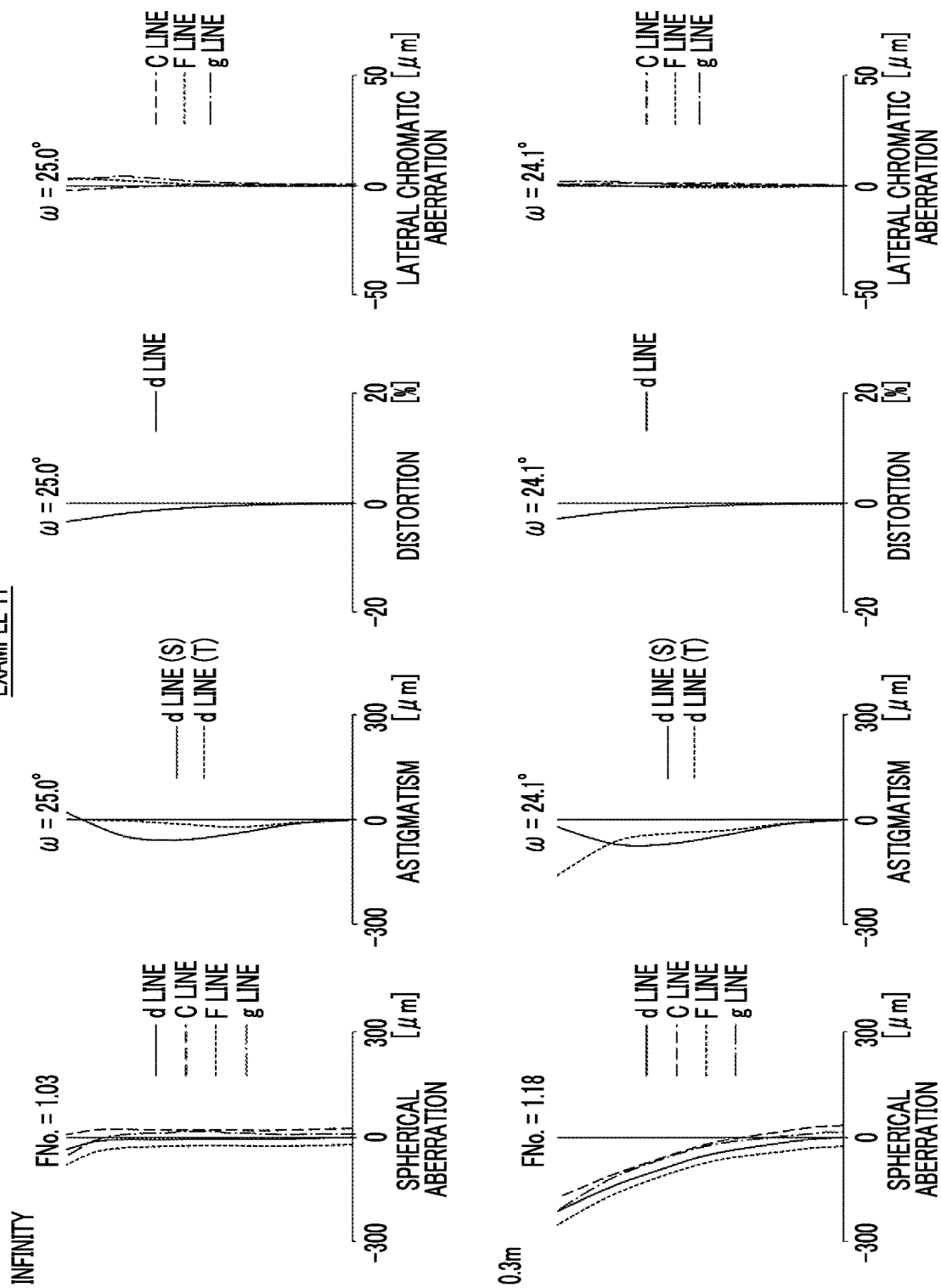
FIG. 34 shows spherical aberration diagrams, astigmatism diagrams, distortion diagrams, lateral chromatic aberration diagrams of the imaging lens of Example 11 of the present disclosure.
Figure 35:
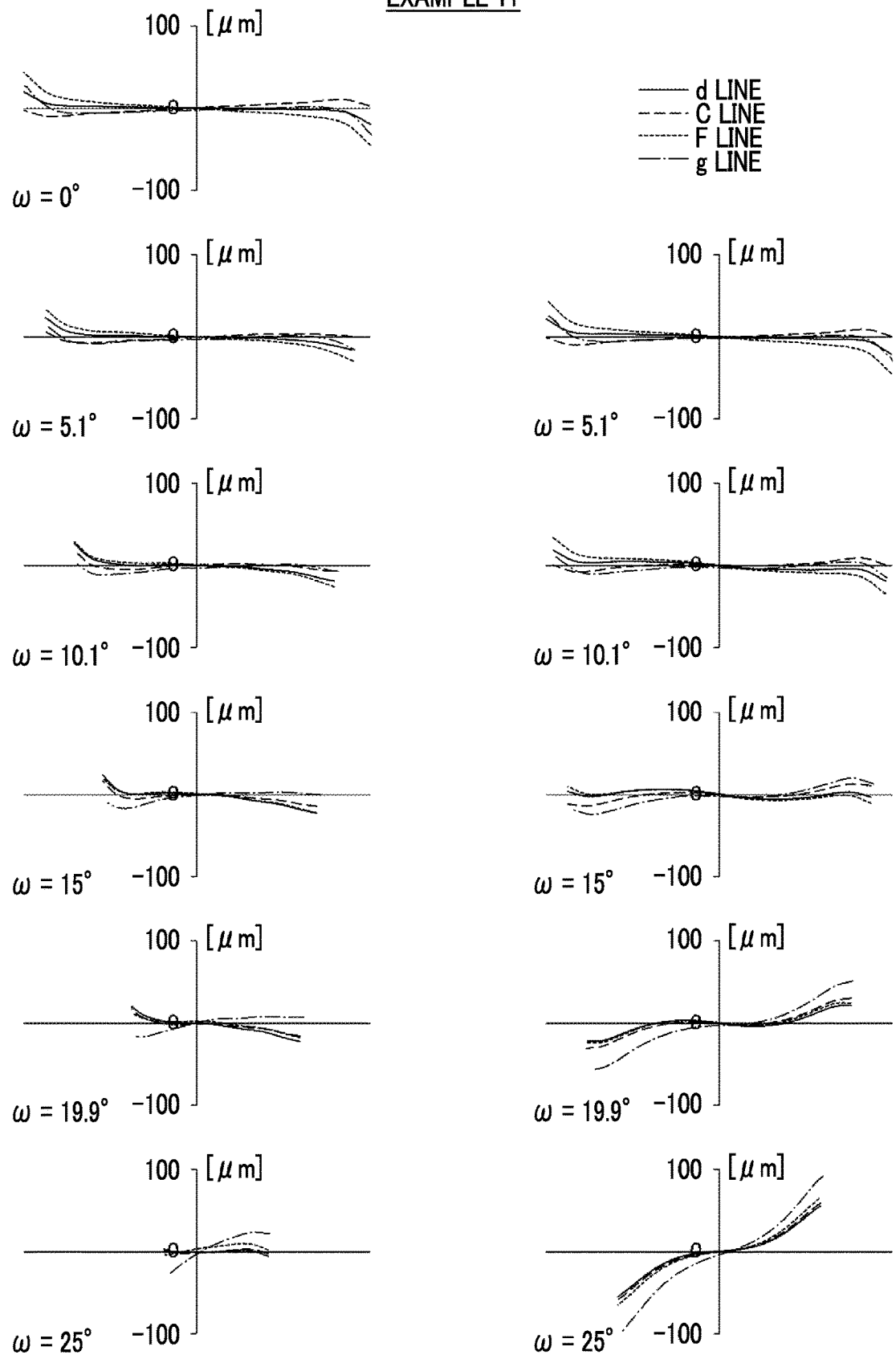
FIG. 35 is a lateral aberration diagram of the imaging lens according to Example 11 of the present disclosure.

Regarding the imaging lens of Example 11, Table 41 shows basic lens data, Table 42 shows specification, Table 43 shows variable surface distances, Table 44 shows aspheric surface coefficients, and FIGS. 34 and 35 show aberration diagrams. In FIG. 34, the upper part shows aberration diagrams in a state where the object at infinity is in focus, and the lower part shows aberration diagrams in a state where the object at the distance of 0.3 m (meter) from the object to the image plane Sim is in focus. FIG. 35 shows lateral aberration diagram in a state in which the object at infinity is in focus.

TABLE 41

Example 11

| Sn | R | D | Nd | vd | θgF |
|---|---|---|---|---|---|
| 1 | −76.91505 | 2.000 | 1.48749 | 70.24 | 0.53007 |
| 2 | 43.99644 | 13.000 | | | |
| 3 | −51.67350 | 1.860 | 1.59551 | 39.24 | 0.58043 |
| 4 | 50.02228 | 13.622 | 1.88299 | 40.78 | 0.56829 |
| 5 | −130.28802 | 0.100 | | | |
| 6 | 268.22875 | 5.541 | 2.00069 | 25.46 | 0.61364 |
| 7(Hm) | −153.55835 | 0.100 | | | |
| 8 | 158.92505 | 12.995 | 1.49700 | 81.54 | 0.53748 |
| 9 | −44.82823 | 2.020 | 1.80518 | 25.42 | 0.61616 |
| 10 | −216.04861 | 0.100 | | | |
| 11 | 75.70827 | 6.904 | 1.43875 | 94.66 | 0.53402 |
| 12 | −326.56983 | DD[12] | | | |
| 13 | 58.89507 | 4.197 | 1.95906 | 17.47 | 0.65993 |
| 14 | 97.62070 | 0.000 | | | |
| 15 | 32.86934 | 5.000 | 1.59282 | 68.62 | 0.54414 |
| 16 | 67.60807 | 0.250 | | | |
| 17 | 24.90149 | 5.881 | 1.59282 | 68.62 | 0.54414 |
| 18 | 62.89998 | 1.200 | 1.80809 | 22.76 | 0.63073 |
| 19 | 17.23765 | 5.500 | | | |
| 20(St) | ∞ | 5.497 | | | |
| *21 | −14.24106 | 1.500 | 1.68948 | 31.02 | 0.59874 |
| *22 | −25.16191 | 0.500 | | | |
| 23 | −293.85801 | 5.995 | 1.81600 | 46.62 | 0.55682 |
| 24 | −18.46510 | 1.120 | 1.59551 | 39.24 | 0.58043 |
| 25 | 36.94810 | 6.860 | 1.88299 | 40.78 | 0.56829 |
| 26 | −36.22503 | DD[26] | | | |
| 27 | ∞ | 2.150 | 1.54763 | 54.98 | 0.55247 |
| 28 | ∞ | 1.310 | | | |
| 29 | ∞ | 0.700 | 1.49784 | 54.98 | 0.55000 |
| 30 | ∞ | 1.113 | | | |

TABLE 42

Example 11

| | |
|---|---|
| f | 32.022 |
| FNo. | 1.03 |
| 2ω(°) | 50.0 |

TABLE 43

Example 11

| | Infinity | 0.3 m |
|---|---|---|
| DD[12] | 8.514 | 4.084 |
| DD[26] | 11.266 | 15.696 |

TABLE 44

Example 11

| Sn | 21 | 22 |
|---|---|---|
| KA | 1.0000000E+00 | 1.0000000E+00 |
| A4 | 2.5603902E−04 | 2.2907976E−04 |
| A6 | −7.2408102E−07 | −3.9877678E−07 |
| A8 | −5.2557317E−08 | −5.3881306E−08 |
| A10 | 1.9325737E−09 | 1.7062219E−09 |
| A12 | −3.7105510E−11 | −2.9336733E−11 |
| A14 | 4.4125091E−13 | 3.1108320E−13 |
| A16 | −3.2207521E−15 | −2.0092947E−15 |
| A18 | 1.3220056E−17 | 7.2332913E−18 |
| A20 | −2.3353567E−20 | −1.1099305E−20 |

Example 12

FIG. 12 shows a cross-sectional configuration of the imaging lens of Example 12. The imaging lens of Example 12 consists of, in order from the object side: a first lens group G1 that has a positive refractive power; a second lens group G2 that has a negative refractive power; an aperture stop St; a third lens group G3 that has a positive refractive power; and a fourth lens group G4 that has a negative refractive power. During focusing from the object at infinity to the closest object, the first lens group G1 and the fourth lens group G4 remains stationary with respect to the image plane Sim, and the second lens group G2, the aperture stop St, and the third lens group G3 integrally move to the object side along the axis Z. The first lens group G1 consists of seven lenses L11 to L17 in order from the object side. The second lens group G2 consists of three lenses L21 to L23 in order from the object side. The third lens group G3 consists of three lenses L31 to L33 in order from the object side. The fourth lens group G4 consists of two lenses L41 and L42 in order from the object side.

Figure 36:
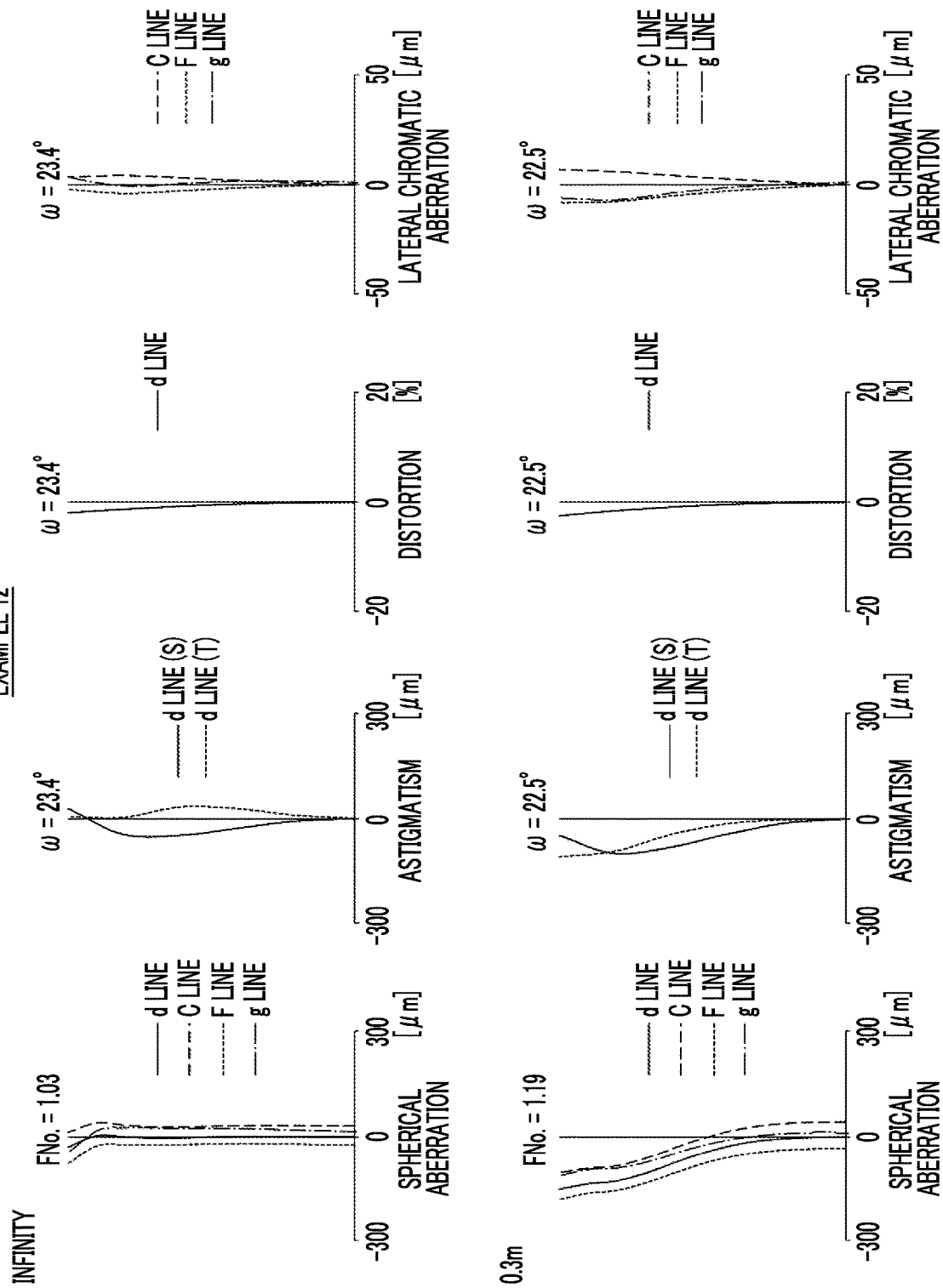
FIG. 36 shows spherical aberration diagrams, astigmatism diagrams, distortion diagrams, lateral chromatic aberration diagrams of the imaging lens of Example 12 of the present disclosure.
Figure 37:
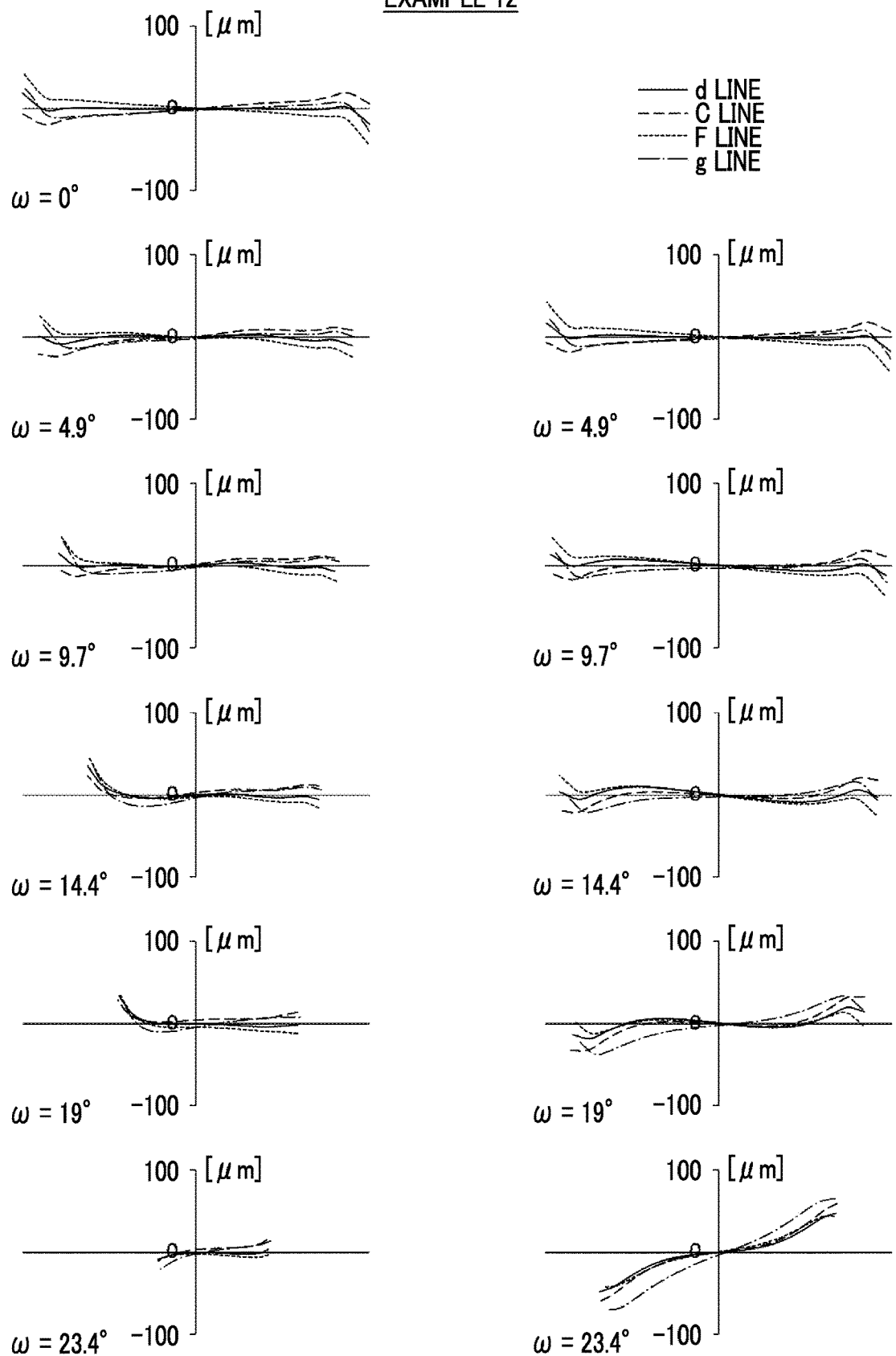
FIG. 37 is a lateral aberration diagram of the imaging lens according to Example 12 of the present disclosure.

Regarding the imaging lens of Example 12, Table 45 shows basic lens data, Table 46 shows specification, Table 47 shows variable surface distances, Table 48 shows aspheric surface coefficients, and FIGS. 36 and 37 show aberration diagrams. In FIG. 36, the upper part shows aberration diagrams in a state where the object at infinity is in focus, and the lower part shows aberration diagrams in a state where the object at the distance of 0.3 m (meter) from the object to the image plane Sim is in focus. FIG. 37 shows lateral aberration diagram in a state

TABLE 45

Example 12

| Sn | R | D | Nd | vd | θgF |
|---|---|---|---|---|---|
| 1 | −297.13714 | 7.166 | 1.87070 | 40.73 | 0.56825 |
| 2 | −85.86719 | 1.000 | | | |
| 3 | −73.16221 | 2.000 | 1.74077 | 27.79 | 0.60961 |
| 4 | 42.66024 | 7.413 | | | |
| 5 | 392.24356 | 6.462 | 1.87070 | 40.73 | 0.56825 |
| 6 | −146.01920 | 4.000 | | | |
| 7 | −66.16556 | 1.860 | 1.72825 | 28.46 | 0.60772 |
| 8 | 51.18899 | 11.866 | 2.10420 | 17.02 | 0.66311 |
| 9 | −245.64485 | 0.200 | | | |
| 10(Hm) | 77.22649 | 15.828 | 1.88300 | 40.80 | 0.56557 |
| 11 | −47.49919 | 2.020 | 1.98613 | 16.48 | 0.66558 |
| 12 | −198.94323 | DD[12] | | | |
| 13 | 55.79899 | 6.000 | 1.92286 | 20.88 | 0.63900 |
| 14 | 1076.94076 | 0.250 | | | |
| 15 | 30.39757 | 10.286 | 1.59410 | 60.47 | 0.55516 |
| 16 | −49.75521 | 1.550 | 1.92286 | 20.88 | 0.63900 |
| 17 | 20.04359 | 5.500 | | | |
| 18(St) | ∞ | 5.642 | | | |
| 19 | −22.24985 | 1.510 | 1.59270 | 35.31 | 0.59336 |
| 20 | 30.44450 | 8.452 | 1.90043 | 37.37 | 0.57668 |
| 21 | −37.69952 | 0.270 | | | |
| *22 | 87.14518 | 3.500 | 1.83481 | 42.72 | 0.56486 |
| *23 | −62.14252 | DD[23] | | | |
| 24 | −134.06447 | 3.010 | 1.64000 | 60.08 | 0.53704 |
| 25 | −34.88724 | 1.000 | 1.65412 | 39.68 | 0.57378 |
| 26 | −129.28425 | 12.084 | | | |
| 27 | ∞ | 2.850 | 1.51680 | 64.20 | 0.53430 |
| 28 | ∞ | 0.980 | | | |

TABLE 46

Example 12

| | |
|---|---|
| f | 33.489 |
| FNo. | 1.03 |
| 2ω(°) | 46.8 |

TABLE 47

Example 12

| | Infinity | 0.3 m |
|---|---|---|
| DD[12] | 6.714 | 1.987 |
| DD[23] | 2.000 | 6.727 |

TABLE 48

Example 12

| Sn | 22 | 23 |
|---|---|---|
| KA | 1.0000000E+00 | 1.0000000E+00 |
| A4 | −5.8591082E−06 | 2.8872810E−06 |
| A6 | 8.0450854E−09 | −1.4218337E−08 |
| A8 | −1.8982768E−10 | 4.2017521E−11 |
| A10 | 6.8830323E−13 | −2.5968320E−13 |
| A12 | −2.8216339E−15 | −1.0662872E−15 |

Example 13

FIG. 13 shows a cross-sectional configuration of the imaging lens of Example 13. The imaging lens of Example 13 consists of, in order from the object side: a first lens group G1 that has a positive refractive power; a second lens group G2 that has a negative refractive power; an aperture stop St; and a third lens group G3 that has a positive refractive power. During focusing from the object at infinity to the closest object, the first lens group G1 remains stationary with respect to the image plane Sim, and the second lens group G2, the aperture stop St, and the third lens group G3 integrally move to the object side along the axis Z. The first lens group G1 consists of eight lenses L11 to L18 in order from the object side. The second lens group G2 consists of three lenses L21 to L23 in order from the object side. The third lens group G3 consists of five lenses L31 to L35 in order from the object side.

Figure 38:
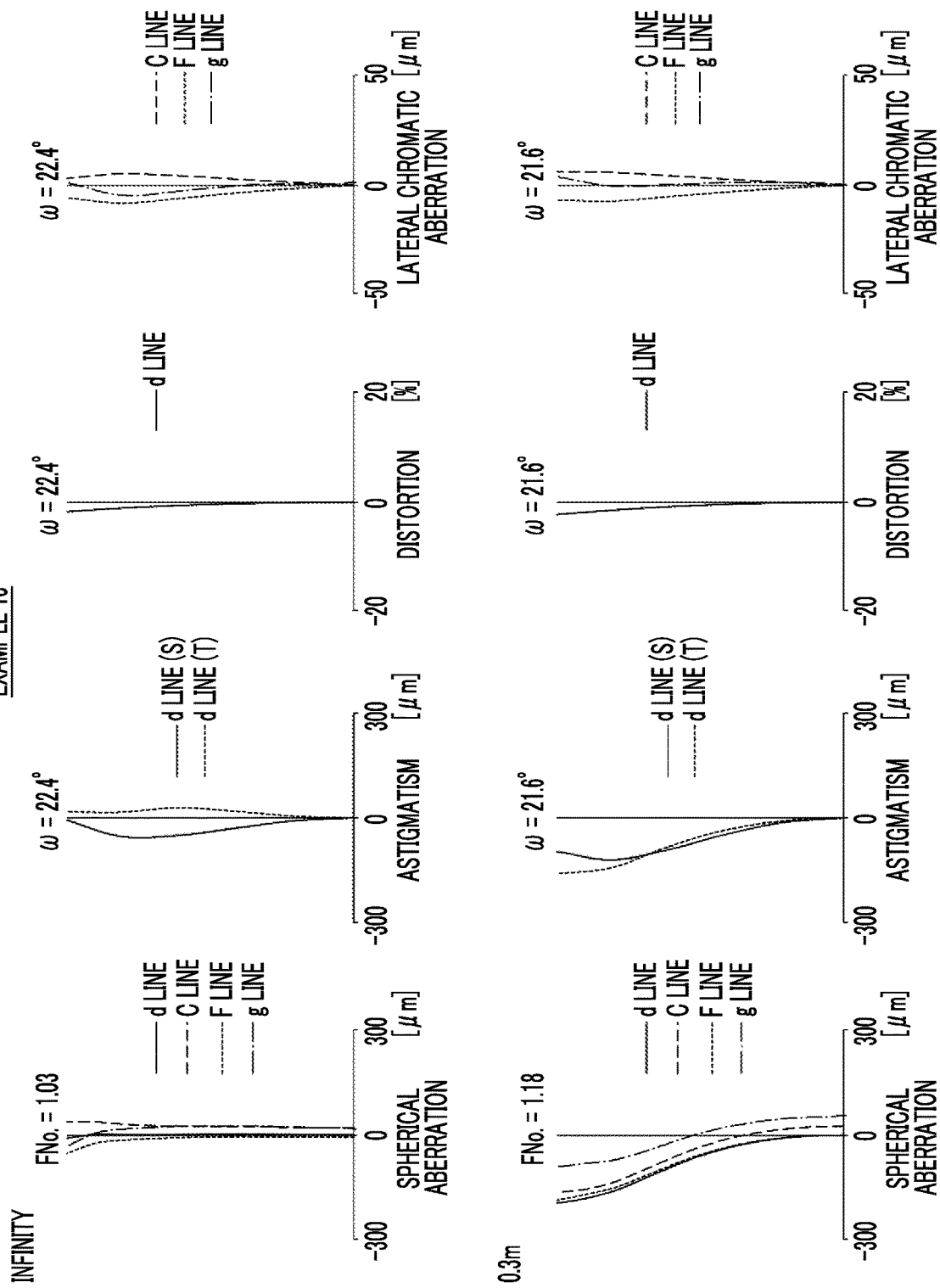
FIG. 38 shows spherical aberration diagrams, astigmatism diagrams, distortion diagrams, lateral chromatic aberration diagrams of the imaging lens of Example 13 of the present disclosure.
Figure 39:
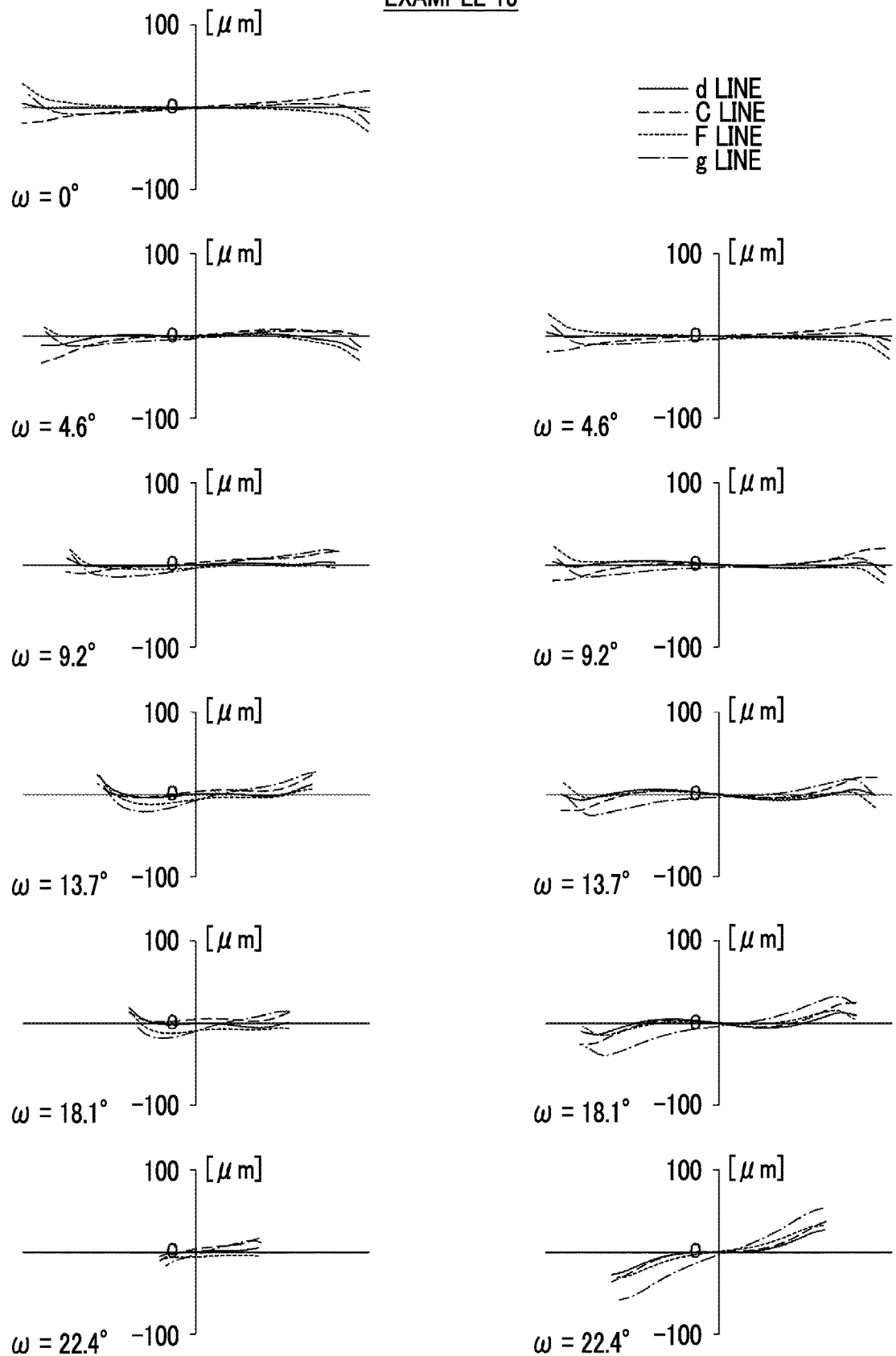
FIG. 39 is a lateral aberration diagram of the imaging lens according to Example 13 of the present disclosure.

Regarding the imaging lens of Example 13, Table 49 shows basic lens data, Table 50 shows specification, Table 51 shows variable surface distances, Table 52 shows aspheric surface coefficients, and FIGS. 38 and 39 show aberration diagrams. In FIG. 38, the upper part shows aberration diagrams in a state where the object at infinity is in focus, and the lower part shows aberration diagrams in a state where the object at the distance of 0.3 m (meter) from the object to the image plane Sim is in focus. FIG. 39 shows lateral aberration diagram in a state

TABLE 49

Example 13

| Sn | R | D | Nd | vd | θgF |
|---|---|---|---|---|---|
| 1 | −3667.66000 | 5.250 | 1.90043 | 37.37 | 0.57720 |
| 2 | −112.47874 | 2.673 | | | |
| 3 | −76.99651 | 2.000 | 1.78470 | 26.29 | 0.61360 |
| 4 | 44.09083 | 7.000 | | | |
| 5 | 402.10478 | 5.900 | 1.88299 | 40.78 | 0.56829 |
| 6 | −95.17168 | 2.500 | | | |
| 7 | −58.79565 | 1.510 | 1.63700 | 37.58 | 0.58219 |
| 8 | 65.34692 | 11.253 | 2.10420 | 17.02 | 0.66311 |
| 9 | −285.75743 | 1.510 | 2.00001 | 15.00 | 0.65515 |
| 10 | 1111.12100 | 0.100 | | | |
| 11(Hm) | 64.24840 | 15.020 | 1.74320 | 49.34 | 0.55312 |
| 12 | −54.40084 | 1.500 | 1.95906 | 17.47 | 0.65993 |
| 13 | −101.70168 | DD[13] | | | |
| 14 | 56.20087 | 5.300 | 2.00069 | 25.46 | 0.61364 |
| 15 | 509.40856 | 1.148 | | | |
| 16 | 30.28240 | 9.760 | 1.59522 | 67.73 | 0.54426 |
| 17 | −54.27774 | 1.300 | 1.85478 | 24.80 | 0.61232 |
| 18 | 17.94297 | 5.625 | | | |
| 19(St) | ∞ | 6.568 | | | |
| 20 | −18.73914 | 1.060 | 1.59551 | 39.24 | 0.58043 |
| 21 | 23.55627 | 7.750 | 1.88299 | 40.78 | 0.56829 |
| 22 | −44.17718 | 0.270 | | | |
| *23 | 151.55932 | 3.500 | 1.85135 | 40.10 | 0.56954 |
| *24 | −58.60621 | 0.100 | | | |

TABLE 49-continued

Example 13

| Sn | R | D | Nd | νd | θgF |
|---|---|---|---|---|---|
| 25 | −1583.54996 | 5.000 | 1.88299 | 40.78 | 0.56829 |
| 26 | −24.32217 | 1.200 | 1.80518 | 25.42 | 0.61616 |
| 27 | −92.27314 | DD[27] | | | |
| 28 | ∞ | 2.850 | 1.51680 | 64.20 | 0.53430 |
| 29 | ∞ | 1.341 | | | |

TABLE 50

Example 13

| f | 35.040 |
|---|---|
| FNo. | 1.03 |
| 2ω(°) | 44.8 |

TABLE 51

Example 13

| | Infinity | 0.3 m |
|---|---|---|
| DD[13] | 7.354 | 1.078 |
| DD[27] | 13.000 | 19.276 |

TABLE 52

Example 13

| Sn | 23 | 24 |
|---|---|---|
| KA | 1.0000000E+00 | 1.0000000E+00 |
| A4 | 2.9074622E−06 | 1.4702044E−05 |
| A6 | 4.5558330E−08 | 4.2157852E−08 |
| A8 | 2.0013444E−12 | 1.3239581E−10 |
| A10 | 1.0976364E−12 | 7.9752459E−13 |
| A12 | −1.8710710E−15 | −1.5225872E−16 |

Tables 53 to 55 show values corresponding to the conditional expressions (1) to (29) of the imaging lenses of Examples 1 to 13. In Examples 1 to 13, the d line is set as the reference wavelength. Tables 53 to 55 show the values based on the d line.

TABLE 53

| Expression Number | | Example 1 | Example 2 | Example 3 | Example 4 | Example 5 |
|---|---|---|---|---|---|---|
| (1) | H1max/H1f | 1.382 | 1.33 | 1.493 | 1.557 | 1.499 |
| (2) | H1max/H2f | 1.152 | 1.1 | 1.131 | 1.103 | 1.152 |
| (3) | H1f/H2f | 0.834 | 0.827 | 0.757 | 0.708 | 0.769 |
| (4) | (Rso + Rsi)/(Rso − Rsi) | −0.045 | −0.071 | −0.209 | −0.002 | −0.052 |
| (5) | β23 | 0.43 | 0.355 | 0.397 | 0.347 | 0.427 |
| (6) | $(1 - \beta 23^2) \times \beta r^2$ | 0.815 | 0.874 | 0.842 | 0.88 | 0.818 |
| (7) | ν1p − ν1n | 15.568 | 12.431 | 22.752 | 19.804 | 25.191 |
| (8) | θ1n − θ1p | 0.03884 | 0.0353 | 0.03496 | 0.027 | 0.03927 |
| (9) | ν2p − ν2n | 21.8 | 12.431 | 15.065 | 19.055 | −3.07 |
| (10) | θ2n − θ2p | 0.03337 | 0.03666 | 0.00916 | 0.02243 | −0.01331 |
| (11) | θ1max | 0.64514 | 0.64395 | 0.63196 | 0.64993 | 0.63702 |
| (12) | θ2max | 0.61364 | 0.63152 | 0.65321 | 0.65515 | 0.64300 |
| (13) | f1/f23 | 1.936 | 2.185 | 1.755 | 1.922 | 1.734 |
| (14) | f3/f2 | −0.136 | −0.057 | 0.023 | 0.0248 | 0.105 |
| (15) | f/f1 | 0.43 | 0.338 | 0.397 | 0.347 | 0.427 |
| (16) | f/f2 | −0.163 | −0.062 | 0.021 | 0.023 | 0.094 |
| (17) | f/f3 | 1.195 | 1.083 | 0.922 | 0.923 | 0.894 |
| (18) | (RA + RB)/(RA − RB) | 0.03 | 0.013 | −0.001 | −0.098 | −0.0517 |
| (19) | Nce1Ap − Nce1An | 0.32972 | 0.31115 | 0.28433 | 0.26946 | 0.29005 |
| (20) | νce1Ap − νce1An | −18.94 | −13.58 | −8.38 | −2.47 | −9.81 |
| (21) | Nce1Bp − Nce1Bn | −0.21586 | −0.19320 | −0.26099 | −0.24390 | −0.23486 |
| (22) | νce1Bp − νce1Bn | 31.87 | 32.33 | 39.53 | 38.7 | 38.1 |
| (23) | θ1p − θ1n + 0.00163 × (ν1p − ν1n) | −0.01347 | −0.01504 | 0.00213 | 0.00528 | 0.00179 |
| (24) | P1/D12 | 2.658 | 3.446 | 5.299 | 6.314 | 4.327 |
| (25) | θ2p − θ2n + 0.00163 × (ν2p − ν2n) | 0.00216 | −0.00527 | 0.00154 | 0.00864 | 0.0083 |
| (26) | Nce2p − Nce2n | −0.25956 | −0.26523 | −0.17310 | −0.25848 | 0.18083 |
| (27) | νce2p − νce2n | 42.93 | 39.36 | 41.15 | 45.42 | 11.91 |
| (28) | Nce3p − Nce3n | — | — | 0.28763 | — | 0.21137 |
| (29) | νce3p − νce3n | — | — | 0.96 | — | 8.82 |

TABLE 54

| Expression Number | | Example 6 | Example 7 | Example 8 | Example 9 | Example 10 |
|---|---|---|---|---|---|---|
| (1) | H1max/H1f | 1.563 | 1.545 | 1.501 | 1.457 | 1.474 |
| (2) | H1max/H2f | 1.088 | 1.152 | 1.123 | 1.119 | 1.134 |
| (3) | H1f/H2f | 0.696 | 0.746 | 0.748 | 0.768 | 0.770 |
| (4) | (Rso + Rsi)/(Rso − Rsi) | −0.255 | −0.08 | −0.19 | −0.032 | −0.04 |
| (5) | β23 | 0.343 | 0.392 | 0.41 | 0.389 | 0.381 |
| (6) | $(1 - \beta 23^2) \times \beta r^2$ | 0.883 | 0.847 | 0.832 | 0.849 | 0.855 |
| (7) | ν1p − ν1n | 23.867 | 20.768 | 17.575 | 19.829 | 17.183 |

TABLE 54-continued

| Expression Number | | Example 6 | Example 7 | Example 8 | Example 9 | Example 10 |
|---|---|---|---|---|---|---|
| (8) | θ1n − θ1p | 0.02881 | 0.03117 | 0.02062 | 0.01495 | 0.0122 |
| (9) | ν2p − ν2n | 12.25 | 17.376 | 16.22 | 20.285 | 20.285 |
| (10) | θ2n − θ2p | 0.02146 | 0.01776 | 0.02442 | 0.02870 | 0.02870 |
| (11) | θ1max | 0.65515 | 0.63155 | 0.64786 | 0.61364 | 0.61364 |
| (12) | θ2max | 0.65515 | 0.65480 | 0.65515 | 0.65993 | 0.65993 |
| (13) | f1/f23 | 1.894 | 1.73323 | 1.635 | 1.4 | 1.876 |
| (14) | f3/f2 | 0.077 | −0.016 | −0.042 | 0.049 | 0.066 |
| (15) | f/f1 | 0.343 | 0.392 | 0.41 | 0.389 | 0.381 |
| (16) | f/f2 | 0.068 | −0.015 | −0.039 | 0.047 | 0.063 |
| (17) | f/f3 | 0.884 | 0.935 | 0.926 | 0.968 | 0.961 |
| (18) | (RA + RB)/(RA − RB) | 0.042 | 0.009 | 0.036 | 0.047 | 0.05 |
| (19) | Nce1Ap − Nce1An | 0.22505 | 0.29349 | 0.27874 | 0.28748 | 0.28748 |
| (20) | νce1Ap − νce1An | −1.39 | −9.22 | −5.42 | 1.54 | 1.54 |
| (21) | Nce1Bp − Nce1Bn | −0.16482 | −0.26540 | −0.25196 | −0.30818 | −0.30818 |
| (22) | νce1Bp − νce1Bn | 34.74 | 39.62 | 37.45 | 56.12 | 56.12 |
| (23) | θ1p − θ1n + 0.00163 × (ν1p − ν1n) | 0.01009 | 0.00268 | 0.00803 | 0.01495 | 0.0157 |
| (24) | P1/D12 | 6.791 | 5.328 | 4.783 | 4.589 | 4.442 |
| (25) | θ2p − θ2n + 0.00163 × (ν2p − ν2n) | −0.00149 | 0.01119 | 0.00202 | 0.00437 | 0.00437 |
| (26) | Nce2p − Nce2n | −0.11589 | −0.23170 | −0.27100 | −0.21527 | −0.21527 |
| (27) | νce2p − νce2n | 32.29 | 44.08 | 39.55 | 45.86 | 45.86 |
| (28) | Nce3p − Nce3n | — | — | — | 0.22946 | 0.22946 |
| (29) | νce3p − νce3n | — | — | — | 7.44 | 7.44 |

TABLE 55

| Expression Number | | Example 11 | Example 12 | Example 13 |
|---|---|---|---|---|
| (1) | H1max/H1f | 1.477 | 1.373 | 1.274 |
| (2) | H1max/H2f | 1.133 | 1.108 | 1.089 |
| (3) | H1f/H2f | 0.809 | 0.807 | 0.855 |
| (4) | (Rso + Rsi)/(Rso − Rsi) | 0.095 | −0.052 | −0.022 |
| (5) | β23 | 0.345 | 0.35 | 0.359 |
| (6) | (1 − β23²) × βr² | 0.881 | 0.9 | 0.871 |
| (7) | ν1p − ν1n | 15.643 | 10.577 | 12.043 |
| (8) | θ1n − θ1p | 0.00916 | 0.03634 | 0.03729 |
| (9) | ν2p − ν2n | 22.76 | 19.795 | 21.795 |
| (10) | θ2n − θ2p | 0.04800 | 0.04192 | 0.03337 |
| (11) | θ1max | 0.61364 | 0.66311 | 0.66311 |
| (12) | θ2max | 0.65993 | 0.63900 | 0.61364 |
| (13) | f1/f23 | 2.042 | 2.2 | 2.409 |
| (14) | f3/f2 | 0.231 | −0.082 | −0.074 |
| (15) | f/f1 | 0.345 | 0.355 | 0.359 |
| (16) | f/f2 | 0.201 | −0.095 | −0.093 |
| (17) | f/f3 | 0.872 | 1.159 | 1.26 |
| (18) | (RA + RB)/(RA − RB) | 0.055 | 0.037 | 0.091 |
| (19) | Nce1Ap − Nce1An | 0.28748 | 0.37595 | 0.28570 |
| (20) | νce1Ap − νce1An | 1.54 | −11.44 | −9.27 |
| (21) | Nce1Bp − Nce1Bn | −0.30818 | −0.10313 | 0.10419 |
| (22) | νce1Bp − νce1Bn | 56.12 | 24.32 | 31.87 |
| (23) | θ1p − θ1n + 0.00163 × (ν1p − ν1n) | 0.01634 | −0.0191 | −0.01766 |
| (24) | P1/D12 | 4.312 | 4.368 | 3.253 |
| (25) | θ2p − θ2n + 0.00163 × (ν2p − ν2n) | −0.00103 | −0.00965 | 0.00216 |
| (26) | Nce2p − Nce2n | −0.21527 | −0.32876 | −0.25956 |
| (27) | νce2p − νce2n | 45.86 | 39.59 | 42.93 |
| (28) | Nce3p − Nce3n | 0.25399 | — | — |
| (29) | νce3p − νce3n | 4.46 | — | — |

As can be seen from the above data, the imaging lenses of Examples 1 to 13 have a small F number of 1.03, where the weight of the focus group is reduced, various aberrations are satisfactorily corrected, and thus high optical performance is achieved.

Figure 42:
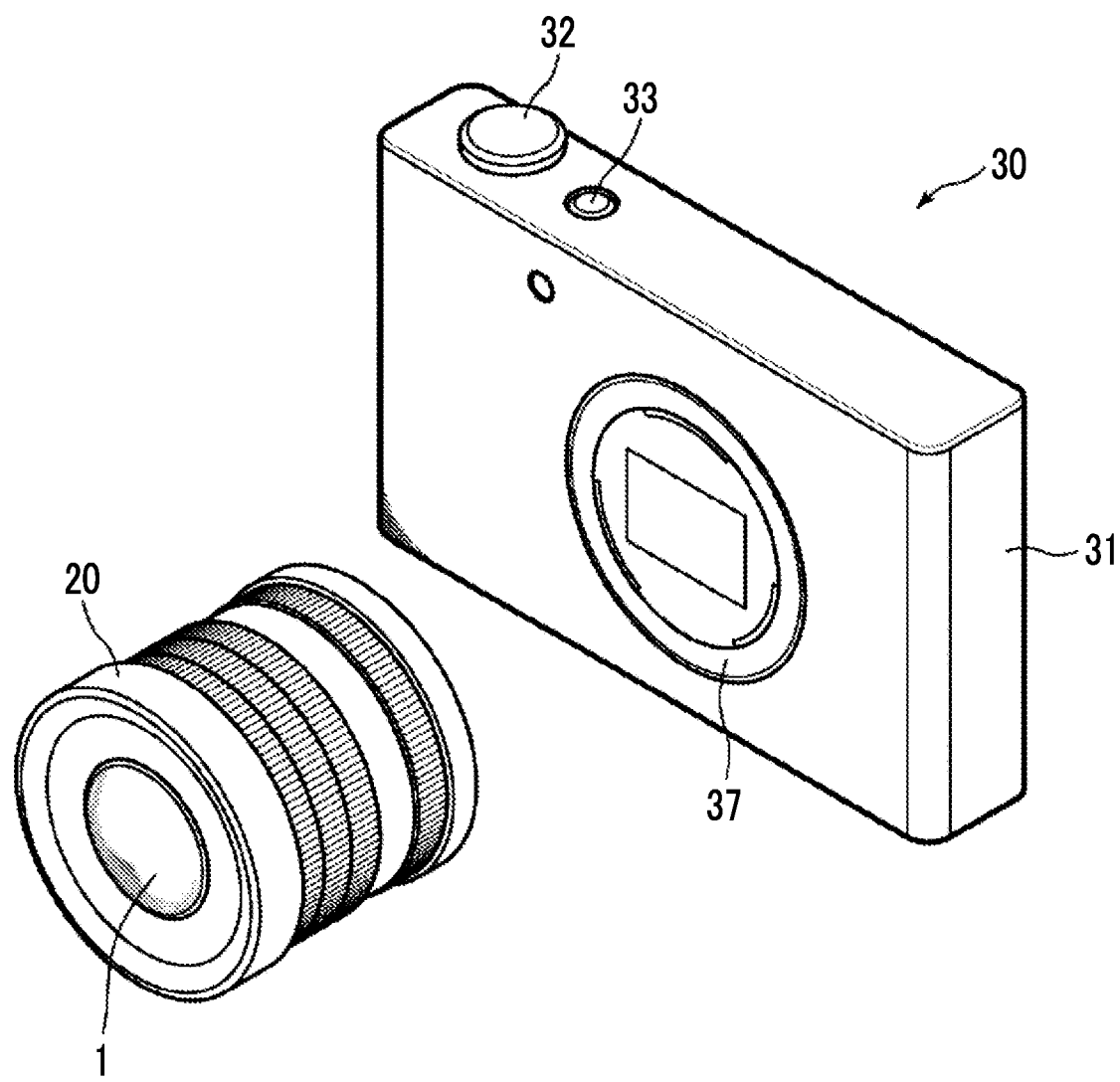
FIG. 42 is a perspective view of the front side of an imaging apparatus according to an embodiment of the present disclosure.
Figure 43:
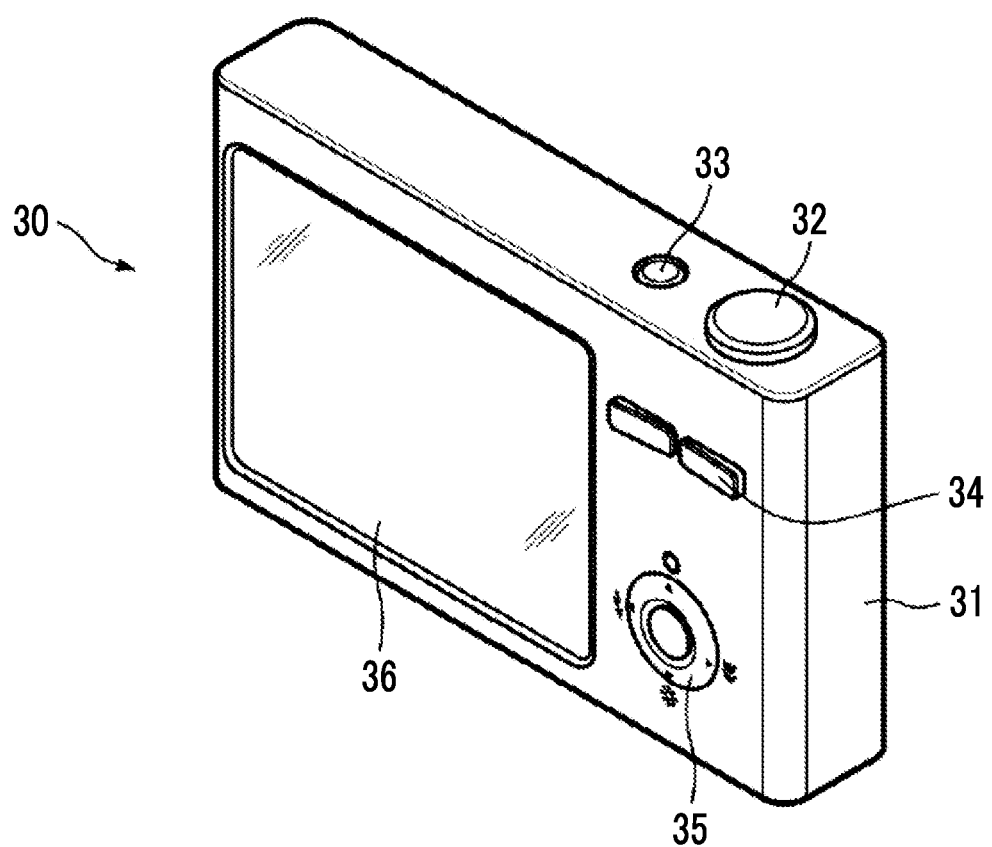
FIG. 43 is a perspective view of the rear side of an imaging apparatus according to an embodiment of the present disclosure.

Next, an imaging apparatus according to an embodiment of the present disclosure will be described. FIGS. 42 and 43 are external views of a camera 30 which is the imaging apparatus according to the embodiment of the present disclosure. FIG. 42 is a perspective view of the camera 30 viewed from the front side, and FIG. 43 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens comprising, successively in order from a position closest to an object side to an image side:
a first lens group that remains stationary with respect to an image plane during focusing and that has a positive refractive power;
a second lens group that moves during focusing;
a stop; and
a third lens group that moves during focusing and that has a positive refractive power,
wherein all lenses in the second lens group move integrally during focusing,
wherein the third lens group consists of all lenses that move integrally with the second lens group during focusing,
wherein a composite focal length of the second lens group and the third lens group is positive,
wherein the first lens group includes at least four positive lenses and at least three negative lenses,
wherein, assuming that a maximum value of a height of a paraxial ray from an optical axis in the first lens group is H1 max, in a case in which paraxial ray tracing is performed by causing the paraxial ray, whose height from the optical axis on a lens surface closest to the object is H1f and which is parallel to the optical axis, to be incident from the object side, Conditional Expression (1) is satisfied, which is represented by $$1.1 < H1\,max/H1f < 2 \qquad (1),$$

and
wherein assuming that
an average of Abbe numbers of all the positive lenses in the first lens group based on a d line is ν1p,
an average of Abbe numbers of all the negative lenses in the first lens group based on the d line is ν1n,
an average of partial dispersion ratios of all the positive lenses in the first lens group between a g line and an F line is θ1p, and
an average of partial dispersion ratios of all the negative lenses in the first lens group between the g line and the F line is θ1n,
Conditional Expressions (7) and (8) are satisfied, which are represented by $$5 < \nu 1p - \nu 1n < 35 \qquad (7),$$

and $$0 < \theta 1n - \theta 1p < 0.05 \qquad (8).$$

2. The imaging lens according to claim 1, wherein assuming that a height of the paraxial ray from the optical axis on a lens surface closest to the object side in the second lens group is H2f, Conditional Expression (2) is satisfied, which is represented by $$1 < H1\,max/H2f < 1.5 \qquad (2).$$

3. The imaging lens according to claim 1, wherein the first lens group includes at least two cemented lenses in which at least one positive lens and at least one negative lens are cemented.

4. The imaging lens according to claim 3,
wherein the cemented lens closest to the image side in the first lens group has a cemented surface concave toward the object side, and
wherein the cemented lens which is second from the image side in the first lens group has a cemented surface concave toward the image side.

5. The imaging lens according to claim 1,
wherein assuming that a height of the paraxial ray from the optical axis on a lens surface closest to the object side in the second lens group is H2f, Conditional Expression (3) is satisfied, which is represented by $$0.5 < H1f/H2f < 1 \qquad (3).$$

6. The imaging lens according to claim 1, wherein the first lens group includes at least three biconvex lenses and at least two biconcave lenses.

7. The imaging lens according to claim 1, wherein the second lens group consists of two or three positive lenses and one negative lens.

8. The imaging lens according to claim 1,
wherein the second lens group and the third lens group each includes at least one negative lens,
wherein an image side surface of the negative lens closest to the image side in the second lens group is a concave surface,
wherein an object side surface of the negative lens closest to the object side in the third lens group is a concave surface,
wherein assuming that
a radius of curvature of the image side surface of the negative lens closest to the image side in the second lens group is Rso, and
a radius of curvature of the object side surface of the negative lens closest to the object side in the third lens group is Rsi, Conditional Expression (4) is satisfied, which is represented by $$-0.4 < (Rso+Rsi)/(Rso-Rsi) < 0.2 \qquad (4).$$

9. The imaging lens according to claim 1, wherein assuming that
a combined lateral magnification of the second lens group and the third lens group in a state where the object at infinity is in focus is β23,
a combined lateral magnification of all lenses closer to the image side than the third lens group in a state in which an object at infinity is in focus in a case where a lens is disposed closer to the image side than the third lens group is βr, and βr is set to 1 in a case where no lens is disposed closer to the image side than the third lens group,
Conditional Expression (6) is satisfied, which is represented by $$0.7 < (1-\beta 23^2) \times \beta r^2 < 1.2 \qquad (6).$$

10. The imaging lens according to claim 1,
wherein the second lens group includes at least one positive lens and at least one negative lens,
wherein assuming that
an average of Abbe numbers of all positive lenses in the second lens group based on a d line is ν2p,
an average of Abbe numbers of all negative lenses in the second lens group based on the d line is ν2n,
an average of partial dispersion ratios of all the positive lenses in the second lens group between a g line and an F line is θ2p, and an average of partial dispersion ratios of all the negative lenses in the second lens group between the g line and the F line is θ2n, Conditional Expressions (9) and (10) are satisfied, which are represented by $$-10 < \nu 2p - \nu 2n < 35 \qquad (9), \text{ and}$$

$$-0.03 < \theta 2n - \theta 2p < 0.07 \qquad (10).$$

11. The imaging lens according to claim 1, wherein assuming that a maximum of partial dispersion ratios of the positive lenses in the first lens group between a g line and an F line is θ1 max, Conditional Expression (11) is satisfied, which is represented by $$0.56 < \theta 1 \text{ max} < 0.7 \qquad (11).$$

12. The imaging lens according to claim 1,
wherein the second lens group includes at least one positive lens, and
wherein assuming that a maximum of partial dispersion ratios of positive lenses in the second lens group between a g line and an F line is θ2 max, Conditional Expression (12) is satisfied, which is represented by $$0.59 < \theta 2 \text{ max} < 0.7 \qquad (12).$$

13. The imaging lens according to claim 1, wherein assuming that
a focal length of the first lens group is f1, and
a composite focal length of the second lens group and the third lens group is f23,
Conditional Expression (13) is satisfied, which is represented by $$1 < f1/f23 < 3.5 \qquad (13).$$

14. The imaging lens according to claim 1, further comprising a subsequent group that is disposed to be subsequent to the third lens group on the image side of the third lens group and remains stationary with respect to the image plane during focusing.

15. The imaging lens according to claim 1, consisting of the first lens group, the second lens group, the stop, and the third lens group.

16. The imaging lens according to claim 1, wherein Conditional Expression (1-1) is satisfied, which is represented by $$1.2 < H1 \text{ max}/H1f < 1.8 \qquad (1-1).$$

17. The imaging lens according to claim 2, wherein Conditional Expression (2-1) is satisfied, which is represented by $$1.05 < H1 \text{ max}/H2f < 1.3 \qquad (2-1).$$

18. An imaging apparatus comprising the imaging lens according to claim 1.

19. An imaging lens comprising, successively in order from a position closest to an object side to an image side:
a first lens group that remains stationary with respect to an image plane during focusing and that has a positive refractive power;
a second lens group that moves during focusing;
a stop; and
a third lens group that moves during focusing and that has a positive refractive power,
wherein all lenses in the second lens group move integrally during focusing,
wherein the third lens group consists of all lenses that move integrally with the second lens group during focusing,
wherein a composite focal length of the second lens group and the third lens group is positive,
wherein the first lens group includes at least four positive lenses and at least three negative lenses,
wherein, assuming that a maximum value of a height of a paraxial ray from an optical axis in the first lens group is H1 max, in a case in which paraxial ray tracing is performed by causing the paraxial ray, whose height from the optical axis on a lens surface closest to the object is H1f and which is parallel to the optical axis, to be incident from the object side, Conditional Expression (1) is satisfied, which is represented by $$1.1 < H1 \text{ max}/H1f < 2 \qquad (1), \text{ and}$$

wherein assuming that a combined lateral magnification of the second lens group and the third lens group in a state in which an object at infinity is in focus is β23, Conditional Expression (5-1) is satisfied, which is represented by $$0.3 < \beta 23 < 0.6 \qquad (5-1).$$

20. An imaging lens comprising, successively in order from a position closest to an object side to an image side:
a first lens group that remains stationary with respect to an image plane during focusing and that has a positive refractive power;
a second lens group that moves during focusing;
a stop; and
a third lens group that moves during focusing and that has a positive refractive power,
wherein all lenses in the second lens group move integrally during focusing,
wherein the third lens group consists of all lenses that move integrally with the second lens group during focusing,
wherein a composite focal length of the second lens group and the third lens group is positive,
wherein the first lens group includes at least four positive lenses and at least three negative lenses,
wherein, assuming that a maximum value of a height of a paraxial ray from an optical axis in the first lens group is H1 max, in a case in which paraxial ray tracing is performed by causing the paraxial ray, whose height from the optical axis on a lens surface closest to the object is H1f and which is parallel to the optical axis, to be incident from the object side, Conditional Expression (1) is satisfied, which is represented by $$1.1 < H1 \text{ max}/H1f < 2 \qquad (1), \text{ and}$$

wherein, assuming that a focal length of the third lens group is f3 and a focal length of the second lens group is f2, Conditional Expression (14) is satisfied, which is represented by $$-0.3 < f3/f2 < 0.4 \qquad (14).$$

* * * * *